US006962886B2

(12) United States Patent
Wallenberger

(10) Patent No.: US 6,962,886 B2
(45) Date of Patent: *Nov. 8, 2005

(54) GLASS FIBER FORMING COMPOSITIONS

(75) Inventor: Frederick T. Wallenberger, Allegheny County, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 20 days.

This patent is subject to a terminal disclaimer.

(21) Appl. No.: 10/164,468

(22) Filed: Jun. 6, 2002

(65) Prior Publication Data

US 2003/0207748 A1 Nov. 6, 2003

Related U.S. Application Data

(63) Continuation-in-part of application No. 10/363,609, filed as application No. PCT/US01/27451 on Sep. 5, 2001, now Pat. No. 6,818,575, which is a continuation-in-part of application No. 09/980,248, filed as application No. PCT/US00/14155 on May 23, 2000, now Pat. No. 6,686,304.

(60) Provisional application No. 60/330,178, filed on Oct. 18, 2001, provisional application No. 60/230,474, filed on Sep. 6, 2000, and provisional application No. 60/136,538, filed on May 28, 1999.

(51) Int. Cl.[7] .......................... C03C 13/00; C03C 13/06; C03C 13/02

(52) U.S. Cl. ........................... 501/35; 501/36; 501/38; 501/70

(58) Field of Search ............................. 501/35, 36, 70, 501/38

(56) References Cited

U.S. PATENT DOCUMENTS

| | | | | | |
|---|---|---|---|---|---|
| 3,600,205 | A | * | 8/1971 | Breton | 106/50 |
| 3,847,626 | A | * | 11/1974 | Erickson | 106/50 |
| 3,847,627 | A | * | 11/1974 | Erickson et al. | 106/50 |
| 3,929,497 | A | * | 12/1974 | Clark-Monks | 106/50 |
| 3,876,481 | A | * | 4/1975 | Erickson et al. | 106/50 |
| 4,026,715 | A | * | 5/1977 | Erickson et al. | 106/50 |
| 4,066,466 | A | * | 1/1978 | Neely, Jr. | 106/50 |
| 4,166,747 | A | * | 9/1979 | Neely, Jr. | 106/50 |
| 4,199,364 | A | * | 4/1980 | Neely | 106/50 |
| 4,542,106 | A | | 9/1985 | Sproull | 501/38 |
| 4,628,038 | A | * | 12/1986 | Weirauch, Jr. | 501/35 |
| 4,882,302 | A | * | 11/1989 | Horiuchi et al. | 501/27 |
| 5,789,329 | A | | 8/1998 | Eastes et al. | 501/36 |
| 5,843,854 | A | | 12/1998 | Karppinen et al. | 501/36 |
| 5,962,354 | A | | 10/1999 | Fyles et al. | 501/36 |
| 6,136,735 | A | * | 10/2000 | Gallo et al. | 501/36 |
| 6,686,304 | B1 | * | 2/2004 | Wallenberger | 501/35 |

FOREIGN PATENT DOCUMENTS

| | | | |
|---|---|---|---|
| EP | 0951457 | | 11/2002 |
| EP | 1230184 | | 6/2003 |
| FR | 2692248 | | 12/1993 |
| FR | 2768144 | * | 3/1999 |
| GB | 520247 | * | 4/1940 |
| GB | 1391384 | * | 4/1974 |
| JP | 63225552 | | 9/1988 |
| JP | 10-203845 | | 8/1998 |
| JP | 10-231142 | * | 9/1998 |
| JP | 10-231143 | | 9/1998 |
| RU | 2027687 | | 1/1995 |
| WO | WO 96/39362 | | 12/1996 |
| WO | 99/12858 | | 9/1998 |
| WO | WO 99/12858 | | 3/1999 |
| WO | 00/73231 | | 5/2000 |
| WO | 01/32576 A1 | | 10/2000 |
| WO | WO 00/73231 | | 12/2000 |
| WO | WO 01/32576 | | 5/2001 |

OTHER PUBLICATIONS

Loewenstein, K.L., "The Manufacturing Technology of Continuous Glass Fibres", *Glass Science and Technology 6*; 3rd Edition, (1993); pp. 30–44, 47–60, 115–122, 126–135, no month.

Wallenberger, Frederick T., *Advanced Inorganic Fibers*, (2000); pp. 81–102, 129–168, no month.

National Institute of Standards & Technology; Certificate 710a, no date.

National Institute of Standards & Technology; Certificate 717a, no date.

(Continued)

*Primary Examiner*—Karl Group
(74) *Attorney, Agent, or Firm*—Dennis G. Millman

(57) ABSTRACT

Mathematical relationship for ingredients for fiber glass compositions are used to identify properties of the glass. In particular the forming temperature and delta T. In one embodiment, the mathematical relationship of the ingredients is of a generic quaternary $SiO_2$, CaO, $Al_2O_3$ and MgO glass system. The relationship of $SiO_2$, CaO, $Al_2O_3$ and MgO of interest include RO=CaO+MgO, $SiO_2$/CaO, $SiO_2$/RO, $SiO_2$/$Al_2O_3$; $Al_2O_3$/CaO; $SiO_2$+$Al_2O_3$; $SiO_2$–RO and $Al_2O_3$/RO or RO/$Al_2O_3$. when other ingredients or components are added to the glass batch materials to alter the forming and/or liquidus temperatures of the glass, for example $Na_2O$, $Li_2O$, $K_2O$ and $B_2O_3$ the following mathematical relationships are of interest, ($SiO_2$+$Al_2O_3$)/(R2O+RO+$B_2O_3$) where RO is as previously defined and R2O= $Na_2O$+$Li_2O$+$K_2O$. Each of the compositional features of the glass identified above reflects the relative balance between the fluidity (i.e. viscosity) of the glass melt and its crystallization potential. Low boron or boron free fiber glass compositions having a low forming temperature, e.g. 1178 to 1240° C. and a delta T greater than 50° C. in order that the composition can be processed at a low temperature while reducing the possibility of devitrification of the molten glass in the bushing area during a glass fiber forming operation. Fiber glass compositions having low boron, e.g. less than 5.10 percent by weight has a low forming temperature, e.g. 1193 to 1240° C. and a delta T greater than 50° C.

15 Claims, No Drawings

OTHER PUBLICATIONS

ASTM: D 578–00; Standard Specification For Glass Fiber Strands, no date.

ASTM: C 829–81; Standard Practices For Measurement of Liquidus Temperature of Glass By The Gradient Furnace Method, no date.

ASTM: C 965–96; Standard Practice For Measuring Viscosity of Glass Above The Softening Point (2002).

US00/14155, Glass Fiber Composition, Frederick T. Wallenberger, Nov. 28, 2001.

US01/27451, Glass Fiber Forming Compositions, Frederick T. Wallenberger, Sep. 5, 2001.

The Manufacturing Technology of Continuous Glass Fibers R.L. Lowenstein (1993) pp. 85–107.*

* cited by examiner

GLASS FIBER FORMING COMPOSITIONS

CROSS REFERENCE TO RELATED APPLICTIONS

This application claims the benefit of U.S. Provisional Application Nos. 60/330,178, filed Oct. 18, 2001; 60/230, 474, filed Sep. 6, 2000 and 60/136,538, filed May 28, 1999. This application is a continuation-in-part of U.S. patent application Ser. No. 10/363,609, filed Mar. 4, 2003, now U.S. Pat. No. 6,818,575B2, which is a 35 USC 371 of PCT application Serial No. PCT/US01/27451 filed on Sep. 5, 2001 and claims the benefit of 60/230,474, which was a continuation-in-part of U.S. patent application Ser. No. 09/980,248, filed Nov. 28, 2001, now U.S. Pat. No. 6,686, 304 B1, which is a 35 USC 371 of PCT application Ser. No. PCT/US00/14155 filed May 23, 2000 and claims the benefit of 60/136,538.

U.S. Provisional Application No. 60/136,538 is the priority application of PCT Application No. U.S. Pat. No. 0,011,4155, and U.S. Provisional Application No. 60/230, 474 is the priority application of PCT Application No. US01127451. U.S. Provisional Application Nos. 60/136, 538; 601230,474 and 60/330,178; U.S. patent application Ser. No. 09/980,248, and PCT Application Nos. 00/14155 and 01/27451 are hereby incorporated herein by reference.

BACKGROUND OF THE INVENTION

1. Field of the Invention

This invention relates to glass compositions, and more particularly to (1) fiber glass compositions, and (2) mathematical relationships of the ingredients of the glass compositions to identify thermal properties of the glass compositions e.g., forming and liquidus temperatures with an acceptable temperature difference to prevent devitrification of the molten glass during forming of glass fibers.

2. Discussion of the Technology

In the art of forming glass fibers it is recognized that the difference between the forming temperature and liquidus temperature is maintained at a value to prevent devitrification of the molten glass during fiber forming. For example, the most common glass composition for making continuous glass fiber strands for textiles and glass fiber reinforcements is known in the trade as "E glass". The requirements as to what type of composition constitutes an E-glass composition are included in ASTM D578-00. An advantage of using E-glass having 6–10 percent by weight $B_2O_3$ is that its liquidus temperature is well below its forming temperature, i.e. typically greater than 56° C. (100° F.) and usually in the range of 83 to 111° C. (150 to 200° F.). As used herein, the terms "forming temperature", "$T_{FORM}$", "log 3 forming temperature" and "log3 FT" mean the temperature of the glass at which the viscosity of the glass is log 3, or 1000 poise, and the terms "liquidus temperature", "liquidus T" and "$T_{LIQ}$" mean the temperature at which the solid phase (crystals) and liquid phase (melt) of the glass are in equilibrium. The difference between $T_{FORM}$ and $T_{LIQ}$, referred to herein as "delta T" or "$\Delta T$", is a common measure of the crystallization potential of a given melt composition. The lower the $\Delta T$, in other words the smaller the difference between the forming temperature and the liquidus temperature, the greater the crystallization potential. In the glass fiber forming industry, $\Delta T$ is typically maintained at a temperature of at least 50° C. (90° F.) in order to prevent devitrification of the molten glass during a glass fiber forming operation, in particular, in the bushing area.

It is appreciated by those skilled in the art of forming glass fibers, that it is desirable to operate the glass fiber forming operation at low temperatures because operating the glass fiber forming operation at high temperatures results in high-energy usage, along with associated high-energy costs. In addition, the high temperatures accelerate degradation of the refractories used in the glass melting furnace, as well as the bushings used to form the fibers. The bushings include precious metals that cannot be recovered from the glass as the bushings wear.

It is recognized that boron and fluorine in addition to contributing to the electrical properties of the E-glass, e.g. dissipation factor and dielectric constant, also lower the forming and liquidus temperatures of the glass while providing a $\Delta T$ of at least 50° C. (90° F.). The boron in the form of an oxide and fluorine in the form of a fluoride are included in the glass batch materials and act as fluxes during the glass melting operation. E-glass can include up to 10 wt % $B_2O_3$ and up to 1.0 wt % fluoride (see ASTM D 578-00 §4.2). Although the boron effectively lowers the forming and liquidus temperatures while providing an acceptable $\Delta T$ value and the fluoride or fluorine acts as a flux, there are drawbacks. More particularly, these materials volatilize during melting and move with the exhaust gases into the exhaust system. If the boron and fluorine in the exhaust gases are not removed they are released to the atmosphere. Since boron and fluorine are considered pollutants, these emissions are closely controlled by environmental regulations, which in turn require careful control of the furnace operations and/or the use of costly additional pollution control equipment. In response to these concerns, the boron and/or fluorine content in E-glasses were reduced. For example, U.S. Pat. Nos. 4,542,106 and 5,789,329 and WO 99/12858 disclose boron free or low boron e.g. 1.8 wt % glasses having a forming temperature in the range of about 1258 to 1263° C. As can be appreciated by those skilled in the art of glass making, reducing or removing the boron and/or fluorine content in the batch materials raises the forming temperature. More particularly, the silica content increases as the boron content decreases, resulting in an increase in the forming temperature. As mentioned above, increasing the forming temperature results in high-energy usage, high-energy costs, and acceleration of the degradation of furnace refractories and bushings used to form the fibers.

For additional information concerning glass compositions and methods for fiberizing the glass composition, see K. Loewenstein, *The Manufacturing Technology of Continuous Glass Fibres*, (3d Ed. 1993) at pages 30–44, 47–60, 115–122 and 126–135, and F. T. Wallenberger (editor), *Advanced Inorganic Fibers: Processes, Structures, Properties, Applications*, (1999) at pages 81–102 and 129–168, which documents are hereby incorporated by reference.

In general, glass compositions having particular properties, e.g. forming temperature and delta T are identified by weight percent and/or molar percent of the components or ingredients in the glass. As can be appreciated by those skilled in the art of glass making and/or glass fiber forming, it would be advantageous to identify the performance of the glass compositions not only by the amount of a particular ingredient in the glass but also by a relationship, e.g. a mathematical relationship of the ingredients in the glass. WO 01/32576A1 discloses fiber glass compositions and the mathematical relationship of several of the ingredients, e.g. the combined Wt % of CaO and MgO, and the ratio of $Al_2O_3$/CaO, in the glass. Using the combination of glass ingredients, e.g. the absolute weight percent of silica with the relationship of other ingredients in the glass, e.g. the ratio of silica to RO (combined Wt % of CaO and MgO) would provide information regarding the melt properties of the glass.

SUMMARY OF THE INVENTION

The present invention provides a low boron containing or a boron free glass fiber forming composition that has a forming temperature of no greater than 1240° C. (2262° F.), a ΔT of at least 50° C. (90° F.), and one or more or all of the following compositional features:

- a ratio of $SiO_2$ to RO (i.e. CaO+MgO) in the range of 1.9 to 2.55;
- a ratio of $SiO_2$ to CaO in the range of 2.1 to 2.8;
- a ratio of $SiO_2$ to $Al_2O_3$ in the range of 3.7 to 5.0;
- a ratio of $Al_2O_3$ to CaO in the range of 0.5 to 0.6;
- a sum of $SiO_2$ and $Al_2O_3$ in the range of 66.0 to 73.7 wt %;
- a ratio of ($SiO_2+Al_2O_3$) to ($R_2O+RO+B_2O_3$) in the range of 2.0 to 3.0;
- a ratio of $Al_2O_3$ to RO in the range of 0.4 to 0.6; and
- a difference between $SiO_2$ and RO; in the range of 26.5 to 36.6 wt %.

In one nonlimiting embodiment of the present invention, the glass composition further has a $SiO_2$ content of greater than 57 weight percent and $B_2O_3$ of no greater than 2 weight percent. In another nonlimiting embodiment of the invention, the $SiO_2+Al_2O_3$ content of the glass composition is less than 70 weight percent. In still another nonlimiting embodiment of the invention, the glass composition contains at least 1 weight percent $TiO_2$.

In the discussion under Description of the Preferred Embodiments are glass compositions and mathematical relationship of different types of glasses. One such glass composition has the following ingredients:

| | |
|---|---|
| $SiO_2$ | 55.70 to 59 percent by weight; |
| $Al_2O_3$ | 12.35 to 13.94 percent by weight; |
| CaO | 24.40 to 24.80 percent by weight; |
| MgO | 2.55 to 2.80 percent by weight; |
| $TiO_2$ | 0.05 to 0.55 percent by weight; |
| $Na_2O$ | 0.40 to 0.50 percent by weight; |
| $K_2O$ | 0.40 to 0.60 percent by weight: |
| $Na_2O + K_2O$ | 0.85 to 1.50 percent by weight; |
| $Fe_2O_3$ | 0.20 to 0.40 percent by weight, and |
| $B_2O_3$ | 1.25 to 1.55 percent by weight and | the following relationship of ingredients

| | |
|---|---|
| RO | 26.25 to 27.60 wt % |
| $SiO_2$/CaO | 2.20 to 2.40 |
| $SiO_2$/RO | 2.00 to 2.20 |
| $SiO_2$/$Al_2O_3$ | 3.95 to 4.70 |
| $Al_2O_3$/CaO | 0.50 to 0.60 |
| $SiO_2 + Al_2O_3$ | 69.00 to 70.50 wt % |
| $SiO_2 - RO$ | 28.00 to 31.00 wt % |
| $Al_2O_3$/RO | 0.45 to 0.55 |
| $R2O + RO + B_2O_3$ | 28.90 to 30.00 wt % |
| ($SiO_2 + Al_2O_3$)/$R2O + RO + B_2O_3$) | 2.25 to 2.45 and | a log3 forming temperature in the range of 1210 to 1225° C. and ΔT is in the range of 52 to 65° C. R2O is equal to the wt % of $k_2O$ and $Na_2O$.

Reference should be made to the Description of the Preferred Embodiments thereto for a more detailed summary of the glass compositions of the invention and the relationship of the ingredients of the glass compositions.

The glass compositions meeting the mathematical relationships of the instant invention provide a glass having a forming temperature of less than 1240° C., preferably 1205 to 1220° C., and more preferably between 1211 to 1218° C. for boron free glass and more preferably between 1187 to 1205° C. for boron containing glasses.

DESCRIPTION OF THE PREFERRED EMBODIMENTS

In the following discussion, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties obtained by the practice of the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of 1 wt % to 10 we % should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10.

It should be appreciated that, unless otherwise indicated, all numerical values discussed herein, such as but not limited to weight percent of materials or temperatures, are approximate and are subject to variations due to various factors well known to those skilled in the art such as, but not limited to, measurement standards, equipment and techniques. As a result, such values are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any recognized deviations and/or errors are discussed. Any numerical value, however, inherently contains certain errors necessarily resulting from the standard deviation found in their respective testing measurements.

In the following discussion and in the claims the limits of defining the range are included in the range. For example and not limiting to the discussion, "in the range of 1230 to 1240° C." and "in the range of equal to and greater than 1230° C. and equal to and less than 1240° C." define the same range. Further in the preceding discussion, in the following discussion and in the claims, the terms "weight percent", "wt %" and "percent by weight" are used herein interchangeably.

In one embodiment of the present invention, the mathematical relationships of the ingredients of a generic quaternary glass system are disclosed. The quaternary system includes $SiO_2$, CaO, $Al_2O_3$ and MgO. As can be appreciated by those skilled in the art of making glass, in particular making glass fibers, MgO if not added to the batch materials is found in the batch materials as a tramp material, e.g. MgO is found in clay at 0.3 to 0.5 percent by weight. In the practice of the invention, MgO is added to the batch material to attain a level in the glass greater than the tramp level. The relationship of $SiO_2$, CaO, $Al_2O_3$ and MgO of interest include RO=CaO+MgO, $SiO_2$/CaO, $SiO_2$/RO, $SiO_2Al_2O_3$; $Al_2O_3$CaO; $SiO_2+Al_2O_3$; $SiO_2$—RO and $Al_2O_3$/RO or RO/$Al_2O_3$. In the present invention when other ingredients or components are added to the glass batch materials to alter the forming and/or liquidus temperatures of the glass and/or are present in the glass, for example but not limiting to the invention $Na_2O$, $Li_2O$, $K_2O$ and $B_2O_3$ the following mathematical relationships are of interest, $(SiO_2+Al_2O_3)/(R2O+RO+B_2O_3)$ where RO is as previously defined and R2O= $Na_2O+Li_2O+K_2O$. In Tables 1 through 22, the relationship $(SiO_2+Al_2O_3)/(R2O+RO+B_2O_3)$ is shown as (Si+Al)/(R2O+RO+B) to fit the formula into a reasonable column width. Each of the compositional features of the glass identified above reflects the relative balance between the fluidity (i.e. viscosity) of the glass melt and its crystallization potential, as will be discussed below in more detail. The physical melt properties of interest in the present discussion are the forming temperature and the liquidus temperature because embodiments of the present invention are to provide low boron or boron free glass compositions having a low forming temperature and a desired ΔT. In this manner, the glass can be processed, e.g. to form glass fibers at a low temperature while reducing the possibility of devitrification of the molten glass, e.g. in the bushing area. Without limiting the present invention, one embodiment of the invention includes a glass composition having a forming temperature of no greater than 1240° C. (2264° F.) and a ΔT of at least 50° C. (90° F.).

In the following discussion, the mathematical relationship is to the ingredients in the glass; however, the invention is not limited thereto and contemplates identifying and using the relationship of the ingredients to be added to the batch, e.g. mixing the batch prior to melting the batch to form the glass. Further, in the following discussion the mathematical relationship of the ingredients will be in wt % of the ingredients in the glass composition; however, the invention is not limited thereto and maybe the mole % or any measurement that identifies the amount of the ingredient in the batch materials and/or the glass composition.

In regards to the ingredients or constituents of the quaternary system presented above, it is known that pure silica is the highest melting glass former. A pure silica melt does not have a well defined melting point. At 2500° C. (4532° F.), it has a viscosity of greater than about log 4 (10,000) poise, and as it cools to room temperature, it gradually solidifies and forms a glass. Pure calcia, magnesia and alumina melts are known to have very low viscosities, e.g. in the range of 0.5–2.0 poise at their respective melting points. These materials do not solidify into a glass as the melt cools but rather crystallize instantly at their sharply defined melting point. In a typical quaternary $SiO_2$—$Al_2O_3$—CaO—MgO glass composition with 55–60% $SiO_2$ and 21–26% CaO, each oxide of the quaternary system contributes its unique characteristics toward its balance of melt properties.

Based on the material properties of the constituents of the quaternary system for a glass composition having these components, it can be inferred that as $SiO_2$, which is the largest oxide component of the glass composition in terms of weight percent, is reduced in a given composition of this type, the melt viscosity and the resulting log 3 forming temperature drops. If CaO, which is the second largest component of the glass composition in terms of weight percent, or MgO is increased in such a composition, the effect of RO (CaO+MgO) on the glass properties will be twofold. More specifically, it will not only increase the fluidity of the resulting melt (i.e. decrease its viscosity and the forming temperature) but it will also increase the crystallizability of the resulting melt (i.e. increase its liquidus temperature), and therefore reduce the ΔT.

As a result, although not required, in one nonlimiting embodiment of the present invention, the glass compositions have (1) the lowest $SiO_2$ content that will yield the lowest log 3 forming temperature, which in the present invention is below 1240° C., preferably below 1220° C. in combination with (2) the ratio of $SiO_2$ to RO that yields the process-required ΔT, which in the present invention is at least 50° C. Based on the forgoing and although not required in the practice of the invention, in one nonlimiting embodiment of the present invention, the silica level is preferably no greater than 62 wt % $SiO_2$, in order to promote a lower log 3 forming temperature. In other nonlimiting embodiments of the present invention, the glass compositions have no greater than 60 wt % $SiO_2$ and no greater than 58 wt % $SiO_2$.

In general, MgO is included in a glass fiber forming composition because it has been found that the heating and melting profile of a glass fiber composition, and in particular the liquidus temperature, can be controlled and in particular optimized by controlling the amount of MgO. More particularly, by regulating the amount of MgO, the liquidus temperature can be selected to provide a delta T of at least 50° C. In addition, it has been determined that a eutectic exists in a generic quaternary $SiO_2$. $Al_2O_3$—CaO—MgO system at around 2.5–2.8 wt % MgO. For a discussion of the eutectic reference may be had to WO 00/73231 which document is hereby incorporated by reference.

The value of the $SiO_2$/RO ratio can be manipulated by changing the amount of $SiO_2$ and/or RO to produce a glass composition having a ΔT as close as possible to the minimum desire ΔT. A decrease in the value of $SiO_2$/RO, which is indicative of a reduction in the wt % of $SiO_2$ and/or an increase in the wt % of CaO and/or MgO, or any change or combination of changes in the wt % of the $SiO_2$, CaO and/or MgO, will effect the melt viscosity and ΔT, and will increase the crystallization potential. Conversely, an increase in the value of $SiO_2$/RO will effect the melt viscosity and ΔT, and will decrease the crystallization potential. It should be appreciated that if the value of $SiO_2$/RO ratio drops too low, ΔT can drop to an unacceptable level. Although not required, in one nonlimiting embodiment of the present invention, $SiO_2$/RO is no greater than 2.40. In other nonlimiting embodiments, $SiO_2$/RO is no greater than 2.35, or no greater than 2.30, or no greater than 2.25, or no greater than 2.20. In still another nonlimiting embodiment of the invention, the value of $SiO_2$/RO ranges from 1.9 to 2.55, e.g. from 2.1 to 2.55 for boron-free glasses and from 1.9 to 2.4 for boron containing glasses.

In addition to the $SiO_2$ level and the $SiO_2$/RO ratio, the following parameters also describe the compositional envelope level of a quaternary glass composition: the $SiO_2$/CaO ratio, the $SiO_2/Al_2O_3$ ratio, the $Al_2O_3$/CaO ratio, the sum of $SiO_2+Al_2O_3$, the difference between $SiO_2$—RO, and the $Al_2O_3$/RO ratio. The following parameters describe the compositional envelope level of a glass composition containing additional temperature modifying ingredients: the sum of R2O+RO+$B_2O_3$, where R2O=$Na_2O+K_2O+Li_2O$ and the $(SiO_2+Al_2O_3)/(R_2O+RO+B_2O_3)$ ratio.

While the $SiO_2$/RO ratio at a given silica level describes the compositional effect of RO on the crystallization potential and melt fluidity, the $SiO_2$/CaO ratio shows only the effect of CaO on the crystallization potential. If the MgO and the SiO2 levels are kept constant in a comparison of various melts, a decrease in the value of $SiO_2/CaO$ will show an increase in crystallization potential due to the contribution of CaO and visa versa. The $SiO_2$—RO difference serves as a similar indicator, i.e. a decrease in the difference or a smaller difference is typically indicative of a greater relative amount of RO and thus an increase in the crystallization potential. And conversely, an increase in the difference or a larger difference in $SiO_2$—RO is indicative of a reduction in the crystallization potential. In one nonlimiting embodiment of the present invention, the $SiO_2/CaO$ ratio of the glass composition ranges from 2.1 to 2.8, e.g. from 2.3 to 2.8 for boron-free glasses and from 2.2 to 2.7 for boron containing glasses. In another nonlimiting embodiment of the present invention, the $SiO_2$—RO difference of the glass composition ranges from 26.5 to 36.6 wt %, e.g. from 30.5 to 36.6 wt % for boron-free glasses and from 26.5 to 34.0 wt % for boron containing glasses.

The sum of $SiO_2+Al_2O_3$ is another parameter that describes the compositional envelope of a given melt. Up to about an $Al_2O_3$ level of 14 to 15 wt %, $Al_2O_3$ is believed to be able to participate in the network formation with $SiO_2$, and counteract the crystallization potential of RO that is always present. At higher $Al_2O_3$ levels, e.g. greater than 15 wt %, $Al_2O_3$ will begin to act much like RO and contribute to a rise of the crystallization potential of a given melt. Thus a lower value of $SiO_2+Al_2O_3$, which is indicative of a lower $Al_2O_3$ level for a glass composition of a given wt % of $SiO_2$, will typically result in a lower crystallization potential, and a greater value of $SiO_2+Al_2O_3$ will typically result in a higher crystallization potential for a given melt. In one nonlimiting embodiment of the present invention, the $SiO_2+Al_2O_3$ sum of the glass composition ranges from 66.0 to 73.7 wt %, e.g. from 70.8 to 73.7 wt % for boron-free glasses and from 66.0 to 72.1 wt % for boron containing glasses.

Similarly with respect to $SiO_2/Al_2O_3$ and based on the characteristics of the melt provided by the amount of $Al_2O_3$, an increasing ratio value would be indicative of a reduction in the amount of $Al_2O_3$ and/or an increase in the amount of $SiO_2$ and would be accompanied by a reduction in the crystallization potential of the melt. Conversely, a decreasing ratio value would be accompanied by an increase in the crystallization potential of the melt. In one nonlimiting embodiment of the present invention, the $SiO_2/Al_2O_3$ ratio of the glass composition ranges from 3.7 to 5.0, e.g. from 4.2 to 5.0 for boron-free glasses and from 3.7 to 4.9 for boron containing glasses.

As mentioned above, other mathematical relationships of ingredients of glass compositions, e.g. the $Al_2O_3/CaO$ ratio, the $Al_2O_3/RO$ ratio, and the $(SiO_2+Al_2O_3)/(R2O+RO+B_2O_3)$ ratio may be developed to characterize a given melt. In one nonlimiting embodiment of the present invention, the value of the $Al_2O_3/CaO$ ratio of the glass composition ranges from 0.5 to 0.6. In another nonlimiting embodiment of the present invention, the value of the $Al_2O_3/RO$ ratio of the glass composition ranges from 0.4 to 0.6, e.g. from 0.46 to 0.53 for boron-free glasses and from 0.46 to 0.56 for boron containing glasses. In still another nonlimiting embodiment of the present invention, the value of the $(SiO_2+Al_2O_3)/(R2O+RO+B_2O_3)$ ratio of the glass composition ranges from 2.0 to 3.0, e.g. from 2.3 to 3.0 for boron-free glasses and from 2.0 to 2.7 for boron containing glasses. Reference may be had to WO 01/32576 for additional discussion on the $Al_2O_3/CaO$ ratio, and the $(SiO_2+Al_2O_3)/(R2O+RO+B_2O_3)$ ratio.

The discussion will now be directed to additives to the batch materials to alter the forming temperature, the liquidus temperature and the delta T. As previously discussed, boron is a material that is added to glass fiber compositions to reduce the forming temperature and the liquidus temperature. However, as discussed earlier, the inclusion of boron oxide results in the production of particulate emissions that, depending on the particulate level, may have to be removed from a melting furnace exhaust stream before being released into the environment. Although the amount of $B_2O_3$ can be as high as 10 wt % in an E-glass composition, in the present invention, the glass composition has no boron or a low boron content, i.e. has a $B_2O_3$ content in the range of 0 to 5.10 wt %. In other nonlimiting embodiments of the present invention, the glass fiber composition has no greater than 4 wt %, or no greater than 3 wt %, or no greater than 2 wt % $B_2O_3$. In another nonlimiting embodiment of the present invention, the glass composition is boron-free or essentially boron-free. As the term "essentially free" is used herein, the glass composition does not include an ingredient purposely added to the glass but found in the glass in trace amounts. In the practice of the invention, a glass having up to 0.05 wt % $B_2O_3$ is considered a boron free glass.

Further, as previously discussed, fluorine is a material added to glass fiber compositions as a flux, however, because of the environmental concerns it is preferred not to include fluorine. Nevertheless because equipment is available to remove the fluorine from the exhaust gases, the invention may be practiced using fluorine. In one nonlimiting embodiment of the present invention, the glass composition has low fluorine content, in other words, a fluorine content no greater than 0.30 wt %. In another nonlimiting embodiment, the glass composition is essentially fluorine free, i.e. it includes no more than a trace amount of fluorine, which is considered herein to be up to 0.05 wt %. In still another nonlimiting embodiment, the glass composition does not include any fluorine. Except where otherwise indicated, the glass fiber forming compositions disclosed and discussed herein are essentially fluorine free and/or do not include any fluorine.

Additional materials that can be added to the glass fiber composition to modify the melt properties, e.g. to reduce forming temperature and/or liquidus temperature of the glass include without limiting the glass compositions disclosed herein, are $Li_2O$, $Na_2O$, ZnO, $TiO_2$, MnO and/or $MnO_2$. Alkali oxides are network terminators and tend to effect the melt properties. $K_2O$ an alkali oxide is found in levels up to 0.60 wt % in commercial clays and is not normally added as a separate ingredient to the batch materials; however, in the practice of the invention it may be added as a separate material. In the practice of the invention alkali oxides up to 2.00 wt %, preferably 1 wt % are present in the glass of one embodiment of the invention. In the instance where $K_2O$ is present in the clay, the difference is usually made up by additions of $Na_2O$ and $Li_2O$. $Li_2O$ is more effective in reducing the melt properties than $Na_2O$. In one non-limiting embodiment of the present invention, the glass composition includes 0 to 1.0 wt % $Li_2O$ and/or 0 to 1.00 wt % $Na_2O$ and/or 0 to 1 wt % $K_2O$. Non-alkali oxide ingredients usually employed to reduce the melt properties are ZnO, $TiO_2$, MnO and/or $MnO_2$ in amounts of about 0 to 1.5 wt % ZnO, 0 to 1.5 wt % $TiO_2$, 0 to 3 wt % MnO and/or 0 to 3 wt % $MnO_2$. It is believed that levels of these materials less than 0.05 wt % would be considered either tramp amounts or so low that they will not materially impact the glass melt properties. As a result, in another non-limiting embodiment, 0.05 to 1.5 wt % $Li_2O$ and/or 0.05 to 1.0 wt % $Na_2O$ and/or 0.05 to 1.0 wt % $K_2O$ and/or 0.05 to 1.5 wt % ZnO and/or 0.05 to 1.5 wt % $TiO_2$ and/or 0.05 to 3 wt % MnO and/or 0.05 to 3 wt % $MnO_2$ are included in the glass composition. In still another nonlimiting embodiment of the invention, the glass composition includes 0.2 to 1 wt % $Li_2O$ and/or 0.30 to 1.0 wt % $Na_2O$ and/or 0.30 to 1.0 wt % $K_2O$ and/or 0.2 to 1 wt % ZnO and/or 0.05 to 1.1 wt % $TiO_2$ and/or up to 1 wt % MnO and/or up to 1 wt % $MnO_2$.

As mentioned above, the ratio $(SiO_2+Al_2O_3)/(R2O+RO+B_2O_3)$ takes into account the wt % of the additions of $B_2O_3$, $Na_2O$, $K_2O$ and $Li_2O$ that is (are) measured in the glass or batch materials regardless of the amount. Tramp amounts of these materials in the glass and/or batch are to be used to determine the value of the ratio. If any or all of the additions of $B_2O_3$, $Na_2O$, $K_2O$ and $Li_2O$ are not determined to be present in the glass and/or batch, the value of zero is used for that ingredient in determining the value of the ratio. For example but not limiting to the invention, if $Na_2O$, $K_2O$ and $Li_2O$ are present and $B_2O_3$ is not, the ratio $(SiO_2+Al_2O_3)/(R2O+RO+B_2O_3)$ becomes $(SiO_2+Al_2O_3)/(R2O+RO)$. If none of the ingredients $B_2O_3$, $Na_2O$, $K_2O$ and $Li_2O$ are determined to be present, the ratio becomes $(SiO_2+Al_2O_3)/RO$. In the claims when the ratio $(SiO_2+Al_2O_3)/(R2O+RO+B_2O_3)$ is recited in a claim, if the ingredient is not recited in the claim, it is not used to determine the value of the ratio even though it is determined to be present in a glass covered by the claim. The preceding discussion is applicable to the other mathematical relationships, e.g. but not limiting thereto $(R_2O+RO+B_2O_3)$.

It should be appreciated that glass fiber compositions can include other oxides that are present as tramp materials such as BaO, $ZrO_2$, SrO and $Cr_2O_3$, which are usually present in amounts of up to 0.1 wt %.

Further, it should be appreciated that the glass compositions disclosed herein can also include small amounts of other materials, for example melting and refining aids, tramp materials or impurities. For example and without limiting the present invention, melting and fining aids, such as FeO, $Fe_2O_3$ and $SO_3$, are useful during production of the glass, but their residual amounts in the glass can vary and typically have minimal, if any, material effect on the properties of the glass product. In addition, small amounts of the additives discussed above can enter the glass composition as tramp materials or impurities included in the raw materials of the main constituents, e.g. 0 to 0.5 wt % for $SO_3$, FeO and $Fe_2O_3$.

Shown in Table 1 are several examples of glass compositions of an embodiment of the invention, which relates to the use of clay having high $K_2O$ and low $TiO_2$ levels in glass batch materials and to glass compositions having high levels $K_2O$ and low levels of $TiO_2$. $K_2O$ and $TiO_2$ can be added to the batch materials but are not economically removed from the clays used as batch material. As can be appreciated by those skilled in the art of glass melting and as discussed above, high $K_2O$ levels, e.g. up to 0.70 wt % in the glass raises the forming temperature by as much as about 7 to 10° C. in relation to a glass made from clay that introduces 0.10 wt % $K_2O$. One embodiment of the present invention relates to an improved E-type glass having low weight percent $B_2O_3$, a forming temperature no greater than 1230° C., preferably no greater than 1222° C. and a delta T of at least 50° C. and preferably up to 65° C. The following are the main constituents in wt % based on the total weight percent of the final glass composition. The $K_2O$ and $TiO_2$ listed in the ranges below for commercial glasses may or may not be added to the batch as separate ingredient. If the $K_2O$ and $TiO_2$ are not added, it is expected that they would be present in the clay in varying wt % depending on the geographical location of the clay. Although the $K_2O$ and $TiO_2$ would be present in the clay, the invention contemplates separate additions of $K_2O$ and/or $TiO_2$ to be within the ranges listed below.

In those instances when the clay has high wt % of $K_2O$, e.g. 0.60 wt %, it is necessary to counteract the effect of the $K_2O$. More particularly, the $K_2O$ increases the forming temperature; therefore, the ingredients in the batch materials have to be modified so as to maintain a low forming temperature, e.g. below 1240° C. In one embodiment of the invention such a glass is as follows.

|  | broad range | preferred range | most preferred range |
|---|---|---|---|
| $SiO_2$ (wt %) | 52 to 60 | 54 to 59 | 55 to 58 |
| $Al_2O_3$ (wt %) | 8 to 16 | 11 to 14 | 12 to 14 |
| CaO (wt %) | 21 to 26 | 22 to 25 | 23 to 25 |
| MgO (wt %) | 1 to 5 | 1 to 4 | 2 to 3 |
| $K_2O$ (wt %) | up to 1.00 | 0.30 to 1.00 | 0.30 to 0.80 |
| $Na_2O$ (wt %) | up to 1.00 | 0.30 to 1.00 | 0.30 to 0.90 |
| $K_2O + Na_2O$ (wt %) | 0.70 to 2.00 | 0.80 to 1.5 | 0.90 to 1.20 |
| $B_2O_3$ (wt %) | 1.00 to 3.50 | 1.10 to 2.00 | 1.20 to 1.50 |
| $Fe_2O_3$ (wt %) | 0.10 to 0.50 | 0.15 to 0.45 | 0.20 to 0.40 |
| $TiO_2$ | up to 2.0 | up to 1.5 | Up to 1.3 |

The range provided for $B_2O_3$ is not limiting to the invention, and it is recommended the level of boron be adjusted to meet local environmental regulations. As such, the invention may be practiced having levels of $B_2O_3$ up to 3.5 wt %.

The glasses of the invention are further defined by one or more of the following relationships:

|  | broad range | preferred range |
|---|---|---|
| wt % of CaO and MgO ("RO") | 26 to 28 wt % | 26 to 27.70 wt % |
| $SiO_2$/CaO | 2.10 to 2.80 | 2.20 to 2.70 |
| $SiO_2$/RO | 1.90 to 2.55 | 1.90 to 2.40 |
| $SiO_2/Al_2O_3$ | 3.70 to 5.00 | 3.7 to 4.90 |
| $Al_2O_3$/CaO | 0.45 to 0.65 | 0.50 to 0.60 |
| $SiO_2 + Al_2O_3$ | 66 to 73.70 wt % | 66 to 72.10 wt % |
| $SiO_2$ − RO | 26.56 to 36.60 wt % | 26.50 to 34 wt % |
| $Al_2O_3$/RO | 0.40 to 0.60 | 0.46 to 0.56 |
| $R2O + RO + B_2O_3$ | 28.00 to 32.00 wt % | 28.00 to 31.00 wt % |
| $(SiO_2 + Al_2O_3)/(R2O + RO + B_2O_3)$ | 2.00 to 3.00 | 2.00 to 2.70 |
| where R2O is equal to the sum of $Na_2O + K_2O$. | | |

Table 1 contains experimental samples A–E and illustrative samples F and G of glass compositions incorporating features of the invention. The ranges for the glass compositions listed on Table 1 are the minimum and maximum values for the glass compositions recited on Table 1, and for examples A–E, and F and G. More particularly, Table 1 provides the following glass compositions. A glass composition having the following ingredients:

| $SiO_2$ | 55.00 to 58 percent by weight; |
|---|---|
| $Al_2O_3$ | 12.00 to 14.00 percent by weight; |
| CaO | 23.80 to 24.80 percent by weight; |
| MgO | 2.50 to 3.00 percent by weight; |
| $TiO_2$ | up to 0.60 percent by weight; |
| $Na_2O$ | 0.40 to 0.50 percent by weight; |

-continued

| | |
|---|---|
| $K_2O$ | 0.40 to 0.60 percent by weight; |
| $Na_2O + K_2O$ | 0.85 to 1.50 percent by weight; |
| $Fe_2O_3$ | 0.20 to 0.40 percent by weight; |
| $B_2O_3$ | 1.25 to 1.55 percent by weight; | the following relationship of ingredients

| | |
|---|---|
| RO | 26.25 to 27.60 wt % |
| $SiO_2$/CaO | 2.20 to 2.40 |
| $SiO_2$/RO | 2.00 to 2.20 |
| $SiO_2$/$Al_2O_3$ | 3.95 to 4.70 |
| $Al_2O_3$/CaO | 0.50 to 0.60 |
| $SiO_2 + Al_2O_3$ | 69.00 to 70.50 wt % |
| $SiO_2 - RO$ | 28.00 to 31.00 wt % |
| $Al_2O_3$/RO | 0.45 to 0.55 |
| $R2O + RO + B_2O_3$ | 28.90 to 30.00 wt % |
| $(SiO_2 + Al_2O_3)/(R2O + RO + B_2O_3)$ | 2.25 to 2.45 | where R2O is equal to the sum of Na2O+K2O has a log3 forming temperature in the range of 1210 to 1225° C. and ΔT is in the range of 52 to 65° C.

Another glass composition defined by Examples A–E of Table 1 has the following ingredients

| | |
|---|---|
| $SiO_2$ | 55.60 to 57.60 percent by weight; |
| $Al_2O_3$ | 12.35 to 13.94 percent by weight; |
| CaO | 24.40 to 24.80 percent by weight; |
| MgO | 2.55 to 2.80 percent by weight; |
| $TiO_2$ | 0.55 percent by weight: |
| $Na_2O$ | 0.45 percent by weight; |
| $K_2O$ | 0.45 to 0.58 percent by weight; |
| $Na_2O + K_2O$ | 0.90 to 1.03 percent by weight; |
| $Fe_2O_3$ | 0.25 to 0.38 percent by weight; |
| $B_2O_3$ | 1.30 to 1.50 percent by weight, and | the following relationships:

| | |
|---|---|
| RO | 26.95 to 27.56 wt % |
| $SiO_2$/CaO | 2.25 to 2.29 |
| $SiO_2$/RO | 2.02 to 2.14 |
| $SiO_2$/$Al_2O_3$ | 4.00 to 4.66 |
| $Al_2O_3$/CaO | 0.51 to 0.56 |
| $SiO_2 + Al_2O_3$ | 69.18 to 69.95 wt % |
| $SiO_2 - RO$ | 28.04 to 30.65 wt % |
| $Al_2O_3$/RO | 0.46 to 0.51 |
| $R2O + RO + B_2O_3$ | 29.15 to 29.89 wt % |
| $(SiO2 + Al2O3)/(R2O + RO + B2O3)$ | 2.31 to 2.40 | where R2O is equal to the sum of $Na_2O+K_2O$. The glass composition has a log3 forming temperature in the range of 1156 to 1164° C. and ΔT is in the range of 54 to 65° C.

Other glass compositions identified by Examples F and G of Table 1 have the following ingredients

| | |
|---|---|
| $SiO_2$ | 56.70 to 57.85 percent by weight; |
| $Al_2O_3$ | 12.55 to 13.67 percent by weight; |
| CaO | 23.87 to 24.45 percent by weight; |
| MgO | 2.55 to 2.62 percent by weight; |
| $TiO_2$ | 0.05 to 0.34 percent by weight; |
| $Na_2O$ | 0.44 to 0.455 percent by weight; |
| $K_2O$ | 0.45 to 0.51 percent by weight; |
| $Na_2O + K_2O$ | 0.90 to 1.03 percent by weight; |
| $Fe_2O_3$ | 0.30 to 0.40 percent by weight; |
| $B_2O_3$ | 1.30 to 1.50 percent by weight, and | the following relationships:

| | |
|---|---|
| RO | 26.49 to 27.00 wt % |
| $SiO_2$/CaO | 2.37 to 2.38 |
| $SiO_2$/RO | 2.10 to 2.14 |
| $SiO_2$/$Al_2O_3$ | 4.15 to 4.61 |
| $Al_2O_3$/CaO | 0.51 to 0.57 |
| $SiO_2 + Al_2O_3$ | 70.37 to 70.44 wt % |
| $SiO_2 - RO$ | 30.21 to 30.85 wt % |
| $Al_2O_3$/RO | 0.46 to 0.52 |
| $R2O + RO + B_2O_3$ | 28.94 to 29.20 wt % |
| $(SiO_2 + Al_2O_3)/(R2O + RO + B_2O_3)$ | 2.41 to 2.43 | where R2O is equal to the sum of $Na_2O+K_2O$. The glasses have a log3 forming temperature in the range of 1218 to 1219° C. and ΔT is in the range of 52 to 58° C.

The experimental or laboratory examples or samples on Table 1 discussed above and on Tables 2 to 19 to be discussed below, unless indicated otherwise, were prepared from certified or reagent grade oxides (e.g., pure silica or calcia). Examples F and G on Table 1 and examples H and I on Table 2 are illustrative examples and were not prepared in the following manner. The batch size for each example was 1000 grams. The individual batch ingredients were weighed out, combined and placed in a tightly sealed glass jar or plastic container. The sealed jar or container was then placed in a paint shaker for 15 minutes or in a tubular mixer for 25 minutes to effectively mix the ingredients. A portion of the batch was then placed into a platinum crucible, filling no more than ¾ of its volume. The crucible was then placed in a furnace and heated at 1427° C. (2600° F.) for 15 minutes. The remaining batch was then added to the hot crucible and heated at 1427° C. (2600° F.) for 15 to 30 minutes. The furnace temperature was then raised to 1482° C. (2700° F.) and held there for 2 hours. The molten glass was then fritted in water and dried. The fritted samples were reheated to a temperature of 1482° C. (2700° F.) and held at that temperature for 2 hours. The molten glass was then fritted again in water and dried.

The forming temperature, i.e. the glass temperature at a viscosity of 1000 poise, was determined by ASTM method C965-81, and the liquidus temperature by ASTM method C829-81. The log 3 forming temperature of the compositions reported in Tables 1–20 were determined by a comparison of the glass against physical standards supplied by the National Institute of Standards and Testing (NIST). In the Tables, the majority of the reported log 3 forming temperatures is based on comparison to NIST 710A. Several of the reported log 3 forming temperatures are originally based on NIST 717A which uses a borosilicate standard; in those instances the values were converted to correspond to NIST 710A. Therefore all the log3 forming temperatures are considered to based on NIST 710A.

Selected samples had ingredients added that would be found in the clays used in the batch material. Such as $K_2O$, $TiO_2$, calcium fluoride, SrO and/or $Cr_2O_3$.

The weight percent of the constituents of the compositions shown in Tables 1–19 except for Examples F to I are based on the weight percent of each constituent in the batch. It is believed that the batch weight percent is generally about the same as the weight percent of the melted sample, except for glass batch materials that volatilize during melting, e.g. boron, fluorine and moisture absorbing materials. In the case of boron, it is believed that the weight percent of $B_2O_3$ in a laboratory sample will be 10 to 16 weight percent less than the weight percent of $B_2O_3$ in the batch composition, the precise loss depending on the composition and melting conditions. In the case of fluorine, it is believed that the weight percent of fluorine in a laboratory test sample will be about 50 percent less than the weight percent of fluorine in the batch composition, the precise loss depending on the composition and melting conditions. In the case of CaO, CaO has an certified ignition loss 3–5 wt % (an average of 4 wt %). The determination of the wt % of the batch materials for the samples listed on Tables 1–19 except for Examples F to I, through an oversight, did not take into account the ignition loss. Therefore in practicing the invention, this fact should be taken into account. Because the 4 wt % error is minimal, the recitation of the wt % o of CaO recited in the claims covering the embodiments of the glass compositions listed on Tables 1–19 does not take into account the ignition loss. Table 20 has production samples; the analysis of the ingredients of the examples on Table 20 were measured using XRF analysis.

As can be appreciated by those skilled in the art of converting data from laboratory melt sample to data used to prepare batch materials for commercial glass production, the melting and fining conditions of the commercial furnace to be used to melt and fine the glass has to be taken into consideration. It is believed that glass fiber compositions made from commercial grade materials and melted under conventional operating conditions will have similar batch and melt weight percents as discussed above, with the precise loss depending, in part, on the furnace operating temperature, through-put and quality of commercial batch materials. The amount of boron and fluorine reported in the tables takes into consideration the expected loss of these materials and represents the expected amount of the material in the glass composition. It should further be appreciated that the glass compositions disclosed herein can also include small amounts of other materials, for example melting and refining aids, tramp materials or impurities. For example and without limiting the present invention, melting and fining aids, such as $SO_3$, are useful during production of the glass, but their residual amounts in the glass can vary and have no material effect on the properties of the glass product. In addition, small amounts of the additives discussed above can enter the glass composition as tramp materials or impurities included in the raw materials of the main constituents.

With reference to Tables 1–20, in each column of each Table, the upper portion of the column lists the wt % of the ingredients in the glass composition based on the batch materials as was discussed above. The middle portion of the column lists the mathematical relationship of the ingredients discussed above for the particular glass composition in the same column to obtain the thermal properties listed in the bottom portion of the column e.g. forming temperature, liquidus temperature and delta T (except for certain compositions of Table 20 which is discussed below.) Table 20 lists production glasses. The amount of each constituent of the commercial compositions shown in the Table 20 is the weight percent in the glass. The weight percent for the $B_2O_3$ was determined using Neutron Transmission analysis techniques and the weight percent for the remaining constituents was determined using X-ray fluorescence analysis (also referred to as "XRF analysis"), all of which are well known to those skilled in the art.

Tables 2 through 19 include, but are not limited to glass compositions disclosed in U.S. patent application Ser. No. 09/980,248, filed Nov. 28, 2001, in the name of Frederick T. Wallenberger for "Glass Fiber Compositions" (hereinafter "U.S. patent application Ser. No. 09/980,248"); in PCT International Application No. PCT/US01/27451, filed Sep. 5, 2001, in the name of Frederick T. Wallenberger for "Glass Fiber Forming Compositions" (hereinafter "USPCT No. 01127451"); and in International Application No. PCT/US00/14155. U.S. patent application Ser. No. 091980248 and International Application No. PCT/US00/14155 are jointly referred to as "U.S. patent application Ser. No. 09/980,248 Combined".

U.S. patent application Ser. No. 09/980,248 Combined and USPCT No. 01/27451 discloses base composition for the low boron glass fibers that are suitable for textiles and glass fiber reinforcements, that may be used in the practice of the present invention. In general, the base compositions of U.S. patent application Ser. No. 09/980248 Combined and USPCT No. 01/27451 include the following main constituents in weight percent ranges based on the total weight of the final glass composition with the exception that USPCT No. 01/27451 glass compositions are boron free.

|  | broad range | preferred range | most preferred range |
|---|---|---|---|
| $SiO_2$ (wt %) | 52 to 62 | 52 to 61 | 53 to 59 |
| $Na_2O$ (wt %) | 0 to 2 | up to 1.5 | up to 1 |
| CaO (wt %) | 16 to 25 | 20 to 25 | 22 to 24 |
| $Al_2O_3$ (wt %) | 8 to 16 | 11 to 14 | 12 to 14 |
| $Fe_2O_3$ (wt %) | 0.05 to 0.80 | up to 0.5 | up to 0.4 |
| $K_2O$ (wt %) | 0 to 2 | Up to 1 | up to 0.1 |
| $B_2O_3$ (wt %) | 1 to 5 | 1 to 3.5 | 1 to 2.5 |

In one embodiment the glass comparison of U.S. patent application Ser. No. 09/980,248 Combined, the glass composition can include on or more of the following materials in the following amounts.

|  | broad range | preferred range |
|---|---|---|
| $Li_2O$ (wt %) | 0.05 to 1.5 | 0.2 to 1 |
| ZnO (wt %) | 0.05 to 1.5 | 0.2 to 1 |
| MnO (wt %) | 0.05 to 3 | up to 1 |
| $MnO_2$ (wt %) | 0.05 to 3 | up to 1 |

For a complete discussion of the glass compositions disclosed in U.S. patent application Ser. No. 091980248 Combined, and disclosed in USPCT No. 01/27451, reference should be made thereto.

As discussed above the examples of Table 1 incorporate features of one embodiment of the invention, a low boron glass composition (see the upper portion of the columns on Table 1) having a forming temperature below 1240° C., more preferably below 1225° C. and a delta T of greater than 50° C. (see the lower portion of the columns on Table 1). The examples of Tables 1–20 include another feature of the invention, mathematical relationship of the ingredients in the glass composition (see middle portion of the columns on Tables 1–20) to provide a forming temperature below 1240° C. and a delta T of greater than 50° C. (see the lower portion of the columns on Tables 1–20). The mathematical relationship of the ingredients of the glass compositions on Table 1 were discussed above. Tables 2–19 include, but are not limited to examples of glass compositions disclosed in U.S.

patent application Ser. No. 09/980248 Combined and/or in USPCT No. 01/27451. Additional examples within the scope of the inventions of U.S. patent application Ser. No. 09/980,248 Combined and/or in USPCT No. 01/27451 are included herein. For example, but not a complete relationship, examples 188–236 are selected from U.S. patent application Ser. No. 09/980,248 Combined and examples 7–24, 43–50 ,78–185, and 219–267 are selected from USPCT No. 01/27451. Examples A–E, 25, 30–32, 60–75 are examples, among others, presented by this application. The examples identified as selected from U.S. patent application Ser. No. 09/980248 Combined and/or in USPCT No. 01/27451 and those added to the Tables by the instant disclosure are not complete. For a complete comparison reference may be had to U.S. patent application Ser. No. 09/980,248 Combined and/or in USPCT No. 01/27451.

For a better appreciation of the invention the samples on Tables 2–19 are categorized according to the following types of glass compositions.

Type-1 Glasses boron-free (Table 2)
Type-2 Glasses up to about 5.10 wt % $B_2O_3$ (Tables 3–11)
Type-3 Glasses boron-free with lithium oxide (Tables 12 and 13)
Type-4 Glasses boron-free with lithium and zinc oxide (Tables 14 and 15)
Type-5 Glasses boron-free with zinc oxide (Table 16)
Type-6 Glasses up to 5 wt % $B_2O_3$ with lithium oxide (Tables 17 and 18)
Type-7 Glasses miscellaneous glass (Table 19)

Table 20, as previously discussed includes production glasses.

Table 2 (Typ 1 Glasses) includes glass compositions of a quaternary system that includes $SiO_2$ in the range of 57–60 wt %, preferably in the range of 57.25–59.50 wt % and more preferable in the range of 57.40–59.10; $Al_2O_3$ in the range of 12–14 wt %, preferably in the range of 12–13.50 wt % and more preferably in the range of 12.15–13.45 wt %; CaO in the range of 23–25 wt %, preferable in the range of 23.50–24.50 wt % and more preferable in the range of 23.70–24.20 wt %, and MgO in the range of 2–3 wt %, preferably in the range of 2.25–2.75 wt % and more preferably in the range of 2.50–2.60 wt %. The glass compositions of Table 2 further include $TiO_2$ in the range of up to 1.25 wt %, preferably in the range of 0.25–1.20 wt % and more preferably in the range of 0.50–1.15 wt %; $Na_2O$ in the range of 0.75–1.25, preferably in the range of 0.75–1.00 wt % and more preferably in the range of 0.85–0.9 5wt %; and $Fe_2O_3$ in the range of up to 0.50 wt %, preferably 0.10–0.50 wt % and more preferably in the range of 0.30–0.40 wt %. The compositions of Table 2 are boron free. Compositions 1–6 of Table 2 further include $TiO_2$ in the range of 1.00–1.25 wt %, preferably in the range of 1.00–1.20 wt % and more preferably in the range of 1.05–1.15 wt %; $Na_2O$ in the range of 0.75–1.25, preferably in the range of 0.75–1.00 wt % and more preferably in the range of 0.85–0.95 wt %; and $Fe_2O_3$ in the range of up to 0.35 wt %, preferably 0.10–0.30 wt % and more preferably in the range of 0.20–0.30 wt %. Compositions H and I include $TiO_2$ in the range of 0–0.9 wt %, preferably in the range of 0.25–0.75 wt % and more preferably in the range of 0.50–0.6 wt %; $Na_2O$ in the range of 0.75–1.25, preferably in the range of 0.75–1.00 wt % and more preferably in the range of 0.85–0.95 wt %; and $Fe_2O_3$ in the range of up to 0.50 wt %, preferably 0.10–0.40 wt % and more preferably in the range of 0.30–0.40 wt %.

A glass composition having the ingredients of Table 2 within the above ranges and at least one of the following relationships provides a glass composition having a forming temperature below 1240° C. and a delta T of greater than 50° C., e.g.:

| Relationship | Broad Range | Preferred Range |
|---|---|---|
| RO (CaO + MgO) | 26 to 28 wt % | 26.00 to 27.25 wt % |
| $SiO_2$/CaO | 2.10 to 2.80 | 2.30 to 2.80 |
| $SiO_2$/RO | 1.90 to 2.55 | 1.90 to 2.40 |
| $SiO_2$/$Al_2O_3$ | 3.70 to 5.00; | 4.20 to 5.00 |
| $Al_2O_3$/CaO | 0.40 to 0.75 | 0.50 to 0.60 |
| $SiO_2$ + $Al_2O_3$ | 66 to 73.7 wt % | 70.80 to 73.7 wt % |
| $R_2O$ + RO | 27 to 28.15 wt | 27.15 to 20 wt % |
| ($SiO_2$ + $Al_2O_3$)/($R_2O$ + RO) | 2.0 to 3.0 | 2.30 to 3.00 |
| $SiO_2$ - RO | 26.5 to 36.6 wt % | 30.50 to 36.60 wt % |
| $Al_2O_3$/RO | 0.4 to 0.6 | 0.46 to 0.56 |

The Type 1 glass compositions are not expected to have any $Li_2O$ or $K_2O$, therefore R2O is equal to the wt % of $Na_2O$.

As can be appreciated, Table 2 also provides ranges for the ingredients and the relationships. For example, but not limiting to the invention, the ranges for the ingredients of the glass compositions listed on Table 2 are as follows:

| | |
|---|---|
| $SiO_2$ | 57.45 to 59.05 percent by weight; |
| $Al_2O_3$ | 12.20 to 13.40 percent by weight; |
| CaO | 23.75 to 24.35 percent by weight; |
| MgO | 2.55 percent by weight; |
| $TiO_2$ | 1.10 percent by weight: |
| $Na_2O_3$ | 0.90 percent by weight, and |
| $Fe_2O_3$ | 0.25 percent by weight. |

The range of the mathematical relationships of the ingredients from Table 2 for the glass compositions listed on Table 2 is found in Table 21 in the column entitled "Type 1 Glasses". The glasses on Table 2 have a log3 forming temperature in the range of 1232 to 1240° C. and a ΔT in the range of 58 to 74° C.

Table 2 also provides ranges for the Examples 1–6. More particularly, from Table 2 Example 1–6 glass compositions have the following ingredients and ranges:

| | |
|---|---|
| $SiO_2$ | 57.45 to 59.05 percent by weight; |
| $Al_2O_3$ | 12.20 to 13.68 percent by weight; |
| CaO | 23.75 to 24.50 percent by weight; |
| MgO | 2.55 to 2.58 percent by weight; |
| $TiO_2$ | 0.55 to 1.10 percent byweight; |
| $Na_2O_3$ | 0.90 to 0.91 percent by weight, and |
| $Fe_2O_3$ | 0.25 to 0.35 percent by weight. |

The range of the mathematical relationship of the ingredients from Table 2 for the glass compositions of Examples 1–6 can be found on Table 21 under Type 1 Glasses. The glass compositions of Examples 1–6 have a log3 forming temperature in the range of 1232 to 1240° C. and a ΔT in the range of 58 to 74° C.

Further, Table 2 provides ranges for the Examples H and I. More particularly, from Table 2 Examples H and I glass compositions have the following ingredients and ranges:

| | |
|---|---|
| $SiO_2$ | 57.60 to 58.18 percent by weight; |
| $Al_2O_3$ | 13.55 to 13.68 percent by weight; |

-continued

| | |
|---|---|
| CaO | 23.75 to 24.50 percent by weight; |
| MgO | 2.55 to 2.58 percent by weight; |
| TiO$_2$ | 0.55 percent by weight; |
| Na$_2$O | 0.90 to 0.91 percent by weight, and |
| Fe$_2$O$_3$ | 0.35 percent by weight. | the ranges for the mathematical relationships of the ingredients from Table 2 are as follows:

| | |
|---|---|
| RO | 26.33 to 27.05 wt % |
| SiO$_2$/CaO | 2.35 to 2.45 |
| SiO$_2$/RO | 2.13 to 2.20 |
| SiO$_2$/Al$_2$O$_3$ | 4.25 |
| Al$_2$O$_3$/CaO | 0.55 to 0.58 |
| SiO$_2$ + Al$_2$O$_3$ | 71.15 to 71.86 wt % |
| SiO$_2$ − RO | 30.55 to 31.85 wt % |
| Al$_2$O$_3$/RO | 0.50 to 0.52 |
| R2O + RO | 27.24 to 27.95 wt % |
| (SiO$_2$ + Al$_2$O$_3$)/(R2O + RO) | 2.55 to 2.64 |

The glass compositions of Examples H and I have a log3 forming temperature in the range of 1238 to 1240° C. and a ΔT of 55° C.

Tables 3–11 (Type 2 Glasses) include glass compositions of a quaternary system that includes SiO$_2$ in the range of 50–60 wt %, preferably in the range of 52.25–59.00 wt % and more preferable in the range of 52.90–58.00 wt %; Al$_2$O$_3$ in the range of 10–14 wt %, preferably in the range of 11–14 wt % and more preferably in the range of 12–14 wt %; CaO in the range of 21–26 wt %, preferable in the range of 21.50–25.50 wt % and more preferable in the range of 22–25 wt %, and MgO in the range of 1–4 wt %, preferably in the range of 1.25–3.50 wt % and more preferably in the range of 1.45–3.25 wt %. The compositions of Tables 3–11 include B$_2$O$_3$ in an amount within the range of greater than 0 to 5.10 wt %, e.g. 0.90–5.10 wt %. The compositions of Table 3–11 further contemplate TiO$_2$ in the range of 0.25–1.25 wt %, more likely in the range of 0.40–1.20 wt % and most likely in the range of 0.45–1.15 wt %; Na$_2$O in the range of 0.25–1.25, preferably in the range of 0.35–1.00 wt % and more preferably in the range of 0.40–0.95 wt %; K$_2$O expected in amounts up to 0.60 wt %; and Fe$_2$O$_3$ in the range of up to 0.50 wt % preferably up to −0.45 wt % and more preferably up to 0.40 wt %. Other ingredients included in the glass compositions of Tables 3–11 but not limited thereto are fluorine in amounts up to 0.50 wt %; SrO in amounts up to 0.15 wt % and Cr$_2$O$_3$ in amounts up to 0.15 wt %.

A glass composition having ingredients of Tables 3–11 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 24 to 29 wt % | 24.75 to 27.60 wt % |
| SiO$_2$/CaO | 2.10 to 2.80 | 2.15 to 2.75 |
| SiO$_2$/RO | 1.95 to 2.55 | 1.90 to 2.40 |
| SiO$_2$/Al$_2$O$_3$ | 3.70 to 5.00 | 3.70 to 4.90 |
| Al$_2$O$_3$/CaO | 0.45 to 0.65 | 0.45 to 0.65 |
| SiO$_2$ + Al$_2$O$_3$ | 66 to 73.7 wt % | 66 to 72.1 wt % |
| R$_2$O + RO + B$_2$O$_3$ | 27.5 to 34 wt % | 28 to 33 wt % |

-continued

| Relationship | Broad Range | Preferred Range |
|---|---|---|
| (SiO$_2$ + Al$_2$O$_3$)/(R$_2$O + RO + B$_2$O$_3$) | 2.00 to 3.00 | 2.00 to 2.70 |
| SiO$_2$ − RO | 26.5 to 36.6 wt % | 26.5 to 34 wt % |
| Al$_2$O$_3$/RO | 0.40 to 0.60 | 0.46 to 0.56 |

Type 2 glasses of Tables 3–11 do not consider Li$_2$O as an ingredient; therefore for Tables 3–11, R2O is equal to the sum of the wt % of K$_2$O and Na$_2$O. If one of the ingredients is not present in the glass it is given a 0 wt %. For the glasses listed on each of the Tables 3,4,6,7, 10 and 11, only the addition of Na$_2$O is considered; therefore for the glasses on the individual Tables 3,4,6,7,10 and 11, R2O is equal to the wt % of Na$_2$O. For the glasses listed on the individual Tables 5,8 and 9, Na$_2$O and K$_2$O are considered; therefore for the glasses on the individual Tables 5,8 and 9, R2O is equal to the sum of the wt % of Na$_2$O and K$_2$O.

As can be appreciated, each of the Tables 3–11 provides ranges for the ingredients and the relationships. For example and not limiting to the invention, Tables 3–11 provide glass compositions having the following ingredients in the following ranges:

| | |
|---|---|
| SiO$_2$ | 53.00 to 57.75 percent by weight; |
| Al$_2$O$_3$ | 12.20 to 14 percent by weight; |
| CaO | 22.25 to 24.95 percent by weight; |
| MgO | 1.50 to 3.00 percent by weight; |
| TiO$_2$ | 0.50 to 1.10 percent by weight; |
| Na$_2$O | 0.45 to 0.90 percent by weight; |
| K$_2$O | 0 to 0.38 percent by weight; |
| Fe$_2$O$_3$ | 0 to 0.30 percent by weight; |
| B$_2$O$_3$ | 1.30 to 5.02 percent by weight; |
| F | 0 to 0.50 percent by weight; |
| SrO | 0 to 0.13 percent by weight, and |
| Cr$_2$O$_3$ | 0 to 0.13 percent by weight. |

The mathematical relationship of the ingredients is found on Table 21 in the column entitled "Type 2 Glasses".

Table 3 provides glass compositions having ingredients in the following ranges:

| | |
|---|---|
| SiO$_2$ | 56.00 to 56.65 percent by weight; |
| Al$_2$O$_3$ | 13.05 to 13.60 percent by weight; |
| CaO | 23.50 to 24.25 percent by weight; |
| MgO | 2.50 to 2.55 percent by weight; |
| TiO$_2$ | 0.50 to 1.10 percent by weight; |
| Na$_2$O | 0.90 percent by weight; |
| Fe$_2$O$_3$ | 0.25 percent by weight, and |
| B$_2$O$_3$ | 2.00 percent by weight. |

The ranges for the mathematical relationships of ingredients of the glass compositions on Table 3 from Table 3 are as follows:

| | |
|---|---|
| RO | 26.05 to 26.75 wt % |
| SiO$_2$/CaO | 2.31 to 2.41 |
| SiO$_2$/RO | 2.09 to 2.17 |
| SiO$_2$/Al$_2$O$_3$ | 4.12 to 4.28 |
| Al$_2$O$_3$/CaO | 0.56 to 0.57 |
| SiO$_2$ + Al$_2$O$_3$ | 69.60 to 69.95 wt % |
| SiO$_2$ − RO | 29.25 to 30.60 wt % |
| Al$_2$O$_3$/RO | 0.50 to 0.52 |

-continued

| | |
|---|---|
| $R_2O + RO + B_2O_3$ | 28.95 to 29.65 wt % |
| $(SiO_2 + Al_2O_3)/(R_2O + RO + B_2O_3)$ | 2.35 to 2.41 |

The glass compositions of Table 3 have a log3 forming temperature in the range of 1200 to 1220° C. and a ΔT is in the range of 56 to 69° C.

Table 4 provides glass compositions having ingredients in the following ranges:

| | |
|---|---|
| $SiO_2$ is | 56.25 to 57.75 percent by weight; |
| $Al_2O_3$ is | 12.20 to 13.20 percent by weight; |
| CaO | 23.75 to 24.25 percent by weight; |
| MgO | 2.55 percent by weight; |
| $TiO_2$ | 1.10 percent by weight; |
| $Na_2O$ | 0.90 percent by weight; |
| $Fe_2O_3$ | 0.25 percent by weight, and |
| $B_2O_3$ | 1.30 to 1.40 percent by weight. |

The ranges for the mathematical relationships of the ingredients for the glass compositions of Table 4 from Table 4 are as follows:

| | |
|---|---|
| RO | 26.30 to 26.80 wt % |
| $SiO_2$/CaO | 2.32 to 2.43 |
| $SiO_2$/RO | 2.10 to 2.20 |
| $SiO_2/Al_2O_3$ | 4.26 to 4.73 |
| $Al_2O_3$/CaO | 0.51 to 0.56 |
| $SiO_2 + Al_2O_3$ | 69.45 to 69.95 wt % |
| $SiO_2 - RO$ | 29.45 to 31.45 wt % |
| $Al_2O_3$/RO | 0.46 to 0.50 |
| $R_2O + RO + B_2O_3$ | 28.50 to 29.00 wt % |
| $(SiO_2 + Al_2O_3)/(R_2O + RO + B_2O_3)$ | 2.39 to 2.45. |

The glass compositions of Table 4 have a log3 forming temperature in the range of 1200 to 1218° C. and a ΔT in the range of 55° C. to 70° C.

The glass compositions of Table 5 have the following ingredients in the following ranges:

| | |
|---|---|
| $SiO_2$ | 55.19 to 56.00 percent by weight; |
| $Al_2O_3$ | 13.10 to 13.80 percent by weight; |
| CaO | 24.50 to 24.67 percent by weight; |
| MgO | 2.55 to 2.95 percent by weight; |
| $TiO_2$ | 1.10 percent by weight; |
| $Na_2O$ | 0.45 percent by weight; |
| $K_2O$ | 0.45 to 0.58 percent by weight; |
| $Fe_2O_3$ | 0.25 to 0.38 percent by weight, and |
| $B_2O_3$ | 1.30 percent by weight. |

The ranges for the mathematical relationships of the ingredients of the glass compositions of Table 5 from Table 5 are as follows:

| | |
|---|---|
| RO | 27.08 to 27.45 wt % |
| $SiO_2$/CaO | 2.25 to 2.28 |
| $SiO_2$/RO | 2.01 to 2.07 |
| $SiO_2/Al_2O_3$ | 4.01 to 4.19 |
| $Al_2O_3$/CaO | 0.53 to 0.56 |
| $SiO_2 + Al_2O_3$ | 68.75 to 69.37 wt % |
| $SiO_2 - RO$ | 27.78 to 28.92 wt % |
| $Al_2O_3$/RO | 0.48 to 0.51 |
| $R_2O + RO + B_2O_3$ | 29.28 to 29.74 wt % |
| $(SiO_2 + Al_2O_3)/(R_2O + RO + B_2O_3)$ | 2.31 to 2.37 |

The glass compositions of Table 5 have a log3 forming temperature in the range of 1210 to 1222° C. and a ΔT in the range of 53 to 79° C.

Table 6 provides glass compositions having ingredients in the following ranges:

| | |
|---|---|
| $SiO_2$ | 56.15 to 57.50 percent by weight; |
| $Al_2O_3$ | 13.25 to 13.95 percent by weight; |
| CaO | 24.40 to 24.95 percent by weight; |
| MgO | 2.55 percent by weight; |
| $TiO_2$ | 0.55 percent by weight; |
| $Na_2O$ | 0.90 percent by weight; |
| $Fe_2O_3$ | 0.25 to 0.35 percent by weight, and |
| $B_2O_3$ | 1.30 percent by weight. |

The ranges for the mathematical relationships of the ingredients of the glass compositions of Table 6 from Table 6 are as follows:

| | |
|---|---|
| RO | 26.95 to 27.50 wt % |
| $SiO_2$/CaO | 2.25 to 2.36 |
| $SiO_2$/RO | 2.04 to 2.14 |
| $SiO_2/Al_2O_3$ | 4.01 to 4.66 |
| $Al_2O_3$/CaO | 0.54 to 0.57 |
| $SiO_2 + Al_2O_3$ | 69.50 to 69.99 wt % |
| $SiO_2 - RO$ | 28.65 to 30.65 wt % |
| $Al_2O_3$/RO | 0.46 to 0.51 |
| $R_2O + RO + B_2O_3$ | 29.15 to 29.70 wt % |
| $(SiO_2 + Al_2O_3)/(R_2O + RO + B_2O_3)$ | 2.34 to 2.40. |

The glass compositions of Table 6 have a log3 forming temperature in the range of 1211 to 1220° C. and a ΔT is in the range of 52 to 66° C.

Table 7 provides glass compositions having ingredients in the following ranges:

| | |
|---|---|
| $SiO_2$ | 55.25 to 56.15 percent by weight; |
| $Al_2O_3$ | 13.05 to 13.30 percent by weight; |
| CaO | 23.00 to 24.20 percent by weight; |
| MgO | 2.55 percent by weight; |
| $TiO_2$ | 0.25 to 1.25 percent by weight; |
| $Na_2O$ | 0.90 percent by weight; |
| $Fe_2O_3$ | 0.25 percent by weight; and |
| $B_2O_3$ | 3.00 percent by weight. |

The ranges for the mathematical relationships of the ingredients of the glass compositions of Table 7 from Table 7 are as follows:

| | |
|---|---|
| RO | 25.55 to 26.75 wt % |
| $SiO_2$/CaO | 2.28 to 2.44 |
| $SiO_2$/RO | 2.07 to 2.20 |
| $SiO_2/Al_2O_3$ | 4.15 to 4.30 |
| $Al_2O_3$/CaO | 0.55 to 0.56 |
| $SiO_2 + Al_2O_3$ | 68.20 to 69.20 wt % |
| $SiO_2 - RO$ | 28.45 to 30.60 wt % |
| $Al_2O_3$/RO | 0.50 to 0.51 |
| $R_2O + RO + B_2O_3$ | 29.45 to 30.65 wt % |
| $(SiO_2 + Al_2O_3)/(R_2O + RO + B_2O_3)$ | 2.24 to 2.35 |

The glass compositions of Table 7 have a log3 forming temperature in the range of 1193 to 1212° C. and a ΔT is in the range of 64 to 90° C.

Table 8 provides glass compositions having ingredients in the following ranges:

| | |
|---|---|
| $SiO_2$ | 54.12 to 55.25 percent by weight; |
| $Al_2O_3$ | 13.20 to 13.40 percent by weight; |
| CaO | 24.20 to 24.55 percent by weight; |
| MgO | 2.55 percent by weight; |
| $TiO_2$ | 0.55 percent by weight; |
| $Na_2O$ | 0.45 to 0.50 percent by weight; |
| $K_2O$ | 0.45 to 0.55 percent by weight; |
| $Fe_2O_3$ | 0.25 to 0.28 percent by weight; |
| $B_2O_3$ | 3.00 percent by weight; |
| F | up to 0.20 percent by weight, and |
| SrO | up to 0.12 percent by weight. |

The ranges for the mathematical relationships of the ingredients of the glass compositions of Table 8 from Table 8 are as follows:

| | |
|---|---|
| RO | 26.75 to 27.55 wt % |
| $SiO_2/CaO$ | 2.20 to 2.28 |
| $SiO_2/RO$ | 1.96 to 2.07 |
| $SiO_2/Al_2O_3$ | 4.06 to 4.15 |
| $Al_2O_3/CaO$ | 0.54 to 0.55 |
| $SiO_2 + Al_2O_3$ | 67.55 to 68.55 wt % |
| $SiO_2 - RO$ | 26.57 to 28.30 wt % |
| $Al_2O_3/RO$ | 0.49 to 0.50 |
| $R2O + RO + B_2O_3$ | 30.65 to 31.40 wt % |
| $(SiO_2 + Al_2O_3)/(R2O + RO + B_2O_3)$ | 2.14 to 2.22 |

The glass compositions of Table 8 have a log3 forming temperature in the range of 1190 to 1204° C. and a ΔT is in the range of 55 to 83° C.

Table 9 provides glass compositions having ingredients in the following ranges:

| | |
|---|---|
| $SiO_2$ | 53.00 to 53.50 percent by weight; |
| $Al_2O_3$ | 13.10 to 14.00 percent by weight; |
| CaO | 24.00 percent by weight; |
| MgO | 1.25t 2.50ercent by weight; |
| $TiO_2$ | 0.50 percent by weight; |
| $Na_2O$ | 0.90 percent by weight; |
| $K_2O$ | 0.37 percent by weight; |
| $Fe_2O_3$ | 0.10 percent by weight; |
| $B_2O_3$ | 4.93 to 5.02 percent by weight; |
| F | 0.50 percent by weight; |
| SrO | 0.13 percent by weight, and |
| $Cr_2O_3$ | 0.13 percent by weight. |

The ranges for the mathematical relationships of the ingredients of the glass compositions of Table 9 from Table 9 are as follows:

| | |
|---|---|
| RO | 25.50 to 26.50 wt % |
| $SiO_2/CaO$ | 2.21 to 2.23 |
| $SiO_2/RO$ | 2.00 to 2.10 |
| $SiO_2/Al_2O_3$ | 3.82 to 4.05 |
| $Al_2O_3/CaO$ | 0.55 to 0.58 |
| $SiO_2 + Al_2O_3$ | 66.10 to 67.50 wt % |
| $SiO_2 - RO$ | 26.50 to 28.00 wt % |
| $Al_2O_3/RO$ | 0.49 to 0.55 |
| $R2O + RO + B_2O_3$ | 31.70 to 32.79 wt % |
| $(SiO_2 + Al_2O_3)/(R2O + RO + B_2O_3)$ | 2.02 to 2.13 |

The glass compositions of Table 9 have a log3 forming temperature in the range of 1167 to 1177 and a ΔT is in the range of 57 to 69° C.

Table 10 provides glass compositions having ingredients in the following ranges:

| | |
|---|---|
| $SiO_2$ | 55.40 to 57.75 percent by weight; |
| $Al_2O_3$ | 12.20 to 13.80 percent by weight; |
| CaO | 22.25 to 24.85 percent by weight; |
| MgO | 2.05 to 2.60 percent by weight; |
| $TiO_2$ | 0.50 to 1.10 percent by weight; |
| $Na_2O$ | 0.90 percent by weight; |
| $Fe_2O_3$ | 0.25 percent by weight, and |
| $B_2O_3$ | 1.00 to 3.00 percent by weight. |

The ranges for the mathematical relationships of the ingredients of the glass compositions of Table 10 from Table 10 are as follows:

| | |
|---|---|
| RO | 26.80 to 27.35 wt % |
| $SiO_2/CaO$ | 2.23 to 2.55 |
| $SiO_2/RO$ | 2.05 to 2.27 |
| $SiO_2/Al_2O_3$ | 4.04 to 4.69 |
| $Al_2O_3/CaO$ | 0.51 to 0.59 |
| $SiO_2 + Al_2O_3$ | 69.00 to 70.95 wt % |
| $SiO_2 - RO$ | 28.05 to 32.55 wt % |
| $Al_2O_3/RO$ | 0.46 to 0.53 |
| $R2O + RO + B_2O_3$ | 28.15 to 30.25 wt % |
| $(SiO_2 + Al_2O_3)/(R2O + RO + B_2O_3)$ | 2.28 to 2.67 |

The glass compositions of Table 10 have a log3 forming temperature in the range of 1202 to 1240° C. and a ΔT is in the range of 53 to 100° C.

The glass compositions listed on Table 10 and the glasses within the scope of the embodiment of Table 10 have a forming temperature in the range of 1202 to 1240° C. It should be noted that the measured delta T for Example 91 was 34° C.; it is believed that this is a measuring error the liquidus temperature because the glass composition of Example 90 has similar ingredients, a lower liquidus temperature and a delta T of 100° C. Therefore the delta T of Example 91 is considered to be about 90° C. The preferred glass compositions from Table 10 are those that provide the forming temperature range 1202 to 1219° C. and a delta T greater than 5° C., more particularly Examples 78–91.

The glass compositions of Examples 78–91 of Table 10 from Table 10 have the following ingredients in the following ranges:

| | |
|---|---|
| $SiO_2$ | 55.40 to 56.65 percent by weight; |
| $Al_2O_3$ | 13.05 to 13.80 percent by weight; |
| CaO | 23.00 to 24.85 percent by weight; |
| MgO | 2.50 to 2.55 percent by weight; |
| $TiO_2$ | 0.50 to 1.10 percent by weight; |
| $Na_2O$ | 0.90 percent by weight; |

-continued

| | |
|---|---|
| $Fe_2O_3$ | 0.25 percent by weight, and |
| $B_2O_3$ | 2.00 to 3.00 percent by weight. |

The ranges for the mathematical relationships of the ingredients of the glass compositions of Examples 78–91 of Table 10 from Table 10 are as follows:

| | |
|---|---|
| RO | 25.55 to 27.35 wt % |
| $SiO_2$/CaO | 2.23 to 2.44 |
| $SiO_2$/RO | 2.03 to 2.20 |
| $SiO_2$/$Al_2O_3$ | 4.06 to 4.34 |
| $Al_2O_3$/CaO | 0.54 to 0.57 |
| $SiO_2$ + $Al_2O_3$ | 68.95 to 69.95 wt % |
| $SiO_2$ − RO | 28.05 to 30.60 wt % |
| $Al_2O_3$/RO | 0.49 to 0.53 |
| $R2O$ + RO + $B_2O_3$ | 28.95 to 30.25 wt % |
| ($SiO_2$ + $Al_2O_3$)/ ($R2O$ + RO + $B_2O_3$) | 2.28 to 2.41 |

The glass composition of Examples 78–91 have a log3 forming temperature in the range of 1202 to 1219° C. and a ΔT is in the range of 53 to 100° C.

The glass compositions of Table 11 from Table 11 have the following ingredients in the following ranges:

| | |
|---|---|
| $SiO_2$ | 56.10 to 57.75 percent by weight; |
| $Al_2O_3$ | 12.20 to 13.38 percent by weight; |
| CaO | 23.75 to 24.42 percent by weight; |
| MgO | 2.55 percent by weight; |
| $TiO_2$ | 0.55 to 1.10 percent by weight; |
| $Na_2O$ | 0.90 percent by weight; |
| $Fe_2O_3$ | 0.25 percent by weight; and |
| $B_2O_3$ | 1.30 to 1.40 percent by weight. |

The ranges for the mathematical relationships of the ingredients of the glass compositions of Table 11 from Table 11 are as follows:

| | |
|---|---|
| RO | 26.30 to 26.97 wt % |
| $SiO_2$/CaO | 2.30 to 2.43 |
| $SiO_2$/RO | 2.08 to 2.20 |
| $SiO_2$/$Al_2O_3$ | 4.19 to 4.73 |
| $Al_2O_3$/CaO | 0.51 to 0.54 |
| $SiO_2$ + $Al_2O_3$ | 69.48 to 69.95 wt % |
| $SiO_2$ − RO | 29.13 to 31.45 wt % |
| $Al_2O_3$/RO | 0.46 to 0.50 |
| $R2O$ + RO + $B_2O_3$ | 28.60 to 29.17 wt % |
| ($SiO_2$+ $Al_2O_3$)/ ($R2O$ + RO + $B_2O_3$) | 2.38 to 2.44 |

The glass compositions of Table 11 have a log3 forming temperature in the range of 1215 to 1218° C. and a ΔT in the range of 63° C. to 65° C.

Tables 12 and 13 (Type 3 Glasses) include glass compositions of a quaternary system that includes $SiO_2$ in the range of 55–62 wt %, preferably in the range of 56–61 wt % and more preferably in the range of 57.5–61 wt %; $Al_2O_3$ in the range of 10–14 wt %, preferably in the range of 11–14 wt % and more preferably in the range of 11.75–13.75 wt %; CaO in the range of 20–26 wt %, preferable in the range of 21.50–25.00 wt % and more preferable in the range of 21.75–24.50 wt %, and MgO in the range of 1–4 wt %, preferably in the range of 1.35–3.50 wt % and more preferably in the range of 1.60–3.25 wt %. The compositions of Tables 12 and 13 are boron free. The compositions of Tables 12 and 13 contemplate a $TiO_2$ in the range of 0.25–1.75 wt %, more likely in the range of 0.40–1.60 wt % and most likely more preferably in the range of 0.45–1.55 wt %; $Na_2O$ in amounts up to 0.75 wt %, preferably in amounts up to 0.70 wt % and more preferably in amounts up to 0.65 wt %; $Li_2O$ in amounts in the range of 0.10 to 1.25 wt %, preferably in the range of 0.20 to 1.10 wt %, and more preferably in the range of 0.30 to 1.00 wt %, and $Fe_2O_3$ in the range of up to 0.50 wt %, preferably up to 0.45 wt % and more preferably up to 0.30 wt %.

A glass composition having ingredients of Tables 12 and 13 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 23.50 to 27.50 wt % | 23.75 to 27.00 wt % |
| $SiO_2$/CaO | 2.10 to 2.80 | 2.30 to 2.80 |
| $SiO_2$/RO | 1.90 to 2.55 | 2.10 to 2.55 |
| $SiO_2$/$Al_2O_3$ | 3.70 to 5.00 | 4.20 to 5.00 |
| $Al_2O_3$/CaO | 0.45 to 0.65 | 0.45 to 0.60 |
| $SiO_2$ + $Al_2O_3$ | 66 to 73.7 wt % | 70.8 to 73.7 wt % |
| $R_2O$ + RO | 24.75 to 28 wt % | 25 to 27.75 wt % |
| ($SiO_2$ + $Al_2O_3$)/ ($R_2O$ + RO) | 2.00 to 3.00 | 2.30 to 3.00 |
| $SiO_2$ − RO | 26.5 to 36.6 wt % | 30.50 to 36.6 wt % |
| $Al_2O_3$/RO | 0.40 to 0.60 | 0.46 to 0.53 |

The Type 3 Glasses do not consider the addition of K2O; therefore for Type 3 Glasses R2O is equal to the sum of the wt % of $Na_2O$ and $Li_2O$.

As can be appreciated, each of the Tables 12 and 13 provides ranges for the ingredients and the relationships. More particularly, the glass compositions of Tables 12 and 13 from Tables 12 and 13 have the following ingredients in the following ranges:

| | |
|---|---|
| $SiO_2$ | 57.65 to 60.75 percent by weight; |
| $Al_2O_3$ | 12.00 to 13.64 percent by weight; |
| CaO | 22 to 24.155 percent by weight; |
| MgO | 1.70 to 3.40 percent by weight; |
| $TiO_2$ | 0.50 to 1.50 percent by weight; |
| $Na_2O$ | 0.30 to 0.60 percent by weight; |
| $Li_2O$ | 0.30 to 1.00 percent by weight, and |
| $Fe_2O_3$ | up to 0.25 percent by weight. |

The ranges for the mathematical relationships of the ingredients of the glass compositions of Tables 12 and 13 from Tables 12 and 13 are on Table 21 under the column entitled "Type 3 Glasses". The glass compositions of Tables 12 and 13 have a log3 forming temperature in the range of 1205 to 1240° C., and a ΔT in the range of 50 to 100° C.

The glass compositions of Table 12 from Table 12 have the following ingredients in the following ranges:

| | |
|---|---|
| $SiO_2$ | 58.25 to 59.97 percent by weight; |
| $Al_2O_3$ | 12.19 to 13.64 percent by weight; |
| CaO | 22.04 to 23.65 percent by weight; |
| MgO | 2.50 to 3.12 percent by weight; |
| $TiO_2$ | 0.50 to 1.50 percent by weight; |
| $Na_2O$ | up to 0.30 percent by weight; |

-continued

| | |
|---|---|
| Li$_2$O | 0.90 to 0.91 percent by weight, and |
| Fe$_2$O$_3$ | 0.20 to 0.25 percent by weight. |

The ranges for the mathematical relationships of the ingredients of the glass compositions of Table 12 are as follows:

| | |
|---|---|
| RO | 24.94 to 26.20 wt % |
| SiO$_2$/CaO | 2.47 to 2.72 |
| SiO$_2$/RO | 2.23 to 2.40 |
| SiO$_2$/Al$_2$O$_3$ | 4.31 to 4.92 |
| Al$_2$O$_3$/CaO | 0.55 to 0.59 |
| SiO$_2$ + Al$_2$O$_3$ | 71.55 to 73.03 wt % |
| SiO$_2$ − RO | 32.15 to 34.91 wt % |
| Al$_2$O$_3$/RO | 0.48 to 0.52 |
| R2O + RO | 25.84 to 27.10 wt % |
| (SiO$_2$ + Al$_2$O$_3$)/ (R2O + RO) | 2.64 to 2.79 |

The glass compositions of Table 12 have a log3 forming temperature in the range of 1211° C. and to 1218° C., and a ΔT in the range of 56 to 68° C.

The glass compositions of Table 13 from Table 13 have the following ingredients in the following ranges:

| | |
|---|---|
| SiO$_2$ | 57.65 to 60.75 percent by weight; |
| Al$_2$O$_3$ | 12.00 to 13.40 percent by weight; |
| CaO | 22.00 to 24.15 percent by weight; |
| MgO | 1.70 to 3.12 percent by weight; |
| TiO$_2$ | 0.50 to 1.50 percent by weight; |
| Na$_2$O | 0.45 to 0.90 percent by weight; |
| Li$_2$O | 0.45 to 1.00 percent by weight, and |
| Fe$_2$O$_3$ | up to 0.25 percent by weight. |

The ranges for the mathematical relationships of the ingredients of the glass compositions of Table 13 from Table 13 is as follows:

| | |
|---|---|
| RO | 24.25 to 26.70 wt % |
| SiO$_2$/CaO | 2.39 to 2.72 |
| SiO$_2$/RO | 2.16 to 2.51 |
| SiO$_2$/Al$_2$O$_3$ | 4.30 to 4.92 |
| Al$_2$O$_3$/CaO | 0.50 to 0.59 |
| SiO$_2$ + Al$_2$O$_3$ | 71.05 to 73.67 wt % |
| SiO$_2$ − RO | 31.35 to 36.56 wt % |
| Al$_2$O$_3$/RO | 0.47 to 0.55 |
| R2O + RO | 24.91 to 27.90 wt % |
| (SiO$_2$ + Al$_2$O$_3$)/ (R2O + RO) | 2.30 to 2.96 |

The glass compositions have a log3 forming temperature in the range of 1205 to 1240° C. and a ΔT are in the range of 50 to 101° C.

The glass compositions listed on Table 13 and the glasses within the scope of the embodiment of Table 13 have a forming temperature in the range of 1205 to 1240° C. and a delta T in the range of 50–100° C.; however the preferred glass compositions from Table 13 are those that provide the forming temperature range of 1205 to 1220° C. and more preferably in the range of 1205–1218° C. more particularly Examples 123,124,125,127–132, 147, 153, 155, 157, 160 and 161 with the appropriate delta T, e.g. 50° C. or greater.

The glass compositions of Examples 123,124,125, 127–132,147,153, 155, 157, 160 and 161 from Table 13 have the following ingredients in the following ranges:

| | |
|---|---|
| SiO$_2$ | 57.65 to 60.33 percent by weight; |
| Al$_2$O$_3$ | 12.22 to 13.40 percent by weight; |
| CaO | 22.00 to 24.15 percent by weight; |
| MgO | 2.30 to 3.40 percent by weight; |
| TiO$_2$ | 0.50 to 1.50 percent by weight; |
| Na$_2$O | up to 0.45 percent by weight; |
| Li$_2$O | 0.45 to 1.00 percent by weight, and |
| Fe$_2$O$_3$ | up to 0.25 percent by weight. |

The ranges for the mathematical relationships of the ingredients of Examples 123,124,125,127–132, 147, 153, 155, 157, 160 and 161 from Table 13 are as follows:

| | |
|---|---|
| RO | 24.84 to 26.70 wt % |
| SiO$_2$/CaO | 2.39 to 2.72 |
| SiO$_2$/RO | 2.16 to 2.42 |
| SiO$_2$/Al$_2$O$_3$ | 4.30 to 4.92 |
| Al$_2$O$_3$/CaO | 0.52 to 0.59 |
| SiO$_2$ + Al$_2$O$_3$ | 71.05 to 72.80 wt % |
| SiO$_2$ − RO | 31.35 to 35.37 wt % |
| Al$_2$O$_3$/RO | 0.47 to 0.52 |
| R2O + RO | 25.74 to 27.60 wt % |
| (SiO$_2$ + Al$_2$O$_3$)/ (R2O + RO) | 2.30 to 2.81 |

The glass compositions have a log3 forming temperature in the range of 1205 to 1220° C. and in the range of 1205 to 1218° C., and a ΔT in the range of equal to and greater than 50° C. and equal to and less than 60° C.

The selection of the above examples is made based on the low forming temperature. As can be appreciated, if a high delta T is of interest then Examples 135–141, for example, would be of interest because they have a delta T in the range of 77–100° C.

The glass compositions of Examples 135–141 from Table 13 have the follow ingredients in the following ranges:

| | |
|---|---|
| SiO$_2$ | 59.55 to 60.57 percent by weight; |
| Al$_2$O$_3$ | 12.25 to 13.10 percent by weight; |
| CaO | 22.31 to 23.85 percent by weight; |
| MgO | 1.70 to 3.10 percent by weight; |
| Na2O | up to 0.30 percent by weight |
| TiO$_2$ | 1.10 percent by weight, and |
| Li$_2$O | up to 0.60 percent by weight. |

The ranges for the mathematical relationships of the ingredients of Examples 135–141 from Table 13 is as follows:

| | |
|---|---|
| RO | 24.01 to 25.95 wt % |
| SiO$_2$/CaO | 2.50 to 2.71 |
| SiO$_2$/RO | 2.29 to 2.52 |
| SiO$_2$/Al$_2$O$_3$ | 4.62 to 4.88 |
| Al$_2$O$_3$/CaO | 0.52 to 0.59 |
| SiO$_2$ + Al$_2$O$_3$ | 71.80 to 73.67 wt % |
| SiO$_2$ − RO | 33.60 to 36.56 wt % |
| Al$_2$O$_3$/RO | 0.47 to 0.55 |
| R2O + RO | 24.91 to 26.85 wt % |
| (SiO$_2$ + Al$_2$O$_3$)/ (R2O + RO) | 2.67 to 2.96 |

The glass compositions have a log3 forming temperature in the range of 1234 to 1240° C., and a ΔT is in the range of 61 to 100° C.

Tables 14 and 15 (Type 4 Glasses) include glass compositions of a quaternary system that includes $SiO_2$ in the range of 55–62 wt %, preferably in the range of 56–61 wt % and more preferable in the range of 57–60 wt %; $Al_2O_3$ in the range of 10–14 wt %, preferably in the range of 11–14 wt % and more preferably in the range of 12–13.75 wt %; CaO in the range of 21–26 wt %, preferable in the range of 21.5–25.00 wt % and more preferable in the range of 21.75–24.50 wt %, and MgO in the range of 1–3.25 wt %, preferably in the range of 1.50–3.00 wt % and more preferably in the range of 1.75–2.75 wt %. The compositions of Tables 14 and 15 are boron free. The compositions of Tables 14 and 15 contemplate $TiO_2$ in the range of 0.25–1.75 wt %, more likely in the range of 0.40–1.50 wt % and most likely in the range of 0.45–1.25 wt %; $Li_2O$ in amounts in the range of 0.25 to 1.25 wt %, preferably in the range of 0.30 to 1.10 wt %, and more preferably in the range of 0.40 to 1.00 wt %, ZnO in amounts in the range of 0.25 to 1.25 wt %, preferably in the range of 0.30 to 1.15 wt %, and more preferably in the range of 0.40 to 1.10 wt %, and $Fe_2O_3$ in the range of up to 0.50 wt %, preferably up to 0.35 wt % and more preferably up to 0.30 wt %.

A glass composition having ingredients of Tables 14 and 15 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 24 to 28 wt % | 25.25 to 27.00 wt % |
| $SiO_2$/CaO | 2.10 to 2.80 | 2.30 to 2.60 |
| $SiO_2$/RO | 1.90 to 2.55 | 2.10 to 2.55 |
| $SiO_2$/$Al_2O_3$ | 3.70 to 5.00 | 4.20 to 5.00 |
| $Al_2O_3$/CaO | 0.45 to 0.65 | 0.50 to 0.60 |
| $SiO_2$ + $Al_2O_3$ | 68 to 73.7 wt % | 70.8 to 72 wt % |
| $R_2O$ + RO | 25 to 30 wt % | 26.0 to 28 wt % |
| ($SiO_2$ + $Al_2O_3$)/ ($R_2O$ + RO) | 2.00 to 3.00 | 2.30 to 3.00 |
| $SiO_2$ – RO | 26.5 to 36.60 wt % | 30.5 to 36.60 wt % |
| $Al_2O_3$/RO | 0.40 to 0.60 | 0.46 to 0.53 |

The Type 4 Glasses are shown only to have $Li_2O$; therefore for Type 4 Glasses R2O is equal to the wt % of $Li_2O$.

As can be appreciated, each of the Tables 14 and 15 provides ranges for the ingredients and the relationships. More particularly, the glass compositions of Tables 14 and 15 from Tables 14 and 15 have the following ingredients in the following ranges:

| | |
|---|---|
| $SiO_2$ | 57.35 to 59.618.30 percent by weight; |
| $Al_2O_3$ | 12.16 to 13.63 percent by weight; |
| CaO | 22.85 to 24.22 percent by weight; |
| MgO | 1.90 to 2.55 percent by weight; |
| $TiO_2$ | 0.50 to 1.10 percent by weight; |
| $Li_2O$ | 0.45 to 0.90 percent by weight; |
| ZnO | 0.45 to 1.00 percent by weight, and |
| $Fe_2O_3$ | up to 0.25 percent by weight. | in the range of 1195 to 1229° C., and a ΔT is in the range of 54 to 71° C. The ranges for the mathematical relationships of the ingredients of the glass compositions of Tables 14 and 15 are found on Table 21 under the column entitled "Type 4 Glasses". The glass compositions have a log3 forming temperature.

The glass compositions of Table 14 from Table 14 have the following ingredients in the following ranges:

| | |
|---|---|
| $SiO_2$ | 58.00 to 58.30 percent by weight; |
| $Al_2O_3$ | 13.03 to 13.33 percent by weight; |
| CaO | 22.85 to 23.84 percent by weight; |
| MgO | 2.50 to 2.55 percent by weight; |
| $TiO_2$ | 0.50 to 1.10 percent by weight; |
| $Li_2O$ | 0.90 percent by weight; |
| ZnO | 1.00 percent by weight, and |
| $Fe_2O_3$ | up to 0.25 percent by weight. |

The ranges for the mathematical relationships of the ingredients of the glass compositions of Table 14 from Table 14 are as follows:

| | |
|---|---|
| RO | 25.40 to 26.34 wt % |
| $SiO_2$/CaO | 2.43 to 2.54 |
| $SiO2$/RO | 2.20 to 2.29 |
| $SiO_2$/$Al_2O_3$ | 4.36 to 4.47 |
| $Al_2O_3$/CaO | 0.55 to 0.58 |
| $SiO_2$ + $Al_2O_3$ | 71.13 to 71.58 wt % |
| $SiO_2$ – RO | 31.66 to 32.75 wt % |
| $Al_2O_3$/RO | 0.49 to 0.52 |
| R2O + RO | 26.30 to 27.24 wt % |
| ($SiO_2$ + $Al_2O_3$)/ (R2O + RO) | 2.61 to 2.71 |

The glass compositions have a log3 forming temperature in the range of 1204 to 1213° C., and a ΔT in the range of 56 to 71° C.

The glass compositions of Table 15 from Table 15 have the following ingredients in the following ranges:

| | |
|---|---|
| $SiO_2$ | 57.35 to 59.61 percent by weight; |
| $Al_2O_3$ | 12.16 to 13.63 percent by weight; |
| CaO | 23.14 to 24.22 percent by weight; |
| MgO | 1.90 to 2.55 percent by weight; |
| $TiO_2$ | 0.50 to 1.10 percent by weight; |
| $Li_2O$ | 0.45 to 0.90 percent by weight; |
| ZnO | 0.45 to 1.00 percent by weight, and |
| $Fe_2O_3$ | up to 0.25 percent by weight. |

The ranges for the mathematical relationships of the ingredients of the glass compositions of Table 15 from Table 15 are as follows:

| | |
|---|---|
| RO | 25.64 to 26.60 wt % |
| $SiO_2$/CaO | 2.41 to 2.54 |
| $SiO2$/RO | 2.18 to 2.29 |
| $SiO_2$/$Al_2O_3$ | 4.26 to 4.90 |
| $Al_2O_3$/CaO | 0.50 to 0.59 |
| $SiO_2$ + $Al_2O_3$ | 70.55 to 71.77 wt % |
| $SiO_2$ – RO | 31.15 to 33.61 wt % |
| $Al_2O_3$/RO | 0.47 to 0.53 |
| R2O + RO | 26.45 to 27.50 wt % |
| ($SiO_2$ + $Al_2O_3$)/ (R2O + RO) | 2.60 to 2.71 |

The glass compositions of Table 15 have a log3 forming temperature in the range of 1195 to 1229° C., and a ΔT in the range of 54 to 59° C.

Table 16 (Type 5 Glasses) include glass compositions of a quaternary system that includes $SiO_2$ in the range of 55–62 wt %, preferably in the range of 56–61 wt % and preferable in the range of 58–60 wt %; $Al_2O_3$ in the range of 10–14 wt %, preferably in the range of 11.00–13.5 wt % and more preferably in the range of 11.75–13.25 wt %; CaO in the range of 21–25 wt %, preferable in the range of 21.25–24.00 wt % and more preferable in the range of 21.25–23.00 wt %, and MgO in the range of 1–4.00 wt %, preferably in the range of 1.25–3.50 wt % and more preferably in the range of 1.50–3.50 wt %. The compositions of Table 16 are boron free. The compositions of Table 16 contemplate $TiO_2$ in the range of 0.50–2.00 wt %, more likely in the range of 0.50–1.50 wt % and more preferably in the range of 0.75–1.25 wt %; $Na_2O$ in amounts in no greater than 2.00 wt %; preferably no greater than 1.50 wt %, and more preferably no greater than 1.25 wt %; ZnO in amounts in the range of 0.50 to 3.00 wt %, preferably in the range of 0.50 to 2.75 wt %, and more preferably in the range of 0.75 to 2.50 wt %, and $Fe_2O_3$ in the range of up to 0.50 wt %, preferably in the range of up to 0.35 wt % and more preferably in the range of up to 0.30 wt %.

A glass composition having ingredients of Table 16 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 23 to 28 wt % | 24.0 to 27.0 wt % |
| $SiO_2$/CaO | 2.10 to 2.80 | 2.30 to 2.80 |
| $SiO_2$/RO | 1.90 to 2.55 | 2.10 to 2.55 |
| $SiO_2$/$Al_2O_3$ | 3.70 to 5.00 | 4.20 to 5.00 |
| $Al_2O_3$/CaO | 0.45 to 0.65 | 0.45 to 0.60 |
| $SiO_2$ + $Al_2O_3$ | 66 to 73.7 wt % | 70.8 to 73.7 wt % |
| $R_2O$ + RO | 25 to 28 wt % | 26.0 to 27.0 wt % |
| ($SiO_2$ + $Al_2O_3$)/ ($R_2O$ + RO) | 2.00 to 3.00 | 2.30 to 3.0 |
| $SiO_2$ – RO | 30 to 39 wt % | 31.50 to 37 wt % |
| $Al_2O_3$/RO | 0.40 to 0.60 | 0.46 o 0.53 |

Type 5 Glasses were considered having $Na_2O$; therefore R2O is equal to the sum of $Na_2O$ in wt %.

As can be appreciated, Table 16 provides ranges for the ingredients and the relationships. More particularly, the glass compositions of Table 16 from Table 16 have the following ingredients in the following ranges:

| | |
|---|---|
| $SiO_2$ | 58.70 to 59.00 percent by weight; |
| $Al_2O_3$ | 11.90 to 12.00 percent by weight; |
| CaO | 22.40 to 22.50 percent by weight; |
| MgO | 3.40 percent by weight; |
| $TiO_2$ | 1.00 percent by weight; |
| $Na_2O$ | 0.90 percent by weight; |
| ZnO | 1.00 to 1.50 percent by weight, and |
| $Fe_2O_3$ | up to 0.20 percent by weight. |

The ranges for the mathematical relationships of the ingredients of the glass compositions of Table 18 from Table 16 are on Table 21 under the column entitled "Type 5 Glasses". The glass compositions of Table 16 have a log3 forming temperature in the range of 1231 to 1234° C., and a ΔT in the range of 50 to 59° C.

Tables 17 and 18 (Type 6 Glasses) include glass compositions of a quaternary system that includes $SiO_2$ in the range of 50–62 wt %, preferably in the range of 52–61 wt % and more preferable in the range of 53.50–60.25 wt %; $Al_2O_3$ in the range of 10–14 wt %, preferably in the range of 11.00–14.00 wt % and more preferably in the range of 11.90–13.75 wt %; CaO in the range of 21–26 wt %, preferable in the range of 22.00–25.00 wt % and more preferable in the range of 22.50–24.25 wt %, and MgO in the range of 1–4.00 wt %, preferably in the range of 1.50–3.00 wt % and more preferably in the range of 2.25–2.75 wt %. The compositions of Tables 17 and 18 have $B_2O_3$ in the range of 0.50–5.00 wt %, preferably in the range of 0.50–4.00 and more preferably in the range of 0.75–3.25 wt %. The compositions of Tables 17 and 18 contemplate further include $TiO_2$ in the range of 0.25–2.00 wt %, more likely in the range of 0.35–1.50 wt % and most likely in the range of 0.40–1.25 wt %; $Na_2O$ in amounts no greater than 1.00 wt %; preferably no greater than 0.90 wt %, and more preferably no greater than 0.75 wt %; $K_2O$ in amounts no greater than 0.50 wt %; preferably no greater than 0.35 wt %, and more preferably no greater than 0.20 wt %; $Li_2O$ in amounts in the range of 0.10 to 1.25 wt %, preferably in the range of 0.20 to 1.10 wt %, and more preferably in the range of 0.25 to 1.00 wt %, and $Fe_2O_3$ in the range of 0.10–0.50 wt %, preferably in the range of 0.15–0.50 wt % and more preferably in the range of 0.20–0.40 wt %.

A glass composition having ingredients of Tables 17 and 18 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 24 to 28 wt % | 25.0 to 27.20 wt % |
| $SiO_2$/CaO | 2.10 to 2.80 | 2.20 to 2.70 |
| $SiO_2$/RO | 1.90 to 2.55 | 1.90 to 2.40 |
| $SiO_2$/$Al_2O_3$ | 3.50 to 5.00 | 4.00 to 5.00 |
| $Al_2O_3$/CaO | 0.50 to 0.60 | 0.50 to 0.60 |
| $SiO_2$ + $Al_2O_3$ | 66 to 73.7 wt % | 67 to 72.1 wt % |
| $R_2O$ + RO + $B_2O_3$ | 25 to 32 wt % | 26.50 to 32 wt % |
| ($SiO_2$ + $Al_2O_3$)/ ($R_2O$ + RO + $B_2O_3$) | 2.00 to 3.25 | 2.30 to 3.00 |
| $SiO_2$ – RO | 26.5 to 36.6 wt % | 27 to 36.6 wt % |
| $Al_2O_3$/RO | 0.40 to 0.60 | 0.46 to 0.56 |

Type 6 Glasses of Tables 17 and 18 included $Li_2O$, $K_2O$ and $Na_2O$: therefore R2O is equal to the sum in wt % of $Li_2O$, $K_2O$ and $Na_2O$. Individual Table 17 includes $Li_2O$ and $Na_2O$; therefore R2O for Table 17 is equal to the sum in wt % of $Li_2O$ and $Na_2O$. Individual Table 18 includes $Li_2O$, $K_2O$ and $Na_2O$; therefore R2O for Table 18 is equal to the sum in wt % of $Li_2O$, $K_2O$ and $Na_2O$.

As can be appreciated, Tables 17 and 18 provide ranges for the ingredients and the relationships. More particularly, the glass compositions of Tables 17 and 18 have the following ingredients in the following ranges:

| | |
|---|---|
| $SiO_2$ | 54.60 to 59.53 percent by weight; |
| $Al_2O_3$ | 12.16 to 13.63 percent by weight; |
| CaO | 22.87 to 24.05 percent by weight; |
| MgO | 2.00 to 2.55 percent by weight; |
| $TiO_2$ | 0.49 to 1.10 percent by weight; |
| $Na_2O$ | 0 to 0.60 percent by weight; |
| $K_2O$ | 0 to 0.10 percent by weight; |
| $Li_2O$ | 0.30 to 0.91 percent by weight; |
| $Fe_2O_3$ | 0.23 to 0.30 percent by weight, and |
| $B_2O_3$ | 0.90 to 3.00 percent by weight. |

The ranges for the mathematical relationships of the ingredients of the glass compositions of Tables 17 and 18 are on Table 21 under the column entitled "Type 6 Glasses". The glass compositions of Table 17 and 18 have a log3 forming temperature in the range of 1187 to 1239° C., and a ΔT in the range of 50 to 142° C.

The glass compositions of Table 17 have the following ingredients in the following ranges:

| | |
|---|---|
| $SiO_2$ | 57.60 to 58.50 percent by weight; |
| $Al_2O_3$ | 12.76 to 13.43 percent by weight; |
| CaO | 23.40 to 23.84 percent by weight; |
| MgO | 2.50 percent by weight; |
| $TiO_2$ | 0.50 percent by weight; |
| $Na_2O$ | up to 0.60 percent by weight; |
| $Li_2O$ | 0.90 percent by weight; |
| $Fe_2O_3$ | 0.23 percent by weight, and |
| $B_2O_3$ | 1.00 to 1.20 percent by weight. |

The ranges for the mathematical relationships of the ingredients of the glass compositions of Tables 17 are as follows:

| | |
|---|---|
| RO | 25.90 to 26.34 wt % |
| $SiO_2$/CaO | 2.42 to 2.48 |
| $SiO_2$/RO | 2.19 to 2.24 |
| $SiO_2$/$Al_2O_3$ | 4.30 to 4.47 |
| $Al_2O_3$/CaO | 0.54 to 0.57 |
| $SiO_2$ + $Al_2O_3$ | 70.83 to 71.47 wt % |
| $SiO_2$ − RO | 31.26 to 32.39 wt % |
| $Al_2O_3$/RO | 0.49 to 0.52 |
| R2O + RO + $B_2O_3$ | 27.80 to 28.44 wt % |
| ($SiO_2$ + $Al_2O_3$)/ (R2O + RO + $B_2O_3$) | 2.49 to 2.57 |

Type 6 Glasses of Table 17 included $Li_2O$, $K_2O$ and $Na_2O$; therefore R2O is equal to the sum in wt % of $Li_2O$, $K_2O$ and $Na_2O$.

The glass compositions of Table 17 have a log3 forming temperature in the range of 1192 to 1198° C., and a $\Delta T$ in the range of 55 to 63° C.

The glass compositions of Table 18 have the following ingredients in the following ranges:

| | |
|---|---|
| $SiO_2$ | 54.60 to 59.53 percent by weight; |
| $Al_2O_3$ | 12.16 to 13.63 percent by weight; |
| CaO | 22.93 to 24.05 percent by weight; |
| MgO | 2.00 to 2.55 percent by weight; |
| $TiO_2$ | 0.49 to 1.10 percent by weight; |
| $Na_2O$ | up to 0.60 percent by weight; |
| $K_2O$ | up to 0.10 percent by weight; |
| $Li_2O$ | 0.30 to 0.91 percent by weight; |
| $Fe_2O_3$ | 0.23 to 0.35 percent by weight, and |
| $B_2O_3$ | 0.60 to 3.00 percent by weight. |

The ranges for the mathematical relationships of the ingredients of the glass compositions of Tables 17 are as follows:

| | |
|---|---|
| RO | 25.80 to 26.60 wt % |
| $SiO_2$/CaO | 2.22 to 2.66 |
| $SiO_2$/RO | 2.01 to 2.39 |
| $SiO_2$/$Al_2O_3$ | 4.09 to 4.90 |
| $Al_2O_3$/CaO | 0.51 to 0.59 |
| $SiO_2$/$Al_2O_3$ | 67.95 to 72.05 wt % |
| $SiO_2$ − RO | 27.50 to 33.84 wt % |
| $Al_2O_3$/RO | 0.46 to 0.53 |
| R2O + RO + $B_2O_3$ | 26.70 to 31.10 wt % |
| ($SiO_2$ + $Al_2O_3$)/ (R2O + RO + $B_2O_3$) | 2.18 to 2.68 |

The glass compositions of Table 18 have a log3 forming temperature in the range of 1187 to 1239° C., and a $\Delta T$ in the range of 50 to 42° C.

The glass compositions listed on Table 18 and the glasses within the scope of the embodiment of Table 18 have a forming temperature in the range of 1187 to 1239° C. and a delta T in the range of 50–142° C.; however the preferred glass compositions from Table 18 are those that provide the forming temperature range 1187 to 1220° C. (Examples 188–213, 215–229, 213–235, 238–240, 242–260 and 262–267) and more preferably in the range of 1187–1205° C. (Examples 188–191, 194, 195, 198, 200, 201, 202–205, 208, 209, 211–213, 215–219, 221–223, 225–229, 233–235, 239, 242, 257 and 260).

A glass composition having the ingredients in the ranges mentioned above for Table 18 and having the following relationships will provide glass compositions having a log3 forming temperature in the range of 1187 to 1220° C., and a $\Delta T$ is in the range of 50 to 139° C.:

| | |
|---|---|
| RO | 25.80 to 26.60 wt % |
| $SiO_2$/CaO | 2.22 to 2.66 |
| $SiO_2$/RO | 2.01 to 2.39 |
| $SiO_2$/$Al_2O_3$ | 4.09 to 4.87 |
| $Al_2O_3$/CaO | 0.51 to 0.59 |
| $SiO_2$ + $Al_2O_3$ | 67.95 to 72.05 wt % |
| $SiO_2$ − RO | 27.50 to 33.84 wt % |
| $Al_2O_3$/RO | 0.46 to 0.53 |
| R2O + RO + $B_2O_3$ | 26.70 to 31.10 wt % |
| ($SiO_2$ + $Al_2O_3$)/ (R2O + RO + $B_2O_3$) | 2.18 to 2.68 |

The glass compositions from Table 18 having a log3 forming temperature in the range of 1187 to 1205° C., and a $\Delta T$ in the range of 50 to 124° C. have the following ingredients and the following ranges:

| | |
|---|---|
| $SiO_2$ | 57.60 to 59.21 percent by weight; |
| $Al_2O_3$ | 12.16 to 13.63 percent by weight; |
| CaO | 22.87 to 24.06 percent by weight; |
| MgO | 2.36 to 2.50 percent by weight; |
| $TiO_2$ | 0.49 to 1.10 percent by weight; |
| $Na_2O$ | up to 0.30 percent by weight; |
| $K_2O$ | up to 0.09 percent by weight; |
| $Li_2O$ | 0.70 to 0.90 percent by weight; |
| $Fe_2O_3$ | 0.23 to 0.29 percent by weight, and |
| $B_2O_3$ | 1.00 to 1.20 percent by weight; |

And the following relationships:

| | |
|---|---|
| RO | 25.23 to 26.54 wt % |
| $SiO_2$/CaO | 2.40 to 2.57 |
| $SiO_2$/RO | 2.17 to 2.32 |
| $SiO_2$/$Al_2O_3$ | 4.26 to 4.87 |
| $Al_2O_3$/CaO | 0.52 to 0.59 |
| $SiO_2$ + $Al_2O_3$ | 70.63 to 71.73 wt % |
| $SiO_2$ − RO | 31.06 to 33.61 wt % |
| $Al_2O_3$/RO | 0.47 to 0.53 |
| R2O + RO + $B_2O_3$ | 27.23 to 28.64 wt % |
| ($SiO_2$ + $Al_2O_3$)/ (R2O + RO + $B_2O_3$) | 2.47 to 2.63 |

The selection of these examples is made based on the low forming temperature. Further examples 266–268 are glass compositions that have a low forming temperature with 0.30 wt % $Li_2O$. Examples 265–268 define a range of ingredients and relationship of the ingredients to provide a low $Li_2O$ containing glass with low forming temperature. As can be appreciated and as previously discussed, if a high delta T is of interest then Examples from Table 18 have a high delta T, e.g. above 75° C. may be selected to define glass compositions.

Table 19 (Type 7 Misc. Glasses) includes glass compositions of a quaternary system that includes $SiO_2$ in the range of 56–60 wt %, preferably in the range of 57–59 wt % and more preferable in the range of 57.50–59 wt %; $Al_2O_3$ in the range of 10–14 wt %, preferably in the range of 11.00–14.00 wt % and more preferably in the range of 11.50–14.00 wt %; CaO in the range of 21–25 wt %, preferable in the range of 22.00–24.00 wt % and more preferable in the range of 22.50–24.00 wt %, and MgO in the range of 2.004.00 wt %, preferably in the range of 2.00–3.00 wt % and more preferably in the range of 2.25–2.75 wt %. The compositions of Table 19 include $B_2O_3$ in the range of 0–1.50 wt %, preferably in the range of 0–1.25 wt % and more preferably in the range of 0–1.10 wt %. The compositions of Table 19 contemplates further includes $TiO_2$ in the range of 0.25–1.50 wt %, more likely preferably in the range of 0.25–1.35 wt % and most likely in the range of 0.40–1.25 wt %; $Na_2O$ in amounts no greater than 1.25 wt %; preferably no greater than 1.10 wt %, and more preferably no greater than 1.00 wt % o; ZnO in amounts no greater than 0.50 wt %; preferably no greater than 0.40 wt %, and more preferably no greater than 0.35 wt %; MnO in amounts no greater than 4.00 wt %; preferably no greater than 3.50 wt %, and more preferably no greater than 3.25 wt %; $MnO_2$ in amounts no greater than 4.00 wt %; preferably no greater than 3.50 wt %, and more preferably no greater than 3.25 wt %, and $Fe_2O_3$ in the range of 0.10–0.50 wt %, preferably in the range of 0.15–0.50 wt % and more preferably in the range of 0.20–0.40 wt %.

A glass composition having ingredients of Tables 19 within the above ranges and at least one of the following relationships provides a glass composition having a forming temperature below 1240° C. and a delta T of greater than 50° C.:

| Relationship | Broad Range | Preferred Range |
|---|---|---|
| RO (CaO + MgO) | 24 to 27 wt % | 25.00 to 26.50 wt % |
| $SiO_2$/CaO | 2.10 to 2.80 | 2.20 to 2.70 |
| $SiO_2$/RO | 1.90 to 2.55 | 1.90 to 2.40 |
| $SiO_2$/$Al_2O_3$ | 3.70 to 5.00 | 3.70 to 4.90 |
| $Al_2O_3$/CaO | 0.45 to 0.65 | 0.55 to 0.60 |
| $SiO_2$ + $Al_2O_3$ | 66 to 73.7 wt % | 66 to 72.1 wt % |
| $R_2O$ + RO + $B_2O_3$ | 25 to 28 wt % | 25.75 to 27.50 wt % |
| ($SiO_2$ + $Al_2O_3$)/ ($R_2O$ + RO + $B_2O_3$) | 2.00 to 3.00 | 2.00 to 2.75 |
| $SiO_2$ − RO | 26.50 to 36.6 wt % | 26.5 to 34.00 wt % |
| $Al_2O_3$/RO | 0.40 to 0.60 | 0.46 to 0.56 |

The Misc. Glasses included $Li_2O$ and $Na_2O$; therefore R2O is equal to the sum in wt % of $Li_2O$ and $Na_2O$.

Table 19 provides the following ranges for the following ingredients:

| | |
|---|---|
| $SiO_2$ | 57.72 to 58.70 percent by weight; |
| $Al_2O_3$ | 11.88 to 13.35 percent by weight; |
| CaO | 22.80 to 23.50 percent by weight; |
| MgO | 2.43 to 2.50 percent by weight; |
| $TiO_2$ | 0.50 to 1.10 percent by weight; |
| $Na_2O_3$ | 0.87–0.90 percent by weight; |
| Li2O | 0 to 0.30 percent by weight; |
| ZnO | 0 to 0.30 percent by weight; |
| $Fe_2O_3$ | 0.22–0.25 percent by weight; |
| MnO | 0.30 to 3.00 percent by weight; |
| $MnO_2$ | 0 to 3.00 percent by weight, and |
| $B_2O_3$ | 0 to 1.00 percent by weight. |

The relationships for the ingredients of the glass compositions on Table 19 are as follows:

| | |
|---|---|
| RO | 25.23 to 26.00 wt % |
| $SiO_2$/CaO | 2.49 to 2.54 |
| $SiO_2$/RO | 2.25 to 2.29 |
| $SiO_2$/$Al_2O_3$ | 4.40 to 4.90 |
| $Al_2O_3$/CaO | 0.52 to 0.57 |
| $SiO_2$ + $Al_2O_3$ | 69.52 to 72.05 wt % |
| $SiO_2$ − RO | 32.40 to 32.70 wt % |
| $Al_2O_3$/RO | 0.47 to 0.51 |
| R2O + RO + $B_2O_3$ | 26.10 to 27.30 wt % |
| ($SiO_2$ + $Al_2O_3$)/ (R2O + RO + $B_2O_3$) | 2.59 to 2.74 |

The glass compositions have a log3 forming temperature of in the range of 1219 to 1241° C., and a ΔT in the range of 52 to 76° C.

Table 20 (Production Glasses) Table 20 is a representation of commercial glasses having embodiments of the invention similar to the embodiment of the glass compositions of Table 4. The glass compositions are of a quaternary system that includes $SiO_2$ in the range of 55.97–57.07 wt %; $Al_2O_3$ in the range of 12.68–12.86 wt %; CaO in the range of 23.91–24.69 wt % and MgO in the range of 2.42–2.60 wt %. The compositions of Table 20 include $B_2O_3$ in the range of 1.15–1.70 wt %; $TiO_2$ in the range of 0.94–1.09 wt %; $Na_2O$ in the range of 0.87–0.93 wt %; K2O in the range of greater than 0.050–0.070 wt %; SrO in the range of 0.040–0.050 wt %; $Cr_2O_3$ in the range of 0.002–0.008 wt %; $SO_3$ in the range of 0.018–0.032 wt %, and $Fe_2O_3$ in the range of 0.255–0.278 wt %.

A glass composition having ingredients of Tables 20 within the above ranges and at least one of the following relationships provides a glass composition having a forming temperature in the range of 1203–1217° C. and a delta T in the range of 55–83° C. Several of the glass compositions do not have the forming and liquidus temperatures, and the delta T. The glass compositions without the temperatures and delta T were glass compositions made between glass compositions whose forming temperature, liquidus temperature and delta T were measured. As indicated by the position on the Table which is in general in chronological order, it is expected that the glass compositions not measured would have temperature performances similar to those that were measured. The mathematical relationships of the ingredients of the glass compositions on Table 20 are listed on Table 22 in the column entitled "Production Glasses (contain boron)". The R2O from the listed Production Glasses is equal to the sum in wt % of $Li_2O$ and $Na_2O$.

As can now be appreciated, a range for each of the ingredients of the glass compositions of Types 1 and 2 glasses (Tables 2–11) can be determined from Tables. More particularly, Tables 1 and 2 provide a quaternary system including $SiO_2$, $Al_2O_3$, CaO and MgO and the ingredients of the glass having the relationship as shown in Table 22 under the column entitled "Types 1 & 2 Glasses". Types 1 & 2 Glasses included $K_2O$ and $Na_2O$; therefore R2O is equal to the sum in wt % of $K_2O$ and $Na_2O$.

The glass compositions having the following ingredients in the following ranges has a log3 forming temperature in the range of 1167 to 1240° C. and a ΔT in the range of 50 to 100° C.:

| | |
|---|---|
| $SiO_2$ | 53.00. to 59.05 percent by weight; |
| $Al_2O_3$ | 12.20 to 14.00 percent by weight; |

-continued

| | |
|---|---|
| CaO | 22.25 to 24.95 percent by weight, and |
| MgO | 1.50 to 3.00 percent by weight, and | composition may further include:

| | |
|---|---|
| $TiO_2$ | 0.50 to 1.10 percent by weight; |
| $Na_2O$ | 0.45 to 0.90 percent by weight; |
| $K_2O$ | 0 to 0.58 percent by weight; |
| $Fe_2O_3$ | 0 to 0.50 percent by weight, and |
| $B_2O_3$ | 0 to 5.02 percent by weight. |

Further as can be appreciated, a range for each of the ingredients for Type 3–6 glasses on Tables 12–19 can be determined by selecting the lowest and highest values to define the range for an ingredient and/or relationship on Tables 12–19. More particularly Tables 12–19 provide glass compositions having a quaternary system including $SiO_2$, $Al_2O_3$, CaO and MgO with the ingredients of the glass having the relationship shown on Table 22 under the column entitled "Types 3–6 Glasses". Types 3–6 Glasses included $Li_2O$, $K_2O$ and $Na_2O$; therefore R2O is equal to the sum in wt % of $Li_2O$, $K_2O$ and $Na_2O$.

The glass composition having the following ingredients in the following ranges has a log3 forming temperature in the range of 1187 to 1240° C. and a delta T in the range of 50 to 142° C.:

| | |
|---|---|
| $SiO_2$ | 54.60 to 60.75 percent by weight; |
| $Al_2O_3$ | 11.90 to 13.64 percent by weight; |
| CaO | 22.00 to 24.22 percent by weight, and |
| MgO | 1.90 to 3.40 percent by weight, and | the composition may further include:

| | |
|---|---|
| $TiO_2$ | 0.49 to 1.50 percent by weight; |
| $Na_2O$ | 0 to 0.90 percent by weight; |
| $K_2O$ | 0 to 0.10 percent by weight; |
| ZnO | 0.45 to 1.50 percent by weight; |
| Li2O | 0.30 to 1.00 percent by weight; |
| $Fe_2O_3$ | 0 to 0.35 percent by weight, and |
| $B_2O_3$ | 0 to 3.00 percent by weight. |

Still further as can be appreciated, a range for each of the ingredients for boron free glasses: Type 1 Glasses (Table 2), Type 3 Glasses (Tables 12 and 13); Type 4 Glasses (Tables 14 and 15); Type 5 Glasses (Table 16) and their relationship can be determined from Tables 2 and 12–16. More particularly, Tables 2 and 12–16 glass compositions having a quaternary system including $SiO_2$, $Al_2O_3$, CaO and MgO with the ingredients of the glass having the relationship shown on Table 22 under the column entitled "Types 1 &3–5 Glasses". Types 1 & 3–5 Glasses included $Li_2O$ and $Na_2O$; therefore R2O is equal to the sum in wt % of $Li_2O$ and $Na_2O$. Further Types 1 3&5 Glasses are boron free, therefore the formula "R2O+RO+$B_2O_3$" becomes "R2O+RO".

The glass compositions having the following ingredients in the following ranges has a log3 forming temperature in the range of 1195 to 1240° C. and a delta T in the range of 50 to 100° C.:

| | |
|---|---|
| $SiO_2$ | 57.45 to 60.75 percent by weight; |
| $Al_2O_3$ | 12.00 to 13.68 percent by weight; |
| CaO | 22.00 to 24.50 percent by weight; |
| MgO | 1.70 to 3.10 percent by weight, and | the composition may further include:

| | |
|---|---|
| $TiO_2$ | 0.50 to 1.50 percent by weight; |
| $Na_2O$ | 0 to 0.91 percent by weight; |
| ZnO | 0 to 1.00 percent by weight; |
| Li2O | 0 to 1.00 percent by weight, and |
| $Fe_2O_3$ | 0 to 0.35 percent by weight. |

Still further as can be appreciated, a range for each of the ingredients for boron containing: Type 2 Glasses (Tables 3–11) and Type 6 Glasses (Tables 17 and 18) and their relationship can be determined from Tables 3–11,17 and 18. More particularly, Tables 3–11, 17 and 18 glass compositions having a boron containing (for example up to 5.05 bx;1wt %) quaternary system including $SiO_2$, $Al_2O_3$, CaO and MgO with the ingredients of the glass having the relationship shown on Table 22 under the column entitled "Types 2 & 6 Glasses". Types 2& 6 Glasses included $Li_2O$, $K_2O$ and $Na_2O$; therefore R2O is equal to the sum in wt % of $Li_2O$, $K_2O$ and $Na_2O$.

The glass compositions having the following ingredients in the following ranges has a log3 forming temperature in the range of 1167 to 1240° C. and a delta T in the range of 50 to 142° C.:

| | |
|---|---|
| $SiO_2$ | 53.00 to 59.53 percent by weight; |
| $Al_2O_3$ | 12.00 to 14.00 percent by weight; |
| CaO | 22.25 to 24.95 percent by weight, and |
| MgO | 1.50 to 3.00 percent by weight, and | the composition may further include:

| | |
|---|---|
| $TiO_2$ | 0.40 to 1.10 percent by weight; |
| $Na_2O$ | 0 to 0.90 percent by weight; |
| $K_2O$ | 0 to 0.30 weifht percent; |
| F | 0 to 0.50 percent by weight; |
| SrO | 0 to 0.13 percent by weight; |
| Cr2O3 | 0 to 0.13 percent by weight; |
| Li2O | 0 to 0.91 percent by weight, and |
| $Fe_2O_3$ | 0 to 0.30 percent by weight. |

It will be appreciated by those skilled in the art that changes could be made to the embodiments described above without departing from the broad inventive concept thereof. For example, but not limiting thereto, one, two, three or more or all of the formulas discussed above setting forth the mathematical relationship of the ingredients may be used to identify properties of a glass composition. Based on the description of the embodiments of the invention, it can be appreciated that this invention is not limited to the particular embodiments disclosed, but it is intended to cover modifications that are within the spirit and scope of the invention, as defined by the appended claims.

What is claimed is:

1. A glass composition comprising:

| | |
|---|---|
| $SiO_2$ | 55 to 58 percent by weight; |
| $Al_2O_3$ | 12 to 16 percent by weight; |
| CaO | 23 to 26 percent by weight; |
| MgO | 2.5 to 3 percent by weight; |
| $TiO_2$ | 0.5 to 2 percent by weight; |
| $Na_2O$ | 0 to 1 percent by weight; |
| $K_2O$ | 0 to 1 percent by weight; |
| $Na_2O + K_2O$ | 0 to 2 percent by weight; |
| $Fe_2O_3$ | 0.1 to 0.5 percent by weight; |
| $B_2O_3$ | 1 to 2 percent by weight; | wherein the glass composition has a log 3 forming temperature no greater than 1230° C. based on NIST 710A reference standard, and the difference between the log3 forming temperature and the liquidus temperature is at least 50° C.

2. The glass composition according to claim 1, wherein the $TiO_2$ content is 0.5 to 1.5 percent by weight.

3. The glass composition according to claim 1, wherein the glass composition has a $B_2O_3$ content of 1.3 to 2 percent by weight.

4. The glass composition according to claim 1, wherein the $Fe_2O_3$ content is 0.2 to 0.4 percent by weight.

5. The glass composition according to claim 1, wherein the ratio of $SiO_2$ to (CaO+MgO) is no greater than 2.2.

6. The glass composition according to claim 1, wherein the ratio of $SiO_2$ to (CaO+MgO) is from 2.0 to 2.2.

7. The glass composition according to claim 1, wherein ($Na_2O+K_2O$) is no greater than about 1.03 percent by weight.

8. The glass composition according to claim 1, wherein ($Na_2O+K_2O$) is no greater than 1 percent by weight.

9. The glass composition according to claim 1, wherein ($Na_2O+K_2O+Li_2O$) is no greater about 1.03 percent by weight.

10. The glass composition according to claim 1, wherein ($Na_2O+K_2O+Li_2O$) is no greater than 1 percent by weight.

11. The glass composition according to claim 1, wherein the glass composition has a forming temperature of no greater than 1220° C. based on an NIST 714 reference standard.

12. The glass composition according to claim 1, wherein the difference between the log3 forming temperature and the liquidus temperature is at least 60° C.

13. The glass composition according to claim 11, wherein the difference between the log3 forming temperature and the liquidus temperature is at least 60° C.

14. A glass composition comprising:

| | |
|---|---|
| $SiO_2$ | 55 to 58 percent by weight; |
| $Al_2O_3$ | 12 to 16 percent by weight; |
| CaO | 23 to 26 percent by weight; |
| MgO | 2.5 to 3 percent by weight; |
| $TiO_2$ | 0.5 to 2 percent by weight; |
| $Na_2O$ | 0 to 1 percent by weight; |
| $K_2O$ | 0 to 1 percent by weight; |
| $Na_2O + K_2O$ | 0 to 2 percent by weight; |
| $Fe_2O_3$ | 0.1 to 0.5 percent by weight; |
| $B_2O_3$ | 1.3 to 2 percent by weight | wherein the glass composition has a log 3 forming temperature no greater than 1230° C. based on NIST 710A reference standard, and the difference between the log3 forming temperature and the liquidus temperature is at least 50° C.

15. A glass composition comprising:

| | |
|---|---|
| $SiO_2$ | 55 to 58 percent by weight; |
| $Al_2O_3$ | 12 to 16 percent by weight; |
| CaO | 23 to 26 percent by weight; |
| MgO | 2.5 to 3 percent by weight; |
| $TiO_2$ | 0.5 to 1.5 percent by weight; |
| $Na_2O$ | 0 to 1 percent by weight; |
| $K_2O$ | 0 to 1 percent by weight; |
| $Na_2O + K_2O$ | 0 to 2 percent by weight; |
| $Fe_2O_3$ | 0.1 to 0.5 percent by weight; |
| $B_2O_3$ | 1.3 to 2 percent by weight | wherein the glass composition has a log 3 forming temperature no greater than 1220° C. based on NIST 710A reference standard, and the difference between the log3 forming temperature and the liquidus temperature is at least 60° C.

* * * * *

UNITED STATES PATENT AND TRADEMARK OFFICE
CERTIFICATE OF CORRECTION

PATENT NO.      : 6,962,886 B2
APPLICATION NO. : 10/164468
DATED           : November 8, 2005
INVENTOR(S)     : Frederick T. Wallenberger Page 1 of 36

It is certified that error appears in the above-identified patent and that said Letters Patent is hereby corrected as shown below:

At the end of column 36, line 67, add Table 1 .

Table 1

| Components (wt%) | Examples | | | | | | |
|---|---|---|---|---|---|---|---|
|  | A | B | C | D | E | F | G |
| $SiO_2$ | 55.60 | 56.45 | 55.70 | 57.60 | 56.35 | 56.70 | 57.85 |
| $Al_2O_3$ | 13.58 | 13.25 | 13.94 | 12.35 | 13.45 | 13.67 | 12.55 |
| CaO | 24.76 | 24.75 | 24.80 | 24.40 | 24.65 | 23.87 | 24.45 |
| MgO | 2.80 | 2.55 | 2.55 | 2.55 | 2.55 | 2.62 | 2.55 |
| $TiO_2$ | 0.55 | 0.55 | 0.55 | 0.55 | 0.55 | 0.34 | 0.05 |
| $Na_2O$ | 0.45 | 0.45 | 0.45 | 0.45 | 0.45 | 0.44 | 0.45 |
| $K_2O$ | 0.58 | 0.45 | 0.45 | 0.45 | 0.45 | 0.51 | 0.45 |
| $Fe_2O_3$ | 0.38 | 0.25 | 0.25 | 0.25 | 0.25 | 0.35 | 0.35 |
| $B_2O_3$ | 1.30 | 1.30 | 1.30 | 1.30 | 1.30 | 1.50 | 1.30 |
| RO (CaO + MgO) | 27.56 | 27.30 | 27.35 | 26.95 | 27.20 | 26.49 | 27.00 |
| $SiO_2$/CaO | 2.25 | 2.28 | 2.25 | 2.36 | 2.29 | 2.38 | 2.37 |
| $SiO_2$/RO | 2.02 | 2.07 | 2.04 | 2.14 | 2.07 | 2.14 | 2.14 |
| $SiO_2$/$Al_2O_3$ | 4.09 | 4.26 | 4.00 | 4.66 | 4.19 | 4.15 | 4.61 |
| $Al_2O_3$/CaO | 0.55 | 0.54 | 0.56 | 0.51 | 0.55 | 0.57 | 0.51 |
| $SiO_2$ + $Al_2O_3$ | 69.18 | 69.70 | 69.64 | 69.95 | 69.80 | 70.37 | 70.44 |
| $R_2O$+RO+$B_2O_3$ | 29.89 | 29.50 | 29.55 | 29.15 | 29.40 | 28.94 | 29.20 |
| (Si+Al)/($R_2O$+RO+B) | 2.31 | 2.36 | 2.36 | 2.40 | 2.37 | 2.43 | 2.41 |
| $SiO_2$ - RO | 28.04 | 29.15 | 28.35 | 30.65 | 29.15 | 30.21 | 30.85 |
| $Al_2O_3$/RO | 0.49 | 0.49 | 0.51 | 0.46 | 0.49 | 0.52 | 0.46 |
| Log3 FT, °C | 1213 | 1220 | 1220 | 1221 | 1221 | 1218 | 1219 |
| Liquidus T, °C | 1159 | 1160 | 1165 | 1164 | 1156 | 1160 | 1167 |
| Delta T, °C | 54 | 60 | 55 | 57 | 65 | 58 | 52 |

UNITED STATES PATENT AND TRADEMARK OFFICE
CERTIFICATE OF CORRECTION

PATENT NO.       : 6,962,886 B2
APPLICATION NO.  : 10/164468
DATED            : November 8, 2005
INVENTOR(S)      : Frederick T. Wallenberger It is certified that error appears in the above-identified patent and that said Letters Patent is hereby corrected as shown below:

At the end of Table 1, add Table 2.

Table 2 – Type 1 Glasses

| Components (wt%) | H | I | Examples | | | | | |
| --- | --- | --- | --- | --- | --- | --- | --- | --- |
|  |  |  | 1 | 2 | 3 | 4 | 5 | 6 |
| SiO$_2$ | 57.60 | 58.18 | 57.75 | 57.45 | 57.65 | 58.05 | 57.95 | 59.05 |
| Al$_2$O$_3$ | 13.55 | 13.68 | 13.20 | 13.40 | 13.40 | 13.40 | 13.20 | 12.20 |
| CaO | 24.50 | 23.75 | 24.25 | 24.35 | 24.15 | 23.75 | 24.05 | 23.95 |
| MgO | 2.55 | 2.58 | 2.55 | 2.55 | 2.55 | 2.55 | 2.55 | 2.95 |
| TiO$_2$ | 0.55 | 0.55 | 1.10 | 1.10 | 1.10 | 1.10 | 1.10 | 1.10 |
| Na$_2$O | 0.90 | 0.91 | 0.90 | 0.90 | 0.90 | 0.90 | 0.90 | 0.90 |
| Fe$_2$O$_3$ | 0.35 | 0.35 | 0.25 | 0.25 | 0.25 | 0.25 | 0.25 | 0.25 |
| B$_2$O$_3$ | - | - | - | - | - | - | - | - |
| RO (CaO + MgO) | 27.05 | 26.33 | 26.80 | 26.90 | 26.70 | 26.30 | 26.60 | 26.50 |
| SiO$_2$/CaO | 2.35 | 2.45 | 2.38 | 2.36 | 2.39 | 2.44 | 2.41 | 2.47 |
| SiO$_2$/RO | 2.13 | 2.20 | 2.15 | 2.14 | 2.16 | 2.21 | 2.18 | 2.23 |
| SiO$_2$/Al$_2$O$_3$ | 4.25 | 4.25 | 4.38 | 4.29 | 4.30 | 4.33 | 4.39 | 4.84 |
| Al$_2$O$_3$/CaO | 0.55 | 0.58 | 0.54 | 0.55 | 0.56 | 0.56 | 0.55 | 0.51 |
| SiO$_2$ + Al$_2$O$_3$ | 71.15 | 71.86 | 70.95 | 70.85 | 71.05 | 71.45 | 71.15 | 71.25 |
| R2O+RO+B$_2$O$_3$ | 27.95 | 27.24 | 27.70 | 27.80 | 27.60 | 27.20 | 27.50 | 27.40 |
| (Si+Al)/(R2O+RO+B) | 2.55 | 2.64 | 2.56 | 2.55 | 2.57 | 2.63 | 2.59 | 2.60 |
| SiO$_2$ - RO | 30.55 | 31.85 | 30.95 | 30.55 | 30.95 | 31.75 | 31.35 | 32.55 |
| Al$_2$O$_3$/RO | 0.50 | 0.52 | 0.49 | 0.50 | 0.50 | 0.51 | 0.50 | 0.46 |
| Log3 FT. °C | 1240 | 1238 | 1232 | 1238 | 1240 | 1240 | 1235 | 1239 |
| Liquidus T. °C | 1185 | 1183 | 1166 | 1165 | 1166 | 1167 | 1164 | 1181 |
| Delta T, °C | 55 | 55 | 66 | 73 | 74 | 73 | 71 | 58 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 2, add Table 3.

Table 3 – Type 2 Glasses

| Components (wt%) | Examples | | | | | |
|---|---|---|---|---|---|---|
| | 7 | 8 | 9 | 10 | 11 | 12 |
| $SiO_2$ | 56.00 | 56.40 | 56.35 | 56.65 | 56.20 | 56.50 |
| $Al_2O_3$ | 13.60 | 13.40 | 13.60 | 13.05 | 13.60 | 13.20 |
| CaO | 24.25 | 24.05 | 23.85 | 23.50 | 24.05 | 23.50 |
| MgO | 2.50 | 2.50 | 2.55 | 2.55 | 2.50 | 2.55 |
| $TiO_2$ | 0.50 | 0.50 | 0.50 | 1.10 | 0.50 | 1.10 |
| $Na_2O$ | 0.90 | 0.90 | 0.90 | 0.90 | 0.90 | 0.90 |
| $Fe_2O_3$ | 0.25 | 0.25 | 0.25 | 0.25 | 0.25 | 0.25 |
| $B_2O_3$ | 2.00 | 2.00 | 2.00 | 2.00 | 2.00 | 2.00 |
| RO (CaO + MgO) | 26.75 | 26.55 | 26.40 | 26.05 | 26.55 | 26.05 |
| $SiO_2$/CaO | 2.31 | 2.35 | 2.36 | 2.41 | 2.34 | 2.40 |
| $SiO_2$/RO | 2.09 | 2.12 | 2.13 | 2.17 | 2.12 | 2.17 |
| $SiO_2$/$Al_2O_3$ | 4.12 | 4.21 | 4.14 | 4.34 | 4.13 | 4.28 |
| $Al_2O_3$/CaO | 0.56 | 0.56 | 0.57 | 0.56 | 0.57 | 0.56 |
| $SiO_2$ + $Al_2O_3$ | 69.60 | 69.80 | 69.95 | 69.70 | 69.80 | 69.70 |
| R2O+RO+$B_2O_3$ | 29.65 | 29.45 | 29.30 | 28.95 | 29.45 | 28.95 |
| (Si+Al)/(R2O+RO+B) | 2.35 | 2.37 | 2.39 | 2.41 | 2.37 | 2.41 |
| $SiO_2$ - RO | 29.25 | 29.85 | 29.95 | 30.60 | 29.65 | 30.45 |
| $Al_2O_3$/RO | 0.51 | 0.50 | 0.52 | 0.50 | 0.51 | 0.51 |
| Log3 FT, °C | 1213 | 1216 | 1218 | 1218 | 1219 | 1220 |
| Liquidus T, °C | 1136 | 1143 | 1138 | 1131 | 1136 | 1133 |
| Delta T, °C | 59 | 56 | 62 | 69 | 65 | 69 |

UNITED STATES PATENT AND TRADEMARK OFFICE
CERTIFICATE OF CORRECTION

PATENT NO.         : 6,962,886 B2
APPLICATION NO. : 10/164468
DATED              : November 8, 2005
INVENTOR(S)        : Frederick T. Wallenberger It is certified that error appears in the above-identified patent and that said Letters Patent is hereby corrected as shown below:

At the end of Table 3, add Table 4.

Table 4 – Type 2 Glasses

| Components (wt%) | Examples | | | | | | | | | |
|---|---|---|---|---|---|---|---|---|---|---|
| | 13 | 14 | 15 | 16 | 17 | 18 | 19 | 20 | 21 | 22 |
| SiO$_2$ | 56.25 | 56.45 | 56.75 | 56.50 | 56.75 | 57.5 | 56.75 | 57.75 | 57.75 | 57.75 |
| Al$_2$O$_3$ | 13.2 | 13.20 | 13.20 | 13.20 | 13.20 | 12.2 | 13.2 | 12.2 | 12.2 | 12.2 |
| CaO | 24.25 | 24.25 | 23.95 | 24.00 | 23.75 | 24 | 23.95 | 23.75 | 23.75 | 23.95 |
| MgO | 2.55 | 2.55 | 2.55 | 2.55 | 2.55 | 2.55 | 2.55 | 2.55 | 2.55 | 2.55 |
| TiO$_2$ | 1.10 | 1.10 | 1.10 | 1.10 | 1.10 | 1.10 | 1.10 | 1.10 | 1.10 | 1.10 |
| Na$_2$O | 0.90 | 0.90 | 0.90 | 0.90 | 0.90 | 0.90 | 0.90 | 0.90 | 0.90 | 0.90 |
| Fe$_2$O$_3$ | 0.25 | 0.25 | 0.25 | 0.25 | 0.25 | 0.25 | 0.25 | 0.25 | 0.25 | 0.25 |
| B$_2$O$_3$ | 1.30 | 1.30 | 1.30 | 1.30 | 1.40 | 1.30 | 1.20 | 1.40 | 1.30 | 1.40 |
| RO (CaO + MgO) | 26.80 | 26.80 | 26.50 | 26.55 | 26.30 | 26.55 | 26.50 | 26.30 | 26.30 | 26.50 |
| SiO$_2$/CaO | 2.32 | 2.33 | 2.37 | 2.35 | 2.39 | 2.40 | 2.37 | 2.43 | 2.43 | 2.41 |
| SiO$_2$/RO | 2.10 | 2.11 | 2.14 | 2.13 | 2.16 | 2.17 | 2.14 | 2.20 | 2.20 | 2.18 |
| SiO$_2$/Al$_2$O$_3$ | 4.26 | 4.28 | 4.30 | 4.28 | 4.30 | 4.71 | 4.30 | 4.73 | 4.73 | 4.73 |
| Al$_2$O$_3$/CaO | 0.54 | 0.54 | 0.55 | 0.55 | 0.56 | 0.51 | 0.55 | 0.51 | 0.51 | 0.51 |
| SiO$_2$ + Al$_2$O$_3$ | 69.45 | 69.65 | 69.95 | 69.70 | 69.95 | 69.70 | 69.95 | 69.95 | 69.95 | 69.95 |
| R2O+RO+B$_2$O$_3$ | 29.00 | 29.00 | 28.70 | 28.75 | 28.60 | 28.75 | 28.60 | 28.60 | 28.50 | 28.80 |
| (Si+Al)/(R2O+RO+B) | 2.39 | 2.40 | 2.44 | 2.42 | 2.45 | 2.42 | 2.45 | 2.45 | 2.45 | 2.43 |
| SiO$_2$ - RO | 29.45 | 29.65 | 30.25 | 29.95 | 30.45 | 30.95 | 30.25 | 31.45 | 31.45 | 31.25 |
| Al$_2$O$_3$/RO | 0.49 | 0.49 | 0.50 | 0.50 | 0.50 | 0.46 | 0.50 | 0.46 | 0.46 | 0.46 |
| Log3 FT, °C | 1210 | 1214 | 1215 | 1215 | 1215 | 1216 | 1216 | 1217 | 1217 | 1218 |
| Liquidus T, °C | 1154 | 1159 | 1154 | 1154 | 1160 | 1152 | 1147 | 1151 | 1147 | 1155 |
| Delta T, °C | 56 | 55 | 61 | 61 | 55 | 64 | 69 | 66 | 70 | 63 |

UNITED STATES PATENT AND TRADEMARK OFFICE
CERTIFICATE OF CORRECTION

| | |
|---|---|
| PATENT NO. | : 6,962,886 B2 |
| APPLICATION NO. | : 10/164468 |
| DATED | : November 8, 2005 |
| INVENTOR(S) | : Frederick T. Wallenberger |

It is certified that error appears in the above-identified patent and that said Letters Patent is hereby corrected as shown below:

At the end of Table 4, add Table 5.

Table 5 – Type 2 Glasses

| Components (wt%) | Examples | | | | | | | | | |
|---|---|---|---|---|---|---|---|---|---|---|
| | 23 | 24 | 25 | 26 | 27 | 28 | 29 | 30 | 31 | 32 |
| $SiO_2$ | 55.40 | 55.40 | 55.19 | 55.40 | 56.05 | 55.85 | 56.00 | 55.90 | 55.40 | 55.19 |
| $Al_2O_3$ | 13.60 | 13.60 | 13.59 | 13.60 | 13.10 | 13.38 | 13.37 | 13.37 | 13.60 | 13.59 |
| CaO | 24.50 | 24.50 | 24.55 | 24.50 | 24.55 | 24.67 | 24.53 | 24.63 | 24.50 | 24.55 |
| MgO | 2.95 | 2.95 | 2.86 | 2.95 | 2.75 | 2.55 | 2.55 | 2.55 | 2.75 | 2.86 |
| $TiO_2$ | 1.10 | 1.10 | 1.10 | 1.10 | 1.10 | 1.10 | 1.10 | 1.10 | 1.10 | 1.10 |
| $Na_2O$ | 0.45 | 0.45 | 0.45 | 0.45 | 0.45 | 0.45 | 0.45 | 0.45 | 0.45 | 0.45 |
| $K_2O$ | 0.45 | 0.45 | 0.58 | 0.45 | 0.45 | 0.45 | 0.45 | 0.45 | 0.45 | 0.58 |
| $Fe_2O_3$ | 0.25 | 0.25 | 0.38 | 0.25 | 0.25 | 0.25 | 0.25 | 0.25 | 0.25 | 0.38 |
| $B_2O_3$ | 1.30 | 1.30 | 1.30 | 1.30 | 1.30 | 1.30 | 1.30 | 1.30 | 1.30 | 1.30 |
| | | | | | | | | | | |
| RO (CaO + MgO) | 27.45 | 27.45 | 27.41 | 27.45 | 27.30 | 27.22 | 27.08 | 27.18 | 27.25 | 27.41 |
| $SiO_2$/CaO | 2.26 | 2.26 | 2.25 | 2.26 | 2.28 | 2.26 | 2.28 | 2.27 | 2.26 | 2.25 |
| $SiO_2$/RO | 2.02 | 2.02 | 2.01 | 2.02 | 2.05 | 2.05 | 2.07 | 2.06 | 2.03 | 2.01 |
| $SiO_2$/$Al_2O_3$ | 4.07 | 4.07 | 4.06 | 4.07 | 4.28 | 4.17 | 4.19 | 4.18 | 4.01 | 4.06 |
| $Al_2O_3$/CaO | 0.56 | 0.56 | 0.55 | 0.56 | 0.53 | 0.54 | 0.55 | 0.54 | 0.56 | 0.55 |
| $SiO_2$ + $Al_2O_3$ | 69.00 | 69.00 | 68.78 | 69.00 | 69.15 | 69.23 | 69.37 | 69.27 | 69.20 | 68.78 |
| $R2O+RO+B_2O_3$ | 29.65 | 29.65 | 29.74 | 29.65 | 29.50 | 29.42 | 29.28 | 29.38 | 29.45 | 29.74 |
| (Si+Al)/(R2O+RO+B) | 2.33 | 2.33 | 2.31 | 2.33 | 2.34 | 2.35 | 2.37 | 2.36 | 2.35 | 2.31 |
| $SiO_2$ - RO | 27.95 | 27.95 | 27.78 | 27.95 | 28.75 | 28.63 | 28.92 | 28.72 | 28.15 | 27.78 |
| $Al_2O_3$/RO | 0.50 | 0.50 | 0.50 | 0.50 | 0.48 | 0.49 | 0.49 | 0.49 | 0.51 | 0.50 |
| | | | | | | | | | | |
| Log3 FT, °C | 1210 | 1211 | 1216 | 1217 | 1218 | 1220 | 1221 | 1221 | 1221 | 1222 |
| Liquidus T, °C | 1157 | 1151 | 1154 | 1167 | 1156 | 1148 | 1157 | 1142 | 1167 | 1154 |
| Delta T, °C | 53 | 60 | 62 | 56 | 62 | 72 | 64 | 79 | 54 | 63 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 5, add Table 6.

Table 6 – Type 2 Glasses

| Components (wt%) | Examples | | | | | | | | | |
|---|---|---|---|---|---|---|---|---|---|---|
| | 33 | 34 | 35 | 36 | 37 | 38 | 39 | 40 | 41 | 42 |
| $SiO_2$ | 56.60 | 56.50 | 56.50 | 55.95 | 57.60 | 56.50 | 56.45 | 56.50 | 56.55 | 56.15 |
| $Al_2O_3$ | 13.25 | 13.45 | 13.45 | 13.95 | 12.35 | 13.49 | 13.48 | 13.45 | 13.35 | 13.35 |
| CaO | 24.60 | 24.50 | 24.50 | 24.55 | 24.40 | 24.46 | 24.52 | 24.50 | 24.55 | 24.95 |
| MgO | 2.55 | 2.55 | 2.55 | 2.55 | 2.55 | 2.55 | 2.55 | 2.55 | 2.55 | 2.55 |
| $TiO_2$ | 0.55 | 0.55 | 0.55 | 0.55 | 0.55 | 0.55 | 0.55 | 0.55 | 0.55 | 0.55 |
| $Na_2O$ | 0.90 | 0.90 | 0.90 | 0.90 | 0.90 | 0.90 | 0.90 | 0.90 | 0.90 | 0.90 |
| $Fe_2O_3$ | 0.25 | 0.25 | 0.25 | 0.25 | 0.35 | 0.25 | 0.25 | 0.25 | 0.25 | 0.25 |
| $B_2O_3$ | 1.30 | 1.30 | 1.30 | 1.30 | 1.30 | 1.30 | 1.30 | 1.30 | 1.30 | 1.30 |
| RO (CaO + MgO) | 27.15 | 27.05 | 27.05 | 27.10 | 26.95 | 27.01 | 27.07 | 27.05 | 27.10 | 27.50 |
| $SiO_2$/CaO | 2.30 | 2.31 | 2.31 | 2.28 | 2.36 | 2.31 | 2.30 | 2.31 | 2.30 | 2.25 |
| $SiO_2$/RO | 2.08 | 2.09 | 2.09 | 2.06 | 2.14 | 2.09 | 2.09 | 2.09 | 2.09 | 2.04 |
| $SiO_2$/$Al_2O_3$ | 4.27 | 4.20 | 4.20 | 4.01 | 4.66 | 4.19 | 4.19 | 4.20 | 4.24 | 4.21 |
| $Al_2O_3$/CaO | 0.54 | 0.55 | 0.55 | 0.57 | 0.51 | 0.55 | 0.55 | 0.55 | 0.54 | 0.54 |
| $SiO_2$ + $Al_2O_3$ | 69.85 | 69.95 | 69.95 | 69.90 | 69.95 | 69.99 | 69.93 | 69.95 | 69.90 | 69.50 |
| $R_2O+RO+B_2O_3$ | 29.35 | 29.25 | 29.25 | 29.30 | 29.15 | 29.21 | 29.27 | 29.25 | 29.30 | 29.70 |
| (Si+Al)/(R2O+RO+B) | 2.38 | 2.39 | 2.39 | 2.39 | 2.40 | 2.40 | 2.39 | 2.39 | 2.39 | 2.34 |
| $SiO_2$ - RO | 29.45 | 29.45 | 29.45 | 28.85 | 30.65 | 29.49 | 29.38 | 29.45 | 29.45 | 28.65 |
| $Al_2O_3$/RO | 0.49 | 0.50 | 0.50 | 0.51 | 0.46 | 0.50 | 0.50 | 0.50 | 0.49 | 0.49 |
| Log3 FT, °C | 1211 | 1212 | 1215 | 1216 | 1216 | 1218 | 1219 | 1220 | 1220 | 1220 |
| Liquidus T, °C | 1153 | 1158 | 1157 | 1162 | 1164 | 1161 | 1158 | 1160 | 1155 | 1154 |
| Delta T, °C | 58 | 54 | 58 | 54 | 52 | 57 | 61 | 60 | 65 | 66 |

UNITED STATES PATENT AND TRADEMARK OFFICE
CERTIFICATE OF CORRECTION

PATENT NO.         : 6,962,886 B2
APPLICATION NO.    : 10/164468
DATED              : November 8, 2005
INVENTOR(S)        : Frederick T. Wallenberger It is certified that error appears in the above-identified patent and that said Letters Patent is hereby corrected as shown below:

At the end of Table 6, add Table 7.

Table 7 – Type 2 Glasses

| Components (wt%) | \multicolumn{10}{c}{Examples} |
|---|---|---|---|---|---|---|---|---|---|---|
| | 43 | 44 | 45 | 46 | 47 | 48 | 49 | 50 | 51 | 52 |
| $SiO_2$ | 55.50 | 55.25 | 55.25 | 55.5 | 55.00 | 55.75 | 55.75 | 55.75 | 56.00 | 56.15 |
| $Al_2O_3$ | 13.20 | 13.20 | 13.30 | 13.30 | 13.20 | 13.30 | 13.20 | 13.20 | 13.30 | 13.05 |
| CaO | 23.50 | 23.75 | 24.20 | 23.95 | 24.00 | 23.70 | 23.25 | 23.25 | 23.45 | 23.00 |
| MgO | 2.55 | 2.55 | 2.55 | 2.55 | 2.55 | 2.55 | 2.55 | 2.55 | 2.55 | 2.55 |
| $TiO_2$ | 1.10 | 1.10 | 0.55 | 0.55 | 1.10 | 0.55 | 1.10 | 1.10 | 0.55 | 1.10 |
| $Na_2O$ | 0.90 | 0.90 | 0.90 | 0.90 | 0.90 | 0.90 | 0.90 | 0.90 | 0.90 | 0.90 |
| $Fe_2O_3$ | 0.25 | 0.25 | 0.25 | 0.25 | 0.25 | 0.25 | 0.25 | 0.25 | 0.25 | 0.25 |
| $B_2O_3$ | 3.00 | 3.00 | 3.00 | 3.00 | 3.00 | 3.00 | 3.00 | 3.00 | 3.00 | 3.00 |
| RO (CaO + MgO) | 26.05 | 26.30 | 26.75 | 26.50 | 26.55 | 26.25 | 25.80 | 25.80 | 26.00 | 25.55 |
| $SiO_2/CaO$ | 2.36 | 2.33 | 2.28 | 2.32 | 2.29 | 2.35 | 2.40 | 2.40 | 2.39 | 2.44 |
| $SiO_2/RO$ | 2.13 | 2.10 | 2.07 | 2.09 | 2.07 | 2.12 | 2.16 | 2.16 | 2.15 | 2.20 |
| $SiO_2/Al_2O_3$ | 4.20 | 4.19 | 4.15 | 4.17 | 4.17 | 4.19 | 4.22 | 4.22 | 4.21 | 4.30 |
| $Al_2O_3/CaO$ | 0.56 | 0.56 | 0.55 | 0.56 | 0.55 | 0.56 | 0.57 | 0.57 | 0.57 | 0.57 |
| $SiO_2 + Al_2O_3$ | 68.70 | 68.45 | 68.55 | 68.80 | 68.20 | 69.05 | 68.95 | 68.95 | 69.30 | 69.20 |
| $R2O+RO+B_2O_3$ | 29.95 | 30.20 | 30.65 | 30.40 | 30.45 | 30.15 | 29.70 | 29.70 | 29.90 | 29.45 |
| (Si+Al)/(R2O+RO+B) | 2.29 | 2.27 | 2.24 | 2.26 | 2.24 | 2.29 | 2.32 | 2.32 | 2.32 | 2.35 |
| $SiO_2$ - RO | 29.45 | 28.95 | 28.50 | 29.00 | 28.45 | 29.50 | 29.95 | 29.95 | 30.00 | 30.60 |
| $Al_2O_3/RO$ | 0.51 | 0.50 | 0.50 | 0.50 | 0.50 | 0.51 | 0.51 | 0.51 | 0.51 | 0.51 |
| Log3 FT, °C | 1193 | 1198 | 1198 | 1200 | 1201 | 1201 | 1204 | 1204 | 1207 | 1212 |
| Liquidus T, °C | 1129 | 1122 | 1128 | 1129 | 1127 | 1127 | 1127 | 1123 | 1127 | 1122 |
| Delta T, °C | 64 | 76 | 70 | 71 | 74 | 74 | 77 | 81 | 80 | 90 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 7, add Table 8.

Table 8 – Type 2 Glasses

| Components (wt%) | Examples | | | | | | | | | | |
|---|---|---|---|---|---|---|---|---|---|---|---|
| | 53 | 54 | 55 | 56 | 57 | 58 | 59 | 60 | 61 | 62 | 63 |
| $SiO_2$ | 54.20 | 54.50 | 54.12 | 55.00 | 54.5 | 54.5 | 54.7 | 54.50 | 54.20 | 54.50 | 54.80 |
| $Al_2O_3$ | 13.35 | 13.25 | 13.30 | 13.25 | 13.25 | 13.25 | 13.2 | 13.25 | 13.36 | 13.25 | 13.25 |
| CaO | 24.55 | 24.55 | 24.55 | 24.25 | 24.55 | 24.55 | 24.5 | 24.55 | 24.55 | 24.55 | 24.25 |
| MgO | 2.55 | 2.55 | 3.00 | 2.55 | 2.67 | 2.67 | 2.55 | 2.65 | 2.85 | 2.65 | 2.55 |
| $TiO_2$ | 0.55 | 0.55 | 0.55 | 0.55 | 0.55 | 0.55 | 0.55 | 0.55 | 0.55 | 0.55 | 0.55 |
| $Na_2O$ | 0.45 | 0.45 | 0.45 | 0.45 | 0.45 | 0.45 | 0.45 | 0.45 | 0.45 | 0.45 | 0.45 |
| $K_2O$ | 0.55 | 0.55 | 0.55 | 0.55 | 0.55 | 0.55 | 0.55 | 0.55 | 0.55 | 0.55 | 0.55 |
| $Fe_2O_3$ | 0.28 | 0.28 | 0.28 | 0.28 | 0.28 | 0.28 | 0.28 | 0.28 | 0.28 | 0.28 | 0.28 |
| $B_2O_3$ | 3.00 | 3.00 | 3.00 | 3.00 | 3.00 | 3.00 | 3.00 | 3.00 | 3.00 | 3.00 | 3.00 |
| F | 0.20 | 0.20 | 0.10 | 0.10 | 0.10 | 0.10 | 0.10 | 0.10 | 0.10 | 0.10 | 0.20 |
| SrO | 0.12 | 0.12 | 0.10 | 0.12 | 0.10 | 0.10 | 0.12 | 0.12 | 0.12 | 0.12 | 0.12 |
| RO (CaO + MgO) | 27.10 | 27.10 | 27.55 | 26.80 | 27.22 | 27.22 | 27.05 | 27.20 | 27.40 | 27.20 | 26.80 |
| $SiO_2$/CaO | 2.21 | 2.22 | 2.20 | 2.27 | 2.22 | 2.22 | 2.23 | 2.22 | 2.21 | 2.22 | 2.26 |
| $SiO_2$/RO | 2.00 | 2.01 | 1.96 | 2.05 | 2.00 | 2.00 | 2.02 | 2.00 | 1.98 | 2.00 | 2.04 |
| $SiO_2$/$Al_2O_3$ | 4.06 | 4.11 | 4.07 | 4.15 | 4.11 | 4.11 | 4.14 | 4.11 | 4.06 | 4.11 | 4.14 |
| $Al_2O_3$/CaO | 0.54 | 0.54 | 0.54 | 0.55 | 0.54 | 0.54 | 0.54 | 0.54 | 0.54 | 0.54 | 0.55 |
| $SiO_2$ + $Al_2O_3$ | 67.55 | 67.75 | 67.42 | 68.25 | 67.75 | 67.75 | 67.90 | 67.75 | 67.55 | 67.75 | 68.05 |
| $R2O+RO+B_2O_3$ | 31.10 | 31.10 | 31.55 | 30.80 | 31.22 | 31.22 | 31.05 | 31.20 | 31.40 | 31.20 | 30.80 |
| (Si+Al)/(R2O+RO+B) | 2.17 | 2.18 | 2.14 | 2.22 | 2.17 | 2.17 | 2.19 | 2.17 | 2.15 | 2.17 | 2.21 |
| $SiO_2$ - RO | 27.10 | 27.40 | 26.57 | 28.20 | 27.28 | 27.28 | 27.65 | 27.30 | 26.80 | 27.30 | 28.00 |
| $Al_2O_3$/RO | 0.49 | 0.49 | 0.48 | 0.49 | 0.49 | 0.49 | 0.49 | 0.49 | 0.49 | 0.49 | 0.49 |
| Log3 FT, °C | 1190 | 1194 | 1196 | 1197 | 1201 | 1199 | 1201 | 1196 | 1196 | 1197 | 1197 |
| Liquidus T, °C | 1120 | 1124 | 1132 | 1124 | 1131 | 1137 | 1119 | 1130 | 1130 | 1127 | 1121 |
| Delta T, °C | 70 | 70 | 64 | 73 | 70 | 62 | 82 | 66 | 66 | 70 | 76 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 8 , add Table 8 Continued .

Table 8 – Type 2 Glasses (cont'd)

| Components (wt%) | Examples | | | | | | | | | | |
|---|---|---|---|---|---|---|---|---|---|---|---|
| | 64 | 65 | 66 | 67 | 68 | 69 | 70 | 71 | 72.1 | 73 | 74 |
| $SiO_2$ | 55.05 | 54.95 | 54.20 | 55.25 | 54.8 | 55.25 | 54.95 | 54.75 | 54.55 | 54.80 | 54.70 |
| $Al_2O_3$ | 13.25 | 13.25 | 13.35 | 13.30 | 13.25 | 13.30 | 13.25 | 13.20 | 13.40 | 13.20 | 13.30 |
| CaO | 24.20 | 24.3 | 24.55 | 24.20 | 24.25 | 24.20 | 24.30 | 24.45 | 24.45 | 24.40 | 24.40 |
| MgO | 2.85 | 2.55 | 2.85 | 2.55 | 2.55 | 2.55 | 2.55 | 2.55 | 2.55 | 2.55 | 2.55 |
| $TiO_2$ | 0.55 | 0.55 | 0.55 | 0.55 | 0.55 | 0.55 | 0.55 | 0.55 | 0.55 | 0.55 | 0.55 |
| $Na_2O$ | 0.45 | 0.45 | 0.45 | 0.45 | 0.45 | 0.45 | 0.45 | 0.45 | 0.55 | 0.55 | 0.55 |
| $K_2O$ | 0.55 | 0.55 | 0.55 | 0.45 | 0.55 | 0.45 | 0.45 | 0.45 | 0.45 | 0.45 | 0.45 |
| $Fe_2O_3$ | 0.28 | 0.28 | 0.28 | 0.25 | 0.28 | 0.25 | 0.28 | 0.28 | 0.55 | 0.55 | 0.55 |
| $B_2O_3$ | 3.00 | 3.00 | 3.00 | 3.00 | 3.00 | 3.00 | 3.00 | 3.00 | 3.00 | 3.00 | 3.00 |
| F | 0.10 | 0.10 | 0.10 | - | 0.20 | - | - | 0.10 | 0.10 | 0.10 | 0.10 |
| SrO | 0.12 | 0.12 | 0.12 | - | 0.12 | - | 0.12 | 0.12 | 0.12 | 0.12 | 0.12 |
| RO (CaO + MgO) | 26.75 | 26.85 | 27.40 | 26.75 | 26.80 | 26.75 | 26.85 | 27.00 | 27.00 | 26.95 | 26.95 |
| $SiO_2$/CaO | 2.27 | 2.26 | 2.21 | 2.28 | 2.26 | 2.28 | 2.26 | 2.24 | 2.23 | 2.25 | 2.24 |
| $SiO_2$/RO | 2.06 | 2.05 | 1.98 | 2.07 | 2.04 | 2.07 | 2.05 | 2.03 | 2.02 | 2.03 | 2.03 |
| $SiO_2/Al_2O_3$ | 4.15 | 4.15 | 4.06 | 4.15 | 4.14 | 4.15 | 4.15 | 4.15 | 4.07 | 4.15 | 4.11 |
| $Al_2O_3$/CaO | 0.55 | 0.55 | 0.54 | 0.55 | 0.55 | 0.55 | 0.55 | 0.54 | 0.55 | 0.54 | 0.55 |
| $SiO_2 + Al_2O_3$ | 68.30 | 68.20 | 67.55 | 68.55 | 68.05 | 68.55 | 68.20 | 67.95 | 67.95 | 68.00 | 68.00 |
| $R2O+RO+B_2O_3$ | 30.75 | 30.85 | 31.40 | 30.65 | 30.80 | 30.65 | 30.85 | 31.00 | 31.00 | 30.95 | 30.95 |
| (Si+Al)/(R2O+RO+B) | 2.22 | 2.21 | 2.15 | 2.24 | 2.21 | 2.24 | 2.21 | 2.19 | 2.19 | 2.20 | 2.20 |
| $SiO_2$ - RO | 28.30 | 28.10 | 26.80 | 28.50 | 28.00 | 28.50 | 28.10 | 27.75 | 27.55 | 27.85 | 27.75 |
| $Al_2O_3$/RO | 0.50 | 0.49 | 0.49 | 0.50 | 0.49 | 0.50 | 0.49 | 0.49 | 0.50 | 0.49 | 0.49 |
| Log3 FT, °C | 1198 | 1198 | 1199 | 1202 | 1202 | 1203 | 1203 | 1203 | 1203 | 1204 | 1204 |
| Liquidus T, °C | 1127 | 1123 | 1137 | 1126 | 1147 | 1124 | 1125 | 1125 | 1124 | 1121 | 1122 |
| Delta T, °C | 71 | 75 | 62 | 76 | 55 | 79 | 78 | 78 | 79 | 83 | 82 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 8 Continued, add Table 9.

Table 9 – Type 2 Glasses

|  | Examples | | |
|---|---|---|---|
| Components (wt%) | 75 | 76 | 77 |
| $SiO_2$ | 53.00 | 53.00 | 53.50 |
| $Al_2O_3$ | 13.10 | 13.50 | 14.00 |
| CaO | 24.00 | 24.00 | 24.00 |
| MgO | 2.50 | 2.50 | 1.50 |
| $TiO_2$ | 0.50 | 0.50 | 0.50 |
| $Na_2O$ | 0.90 | 0.90 | 0.90 |
| $K_2O$ | 0.37 | 0.37 | 0.37 |
| $Fe_2O_3$ | 0.10 | 0.10 | 0.10 |
| $B_2O_3$ | 5.02 | 4.93 | 4.94 |
| F | 0.50 | 0.50 | 0.50 |
| SrO | 0.13 | 0.13 | 0.13 |
| $Cr_2O_3$ | 0.13 | 0.13 | 0.13 |
| RO (CaO + MgO) | 26.50 | 26.50 | 25.50 |
| $SiO_2$/CaO | 2.21 | 2.21 | 2.23 |
| $SiO_2$/RO | 2.00 | 2.00 | 2.10 |
| $SiO_2$/$Al_2O_3$ | 4.05 | 3.93 | 3.82 |
| $Al_2O_3$/CaO | 0.55 | 0.56 | 0.58 |
| $SiO_2$ + $Al_2O_3$ | 66.10 | 66.50 | 67.50 |
| $R2O+RO+B_2O_3$ | 32.79 | 32.70 | 31.71 |
| (Si+Al)/(R2O+RO+B) | 2.02 | 2.03 | 2.13 |
| $SiO_2$ - RO | 26.50 | 26.50 | 28.00 |
| $Al_2O_3$/RO | 0.49 | 0.51 | 0.55 |
| Log3 FT, °C | 1167 | 1172 | 1177 |
| Liquidus T, °C | 1110 | 1103 | 1122 |
| Delta T, °C | 57 | 69 | 57 |

UNITED STATES PATENT AND TRADEMARK OFFICE
CERTIFICATE OF CORRECTION

PATENT NO.        : 6,962,886 B2
APPLICATION NO.   : 10/164468
DATED             : November 8, 2005
INVENTOR(S)       : Frederick T. Wallenberger It is certified that error appears in the above-identified patent and that said Letters Patent is hereby corrected as shown below:

At the end of Table 9, add Table 10.

Table 10 – Type 2 Glasses

| Components (wt%) | Examples | | | | | | | | | | | |
|---|---|---|---|---|---|---|---|---|---|---|---|---|
| | 78 | 79 | 80 | 81 | 82 | 83 | 84 | 85 | 86 | 87 | 88 | 89 |
| SiO$_2$ | 55.40 | 55.80 | 56.20 | 55.75 | 56.35 | 55.60 | 55.80 | 56.40 | 56.0 | 56.00 | 56.00 | 56.55 |
| Al$_2$O$_3$ | 13.60 | 13.40 | 13.60 | 13.20 | 13.60 | 13.60 | 13.60 | 13.40 | 13.60 | 13.80 | 13.60 | 13.05 |
| CaO | 24.85 | 24.65 | 24.05 | 23.25 | 23.85 | 24.65 | 24.45 | 24.05 | 24.25 | 24.05 | 24.25 | 23.50 |
| MgO | 2.50 | 2.50 | 2.50 | 2.55 | 2.55 | 2.50 | 2.50 | 2.50 | 2.50 | 2.50 | 2.50 | 2.55 |
| TiO$_2$ | 0.50 | 0.50 | 0.50 | 1.10 | 0.50 | 0.50 | 0.50 | 0.50 | 0.50 | 0.50 | 0.50 | 1.10 |
| Na$_2$O | 0.90 | 0.90 | 0.90 | 0.90 | 0.90 | 0.90 | 0.90 | 0.90 | 0.90 | 0.90 | 0.90 | 0.90 |
| Fe$_2$O$_3$ | 0.25 | 0.25 | 0.25 | 0.25 | 0.25 | 0.25 | 0.25 | 0.25 | 0.25 | 0.25 | 0.25 | 0.25 |
| B$_2$O$_3$ | 2.00 | 2.00 | 2.00 | 3.00 | 2.00 | 2.00 | 2.00 | 2.00 | 2.00 | 2.00 | 2.00 | 2.00 |
| RO | 27.35 | 27.15 | 26.55 | 25.80 | 26.40 | 27.15 | 26.95 | 26.55 | 26.75 | 26.55 | 26.75 | 26.05 |
| SiO$_2$/CaO | 2.23 | 2.25 | 2.34 | 2.40 | 2.36 | 2.26 | 2.28 | 2.35 | 2.31 | 2.33 | 2.31 | 2.41 |
| SiO$_2$/RO | 2.03 | 2.06 | 2.12 | 2.16 | 2.13 | 2.05 | 2.07 | 2.12 | 2.09 | 2.11 | 2.09 | 2.17 |
| SiO$_2$/Al$_2$O$_3$ | 4.07 | 4.16 | 4.13 | 4.22 | 4.14 | 4.09 | 4.10 | 4.21 | 4.12 | 4.06 | 4.11 | 4.34 |
| Al$_2$O$_3$/CaO | 0.54 | 0.54 | 0.57 | 0.57 | 0.57 | 0.55 | 0.56 | 0.55 | 0.56 | 0.57 | 0.56 | 0.56 |
| SiO$_2$ + Al$_2$O$_3$ | 69.00 | 69.20 | 69.80 | 68.95 | 69.95 | 69.20 | 69.40 | 69.80 | 69.60 | 69.80 | 69.60 | 69.70 |
| R2O+RO+B$_2$O$_3$ | 30.25 | 30.05 | 29.45 | 29.70 | 29.30 | 30.05 | 29.85 | 29.45 | 29.65 | 29.45 | 29.65 | 28.95 |
| (Si+Al)/(R2O+RO+B) | 2.28 | 2.30 | 2.37 | 2.32 | 2.39 | 2.30 | 2.32 | 2.37 | 2.35 | 2.37 | 2.35 | 2.41 |
| SiO$_2$ – RO | 28.05 | 28.65 | 29.65 | 29.95 | 29.95 | 28.45 | 28.85 | 29.85 | 29.25 | 29.45 | 29.25 | 30.60 |
| Al$_2$O$_3$/RO | 0.50 | 0.49 | 0.51 | 0.51 | 0.51 | 0.50 | 0.50 | 0.50 | 0.51 | 0.52 | 0.51 | 0.50 |
| Log3 FT, °C | 1217 | 1211 | 1219 | 1204 | 1218 | 1211 | 1209 | 1216 | 1213 | 1219 | 1202 | 1218 |
| Liquidus T, °C | 1153 | 1156 | 1136 | 1127 | 1138 | 1154 | 1156 | 1143 | 1136 | 1151 | 1137 | 1131 |
| Delta T, °C | 64 | 55 | 83 | 77 | 80 | 57 | 53 | 73 | 77 | 68 | 65 | 87 |

UNITED STATES PATENT AND TRADEMARK OFFICE
CERTIFICATE OF CORRECTION

PATENT NO.        : 6,962,886 B2
APPLICATION NO.   : 10/164468
DATED             : November 8, 2005
INVENTOR(S)       : Frederick T. Wallenberger It is certified that error appears in the above-identified patent and that said Letters Patent is hereby corrected as shown below:

At the end of Table 10 add Table 10 Continued.

Table 10 – Type 2 Glasses (cont'd)

| Components (wt%) | Examples | | | | | | | | | |
|---|---|---|---|---|---|---|---|---|---|---|
| | 90 | 91 | 92 | 93 | 94 | 95 | 96 | 97 | 98 | 99' |
| $SiO_2$ | 56.25 | 56.15 | 57.75 | 57.75 | 56.75 | 57.15 | 57.25 | 58.55 | 57.25 | 56.25 |
| $Al_2O_3$ | 13.20 | 13.05 | 13.20 | 12.20 | 13.20 | 13.05 | 13.20 | 12.20 | 12.20 | 13.20 |
| CaO | 23.25 | 23.00 | 24.25 | 24.25 | 24.25 | 24.00 | 24.25 | 23.45 | 23.75 | 23.75 |
| MgO | 2.55 | 2.55 | 2.50 | 2.50 | 2.50 | 2.55 | 2.50 | 2.55 | 2.50 | 2.50 |
| $TiO_2$ | 1.10 | 1.10 | 1.10 | 1.10 | 1.10 | 1.10 | 1.10 | 1.10 | 1.10 | 1.10 |
| $Na_2O$ | 0.90 | 0.90 | 0.90 | 0.90 | 0.90 | 0.90 | 0.90 | 0.90 | 0.90 | 0.90 |
| $Fe_2O_3$ | 0.25 | 0.25 | 0.25 | 0.25 | 0.25 | 0.25 | 0.25 | 0.25 | 0.25 | 0.25 |
| $B_2O_3$ | 3.00 | 3.00 | 1.00 | 1.00 | 1.00 | 1.00 | 1.00 | 1.00 | 2.00 | 2.00 |
| RO | 25.80 | 25.55 | 26.75 | 26.75 | 26.75 | 26.55 | 26.75 | 26.00 | 26.25 | 26.25 |
| $SiO_2/CaO$ | 2.41 | 2.44 | 2.38 | 2.38 | 2.34 | 2.38 | 2.36 | 2.50 | 2.41 | 2.37 |
| $SiO_2/RO$ | 2.18 | 2.20 | 2.16 | 2.16 | 2.12 | 2.15 | 2.14 | 2.25 | 2.18 | 2.14 |
| $SiO_2/Al_2O_3$ | 4.26 | 4.30 | 4.38 | 4.73 | 4.30 | 4.38 | 4.33 | 4.80 | 4.69 | 4.26 |
| $Al_2O_3/CaO$ | 0.56 | 0.56 | 0.54 | 0.50 | 0.54 | 0.54 | 0.54 | 0.52 | 0.51 | 0.56 |
| $SiO_2 + Al_2O_3$ | 69.45 | 69.20 | 70.95 | 69.95 | 69.95 | 70.20 | 70.45 | 70.75 | 69.45 | 69.45 |
| $R2O+RO+B_2O_3$ | 29.70 | 29.45 | 28.65 | 28.65 | 28.65 | 28.45 | 28.65 | 27.90 | 29.15 | 29.15 |
| (Si+Al)/(R2O+RO+B) | 2.34 | 2.34 | 2.67 | 2.44 | 2.44 | 2.47 | 2.47 | 2.54 | 2.38 | 2.38 |
| $SiO_2 - RO$ | 30.45 | 30.60 | 31.00 | 31.00 | 30.00 | 30.60 | 30.50 | 32.55 | 31.00 | 30.00 |
| $Al_2O_3/RO$ | 0.51 | 0.51 | 0.49 | 0.46 | 0.49 | 0.49 | 0.49 | 0.47 | 0.46 | 0.50 |
| Log3 FT, °C | 1214 | 1212 | 1240 | 1227 | 1228 | 1235 | 1239 | 1236 | 1227 | 1224 |
| Liquidus T, °C | 1114 | 1178 | 1178 | 1164 | 1161 | 1154 | 1159 | 1159 | 1148 | 1149 |
| Delta T, °C | 100 | 34 | 62 | 63 | 67 | 81 | 80 | 77 | 79 | 75 |

UNITED STATES PATENT AND TRADEMARK OFFICE
CERTIFICATE OF CORRECTION

| | |
|---|---|
| PATENT NO. | : 6,962,886 B2 |
| APPLICATION NO. | : 10/164468 |
| DATED | : November 8, 2005 |
| INVENTOR(S) | : Frederick T. Wallenberger |

It is certified that error appears in the above-identified patent and that said Letters Patent is hereby corrected as shown below:

At the end of Table 10 Continued , add Table 10 Continued .

Table 10 – Type 2 Glasses (cont'd)

| Components (wt%) | Examples | | | | | | | | | |
|---|---|---|---|---|---|---|---|---|---|---|
| | 100 | 101 | 102 | 103 | 104 | 105 | 106 | 107 | 108 | 109 |
| $SiO_2$ | 56.65 | 56.75 | 58.05 | 55.80 | 57.25 | 56.75 | 56.25 | 56.50 | 55.80 | 56.75 |
| $Al_2O_3$ | 13.05 | 13.20 | 12.20 | 13.60 | 13.20 | 13.20 | 13.20 | 13.20 | 13.80 | 13.20 |
| CaO | 23.50 | 23.25 | 22.95 | 24.45 | 22.75 | 23.75 | 23.75 | 23.50 | 24.25 | 22.25 |
| MgO | 2.55 | 2.55 | 2.55 | 2.50 | 2.50 | 2.05 | 2.55 | 2.55 | 2.50 | 2.55 |
| $TiO_2$ | 1.10 | 1.10 | 1.10 | 0.50 | 1.10 | 1.10 | 1.10 | 1.10 | 0.50 | 1.10 |
| $Na_2O$ | 0.90 | 0.90 | 0.90 | 0.90 | 0.90 | 0.90 | 0.90 | 0.90 | 0.90 | 0.90 |
| $Fe_2O_3$ | 0.25 | 0.25 | 0.25 | 0.25 | 0.25 | 0.25 | 0.25 | 0.25 | 0.25 | 0.25 |
| $B_2O_3$ | 2.00 | 2.00 | 2.00 | 2.00 | 2.00 | 2.00 | 2.00 | 2.00 | 2.00 | 3.00 |
| RO | 26.05 | 25.80 | 25.50 | 26.95 | 25.25 | 25.80 | 26.30 | 26.05 | 26.75 | 24.80 |
| $SiO_2$/CaO | 2.41 | 2.44 | 2.53 | 2.28 | 2.52 | 2.39 | 2.37 | 2.40 | 2.30 | 2.55 |
| $SiO_2$/RO | 2.17 | 2.20 | 2.28 | 2.07 | 2.27 | 2.20 | 2.14 | 2.16 | 2.09 | 2.29 |
| $SiO_2/Al_2O_3$ | 4.34 | 4.30 | 4.76 | 4.10 | 4.34 | 4.30 | 4.26 | 4.28 | 4.04 | 4.30 |
| $Al_2O_3$/CaO | 0.56 | 0.57 | 0.53 | 0.56 | 0.58 | 0.56 | 0.55 | 0.56 | 0.57 | 0.59 |
| $SiO_2 + Al_2O_3$ | 69.70 | 69.95 | 70.25 | 69.40 | 70.45 | 69.95 | 69.45 | 69.70 | 69.60 | 69.95 |
| $R2O+RO+B_2O_3$ | 28.95 | 28.70 | 28.40 | 29.85 | 28.15 | 28.70 | 29.20 | 28.95 | 29.65 | 28.70 |
| (Si+Al)/(R2O+RO+B) | 2.41 | 2.44 | 2.47 | 2.32 | 2.50 | 2.44 | 2.38 | 2.41 | 2.35 | 2.44 |
| $SiO_2$ - RO | 30.60 | 30.95 | 32.55 | 28.85 | 32.00 | 30.95 | 29.95 | 30.45 | 29.05 | 31.95 |
| $Al_2O_3$/RO | 0.50 | 0.51 | 0.48 | 0.50 | 0.52 | 0.51 | 0.50 | 0.51 | 0.52 | 0.53 |
| Log3 FT. °C | 1225 | 1225 | 1225 | 1222 | 1237 | 1230 | 1220 | 1220 | 1222 | 1221 |
| Liquidus T. °C | 1145 | 1147 | 1142 | 1153 | 1149 | 1141 | 1131 | 1133 | 1137 | 1121 |
| Delta T. °C | 80 | 78 | 83 | 69 | 86 | 89 | 89 | 87 | 85 | 100 |

UNITED STATES PATENT AND TRADEMARK OFFICE
CERTIFICATE OF CORRECTION

| | |
|---|---|
| PATENT NO. | : 6,962,886 B2 |
| APPLICATION NO. | : 10/164468 |
| DATED | : November 8, 2005 |
| INVENTOR(S) | : Frederick T. Wallenberger |

It is certified that error appears in the above-identified patent and that said Letters Patent is hereby corrected as shown below:

At the end of Table 10 Continued, add Table 11.

Table 11 - Type 2 Glasses

| Components (wt%) | Examples | | |
|---|---|---|---|
| | 110 | 111 | 112 |
| $SiO_2$ | 57.75 | 57.75 | 56.10 |
| $Al_2O_3$ | 12.2 | 12.2 | 13.38 |
| CaO | 23.75 | 23.95 | 24.42 |
| MgO | 2.55 | 2.55 | 2.55 |
| $TiO_2$ | 1.10 | 1.10 | 0.55 |
| $Na_2O$ | 0.90 | 0.90 | 0.90 |
| $K_2O$ | - | - | - |
| $Fe_2O_3$ | 0.25 | 0.25 | 0.25 |
| $B_2O_3$ | 1.40 | 1.40 | 1.30 |
| RO (CaO + MgO) | 26.30 | 26.50 | 26.97 |
| $SiO_2$/CaO | 2.43 | 2.41 | 2.30 |
| $SiO_2$/RO | 2.20 | 2.18 | 2.08 |
| $SiO_2$/$Al_2O_3$ | 4.73 | 4.73 | 4.19 |
| $Al_2O_3$/CaO | 0.51 | 0.51 | 0.54 |
| $SiO_2$ + $Al_2O_3$ | 69.95 | 69.95 | 69.48 |
| $R2O+RO+B_2O_3$ | 28.60 | 28.80 | 29.17 |
| (Si+Al)/(R2O+RO+B) | 2.44 | 2.43 | 2.38 |
| $SiO_2$ - RO | 31.45 | 31.25 | 29.13 |
| $Al_2O_3$/RO | 0.46 | 0.46 | 0.50 |
| Log3 FT, °C | 1217 | 1218 | 1215 |
| Liquidus T, °C | 1151 | 1155 | 1150 |
| Delta T, °C | 66 | 63 | 65 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 11, add Table 12.

Table 12 -- Type 3 Glasses

| Components (wt%) | Examples | | | | | | | | |
|---|---|---|---|---|---|---|---|---|---|
| | 113 | 114 | 115 | 116 | 117 | 118 | 119 | 120 | 121 |
| $SiO_2$ | 58.70 | 57.95 | 58.35 | 60.05 | 58.25 | 58.86 | 59.97 | 59.16 | 58.76 |
| $Al_2O_3$ | 13.35 | 13.20 | 13.20 | 12.98 | 13.40 | 13.44 | 12.19 | 13.24 | 13.64 |
| CaO | 23.50 | 24.05 | 23.65 | 22.14 | 23.55 | 23.55 | 22.25 | 23.45 | 23.45 |
| MgO | 2.50 | 2.55 | 2.55 | 3.12 | 2.55 | 2.50 | 2.90 | 2.50 | 2.50 |
| $TiO_2$ | 0.50 | 1.10 | 1.10 | 0.55 | 1.10 | 0.50 | 1.50 | 0.50 | 0.50 |
| $Na_2O$ | 0.30 | - | - | - | - | - | - | - | - |
| $K_2O$ | - | - | - | - | - | - | - | - | - |
| $Li_2O$ | 0.90 | 0.90 | 0.90 | 0.91 | 0.90 | 0.90 | 0.90 | 0.90 | 0.90 |
| $Fe_2O_3$ | 0.20 | 0.25 | 0.25 | 0.25 | 0.25 | 0.25 | 0.25 | 0.25 | 0.25 |
| $B_2O_3$ | - | - | - | - | - | - | - | - | - |
| RO (CaO + MgO) | 26.00 | 26.60 | 26.20 | 25.26 | 26.10 | 26.05 | 25.15 | 25.95 | 25.95 |
| $SiO_2$/CaO | 2.50 | 2.41 | 2.47 | 2.71 | 2.47 | 2.50 | 2.70 | 2.52 | 2.51 |
| $SiO_2$/RO | 2.26 | 2.18 | 2.23 | 2.38 | 2.23 | 2.26 | 2.38 | 2.28 | 2.26 |
| $SiO_2$/$Al_2O_3$ | 4.40 | 4.39 | 4.42 | 4.63 | 4.35 | 4.38 | 4.92 | 4.47 | 4.31 |
| $Al_2O_3$/CaO | 0.57 | 0.55 | 0.56 | 0.59 | 0.57 | 0.57 | 0.55 | 0.56 | 0.58 |
| $SiO_2$ + $Al_2O_3$ | 72.05 | 71.15 | 71.55 | 73.03 | 71.65 | 72.30 | 72.16 | 72.40 | 72.40 |
| R2O+RO+$B_2O_3$ | 27.20 | 27.50 | 27.10 | 26.17 | 27.00 | 26.95 | 26.05 | 26.85 | 26.85 |
| (Si+Al)/(R2O+RO+B) | 2.65 | 2.59 | 2.64 | 2.79 | 2.65 | 2.68 | 2.77 | 2.70 | 2.70 |
| $SiO_2$ - RO | 32.70 | 31.35 | 32.15 | 34.79 | 32.15 | 32.81 | 34.82 | 33.21 | 32.81 |
| $Al_2O_3$/RO | 0.51 | 0.50 | 0.50 | 0.51 | 0.51 | 0.52 | 0.48 | 0.51 | 0.53 |
| Log3 FT, °C | 1211 | 1205 | 1211 | 1214 | 1215 | 1216 | 1217 | 1218 | 1218 |
| Liquidus T, °C | 1153 | 1151 | 1146 | 1159 | 1153 | 1153 | 1161 | 1156 | 1150 |
| Delta T, °C | 58 | 54 | 65 | 55 | 62 | 63 | 56 | 62 | 68 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 12, add Table 13.

Table 13 – Type 3 Glasses

| Components (wt%) | \multicolumn{10}{c}{Examples} |
|---|---|---|---|---|---|---|---|---|---|---|
|  | 122 | 123 | 124 | 125 | 126 | 127 | 128 | 129 | 130 | 131 |
| $SiO_2$ | 58.70 | 59.30 | 57.65 | 58.96 | 58.15 | 60.09 | 60.21 | 60.33 | 59.73 | 59.85 |
| $Al_2O_3$ | 13.35 | 12.10 | 13.40 | 13.24 | 13.20 | 12.22 | 12.24 | 12.27 | 12.92 | 12.95 |
| CaO | 23.50 | 22.60 | 24.15 | 23.65 | 23.85 | 23.31 | 23.35 | 23.40 | 22.00 | 22.04 |
| MgO | 2.50 | 3.40 | 2.55 | 2.50 | 2.55 | 2.70 | 2.50 | 2.30 | 3.10 | 2.90 |
| $TiO_2$ | 0.50 | 1.50 | 1.10 | 0.50 | 1.10 | 0.50 | 0.50 | 0.50 | 1.10 | 1.10 |
| $Na_2O$ | 0.60 | 0.45 | - | - | - | - | - | - | - | - |
| $Li_2O$ | 0.60 | 0.45 | 0.90 | 0.90 | 0.90 | 0.90 | 0.90 | 0.90 | 0.90 | 0.90 |
| $Fe_2O_3$ | 0.25 | 0.20 | 0.25 | 0.25 | 0.25 | 0.25 | 0.25 | 0.25 | 0.25 | 0.25 |
| $B_2O_3$ | - | - | - | - | - | - | - | - | - | - |
| RO (CaO + MgO) | 26.00 | 26.00 | 26.70 | 26.15 | 26.40 | 26.01 | 25.85 | 25.70 | 25.10 | 24.94 |
| $SiO_2$/CaO | 2.50 | 2.62 | 2.39 | 2.49 | 2.44 | 2.58 | 2.58 | 2.58 | 2.70 | 2.72 |
| $SiO_2$/RO | 2.26 | 2.28 | 2.16 | 2.25 | 2.20 | 2.31 | 2.33 | 2.35 | 2.38 | 2.40 |
| $SiO_2$/$Al_2O_3$ | 4.40 | 4.90 | 4.30 | 4.45 | 4.41 | 4.92 | 4.92 | 4.92 | 4.62 | 4.62 |
| $Al_2O_3$/CaO | 0.57 | 0.54 | 0.55 | 0.56 | 0.55 | 0.52 | 0.52 | 0.52 | 0.59 | 0.59 |
| $SiO_2$ + $Al_2O_3$ | 72.05 | 71.40 | 71.05 | 72.20 | 71.35 | 72.31 | 72.45 | 72.60 | 72.65 | 72.80 |
| $R_2O$+RO+$B_2O_3$ | 27.20 | 27.45 | 27.60 | 27.05 | 27.30 | 26.91 | 26.75 | 26.60 | 26.00 | 25.84 |
| (Si+Al)/($R_2O$+RO+B) | 2.65 | 2.70 | 2.57 | 2.67 | 2.61 | 2.69 | 2.71 | 2.73 | 2.30 | 2.32 |
| $SiO_2$ - RO | 32.7 | 33.30 | 30.95 | 32.81 | 31.75 | 34.08 | 34.36 | 34.63 | 34.63 | 34.91 |
| $Al_2O_3$/RO | 0.51 | 0.47 | 0.50 | 0.51 | 0.50 | 0.47 | 0.47 | 0.48 | 0.51 | 0.52 |
| Log3 FT, °C | 1226 | 1205 | 1206 | 1212 | 1237 | 1217 | 1213 | 1216 | 1214 | 1214 |
| Liquidus T, °C | 1157 | 1151 | 1154 | 1158 | 1172 | 1163 | 1162 | 1166 | 1164 | 1161 |
| Delta T, °C | 69 | 54 | 52 | 54 | 65 | 54 | 51 | 50 | 50 | 53 |

UNITED STATES PATENT AND TRADEMARK OFFICE
CERTIFICATE OF CORRECTION

PATENT NO.         : 6,962,886 B2
APPLICATION NO.    : 10/164468
DATED              : November 8, 2005
INVENTOR(S)        : Frederick T. Wallenberger It is certified that error appears in the above-identified patent and that said Letters Patent is hereby corrected as shown below:

At the end of Table 13, add Table 13 Continued.

Table 13 – Type 3 Glasses (cont'd)

| Components (wt%) | Examples | | | | | | | | | |
|---|---|---|---|---|---|---|---|---|---|---|
| | 132 | 133 | 134 | 135 | 136 | 137 | 138 | 139 | 140 | 141 |
| SiO$_2$ | 59.97 | 60.09 | 60.21 | 60.00 | 60.57 | 59.80 | 59.75 | 59.65 | 59.60 | 59.55 |
| Al$_2$O$_3$ | 12.97 | 13.00 | 13.02 | 12.50 | 13.10 | 12.25 | 12.25 | 12.25 | 12.25 | 12.25 |
| CaO | 22.09 | 22.13 | 22.18 | 23.70 | 22.31 | 22.60 | 22.85 | 23.35 | 23.60 | 23.85 |
| MgO | 2.70 | 2.50 | 2.30 | 1.90 | 1.70 | 3.10 | 2.90 | 2.50 | 2.30 | 2.10 |
| TiO$_2$ | 1.10 | 1.10 | 1.10 | 1.10 | 1.10 | 1.10 | 1.10 | 1.10 | 1.10 | 1.10 |
| Na$_2$O | - | - | - | - | - | 0.30 | 0.30 | 0.30 | 0.30 | 0.30 |
| Li$_2$O | 0.90 | 0.90 | 0.90 | 0.90 | 0.90 | 0.60 | 0.60 | 0.60 | 0.60 | 0.60 |
| Fe$_2$O$_3$ | 0.25 | 0.25 | 0.25 | 0.25 | 0.25 | - | - | - | - | - |
| B$_2$O$_3$ | - | - | - | - | - | - | - | - | - | - |
| RO (CaO + MgO) | 24.79 | 24.63 | 24.48 | 25.60 | 24.01 | 25.70 | 25.75 | 25.85 | 25.90 | 25.95 |
| SiO$_2$/CaO | 2.71 | 2.71 | 2.71 | 2.53 | 2.71 | 2.64 | 2.61 | 2.57 | 2.52 | 2.50 |
| SiO$_2$/RO | 2.42 | 2.44 | 2.46 | 2.34 | 2.52 | 2.33 | 2.32 | 2.31 | 2.30 | 2.29 |
| SiO$_2$/Al$_2$O$_3$ | 4.62 | 4.62 | 4.62 | 4.80 | 4.62 | 4.88 | 4.88 | 4.87 | 4.87 | 4.86 |
| Al$_2$O$_3$/CaO | 0.59 | 0.59 | 0.59 | 0.53 | 0.59 | 0.54 | 0.54 | 0.52 | 0.52 | 0.51 |
| SiO$_2$ + Al$_2$O$_3$ | 72.87 | 73.09 | 73.23 | 72.50 | 73.67 | 72.05 | 72.00 | 71.90 | 71.85 | 71.80 |
| R2O+RO+B$_2$O$_3$ | 25.69 | 25.53 | 25.38 | 26.50 | 24.91 | 26.60 | 26.65 | 26.75 | 26.80 | 26.85 |
| (Si+Al)/(R2O+RO+B) | 2.33 | 2.86 | 2.89 | 2.74 | 2.96 | 2.71 | 2.70 | 2.69 | 2.68 | 2.67 |
| SiO$_2$ - RO | 35.18 | 35.46 | 35.73 | 34.40 | 36.56 | 34.10 | 34.00 | 33.80 | 33.7 | 33.60 |
| Al$_2$O$_3$/RO | 0.47 | 0.53 | 0.53 | 0.49 | 0.55 | 0.47 | 0.48 | 0.47 | 0.47 | 0.47 |
| Log3 FT, °C | 1219 | 1223 | 1233 | 1239 | 1239 | 1240 | 1236 | 1236 | 1238 | 1234 |
| Liquidus T, °C | 1160 | 1155 | 1142 | 1139 | 1141 | 1156 | 1156 | 1159 | 1167 | 1173 |
| Delta T, °C | 59 | 68 | 91 | 100 | 98 | 94 | 80 | 77 | 71 | 61 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 13 Continued , add Table 13 Continued .

Table 13 – Type 3 Glasses (cont'd)

| Components (wt%) | 142 | 143 | 144 | 145 | 146 | 147 | 148 | 149 | 150 | 151 |
|---|---|---|---|---|---|---|---|---|---|---|
| $SiO_2$ | 59.50 | 60.00 | 59.95 | 59.90 | 59.85 | 60.21 | 60.33 | 60.75 | 60 21 | 59.71 |
| $Al_2O_3$ | 12.25 | 12.40 | 12.40 | 12.40 | 12 0 | 12.24 | 12.27 | 12.35 | 13.02 | 13.24 |
| CaO | 24.10 | 22.05 | 23.30 | 23.55 | 23.80 | 22.34 | 22.39 | 22.55 | 22 52 | 22.90 |
| MgO | 1.90 | 2.30 | 2.10 | 1 90 | 1.70 | 2.50 | 2 30 | 1.70 | 2.50 | 2.50 |
| $TiO_2$ | 1.10 | 1.10 | 1.10 | 1.10 | 1.10 | 1.50 | 1 50 | 1.50 | 0.50 | 0.50 |
| $Na_2O$ | 0.30 | - | - | - | - | - | - | - | - | - |
| $Li_2O$ | 0.60 | 0.90 | 0.90 | 0.90 | 0.90 | 0.90 | 0.90 | 0.90 | 1.00 | 0.90 |
| $Fe_2O_3$ | - | 0.25 | 0.25 | 0.26 | 0.25 | 0.25 | 0.25 | 0.25 | 0.25 | 0.25 |
| $B_2O_3$ | - | - | - | - | - | - | - | - | - | - |
| RO (CaO + MgO) | 26.00 | 24.35 | 25.40 | 25.45 | 25.50 | 24.84 | 24.69 | 24.25 | 25 02 | 25.40 |
| $SiO_2/CaO$ | 2.47 | 2.72 | 2.57 | 2.54 | 2.51 | 2.70 | 2 69 | 2 69 | 2.67 | 2.61 |
| $SiO_2/RO$ | 2.29 | 2.46 | 2.36 | 2.35 | 2 35 | 2.42 | 2.44 | 2 51 | 2.41 | 2.35 |
| $SiO_2/Al_2O_3$ | 4.86 | 4.84 | 4.83 | 4.83 | 4.99 | 4.92 | 4.92 | 4 92 | 4.62 | 4.51 |
| $Al_2O_3/CaO$ | 0.51 | 0.56 | 0.53 | 0 53 | 0.50 | 0.55 | 0.55 | 0 55 | 0.58 | 0.58 |
| $SiO_2 + Al_2O_3$ | 71.75 | 72.40 | 72.35 | 72.30 | 71.85 | 72.45 | 72.60 | 73 10 | 73.23 | 72.95 |
| $R2O+RO+B_2O_3$ | 26.90 | 25.23 | 26.30 | 26.35 | 26.40 | 25.74 | 25 59 | 25 15 | 26.02 | 26.30 |
| (Si+Al)/(R2O+RO+B) | 2.67 | 2.87 | 2.75 | 2.74 | 2.72 | 2.81 | 2.83 | 2.91 | 2.81 | 2.77 |
| $SiO_2 - RO$ | 33.50 | 35.65 | 36.55 | 34.45 | 34 35 | 35.37 | 35.64 | 36.50 | 35.19 | 34 31 |
| $Al_2O_3/RO$ | 0.47 | 0.51 | 0.53 | 0.49 | 0.47 | 0.49 | 0.50 | 0.50 | 0.52 | 0.52 |
| Log3 FT, °C | 1234 | 1230 | 1231 | 1224 | 1224 | 1215 | 1231 | 1240 | 1231 | 1227 |
| Liquidus T, °C | 1181 | 1146 | 1152 | 1156 | 1156 | 1162 | 1160 | 1166 | 1143 | 1142 |
| Delta T, °C | 53 | 84 | 79 | 68 | 68 | 53 | 71 | 74 | 88 | 85 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 13 Continued, add Table 13 Continued.

Table 13 – Type 3 Glasses (cont'd)

| Components (wt%) | 152 | 153 | 154 | 155 | 156 | 157 | 158 | 159 | 160 | 161 | 162 |
|---|---|---|---|---|---|---|---|---|---|---|---|
| $SiO_2$ | 59.46 | 60.02 | 60.26 | 60.14 | 60.10 | 60.23 | 60.10 | 60.23 | 60.14 | 60.05 | 60.05 |
| $Al_2O_3$ | 13.24 | 12.35 | 12.40 | 12.37 | 13.00 | 12.25 | 13.00 | 12.25 | 12.37 | 12.98 | 12.98 |
| CaO | 23.15 | 23.35 | 23.45 | 23.40 | 22.15 | 23.36 | 22.15 | 23.36 | 23.40 | 22.14 | 22.14 |
| MgO | 2.50 | 2.54 | 2.55 | 2.54 | 2.50 | 2.50 | 2.50 | 2.50 | 2.54 | 3.12 | 3.12 |
| $TiO_2$ | 0.50 | 0.50 | 0.51 | 0.51 | 1.10 | 0.51 | 1.10 | 0.51 | 0.51 | 0.55 | 0.55 |
| $Na_2O$ | - | - | - | - | - | - | - | - | - | - | - |
| $Li_2O$ | 0.90 | 1.00 | 0.60 | 0.80 | 0.90 | 0.90 | 0.90 | 0.90 | 0.80 | 0.91 | 0.91 |
| $Fe_2O_3$ | 0.25 | 0.23 | 0.23 | 0.23 | 0.25 | 0.25 | 0.25 | 0.25 | 0.23 | 0.25 | 0.25 |
| $B_2O_3$ | - | - | - | - | - | - | - | - | - | - | - |
| RO (CaO + MgO) | 26.65 | 25.89 | 26.00 | 25.94 | 24.65 | 25.86 | 24.65 | 25.86 | 25.94 | 25.26 | 25.26 |
| $SiO_2$/CaO | 2.57 | 2.57 | 2.57 | 2.57 | 2.71 | 2.58 | 2.71 | 2.58 | 2.57 | 2.71 | 2.71 |
| $SiO_2$/RO | 2.32 | 2.32 | 2.32 | 2.32 | 2.44 | 2.33 | 2.44 | 2.33 | 2.32 | 2.38 | 2.38 |
| $SiO_2$/$Al_2O_3$ | 4.49 | 4.86 | 4.89 | 4.86 | 4.62 | 4.92 | 4.62 | 4.92 | 4.86 | 4.63 | 4.63 |
| $Al_2O_3$/CaO | 0.57 | 0.53 | 0.53 | 0.53 | 0.59 | 0.52 | 0.59 | 0.52 | 0.53 | 0.59 | 0.59 |
| $SiO_2$ + $Al_2O_3$ | 72.70 | 72.37 | 72.66 | 72.51 | 73.10 | 72.48 | 73.10 | 72.48 | 72.51 | 73.03 | 73.03 |
| $R_2O$+RO+$B_2O_3$ | 26.50 | 26.85 | 26.60 | 26.74 | 25.55 | 26.76 | 25.55 | 26.76 | 26.74 | 26.17 | 26.17 |
| (Si+Al)/($R_2O$+RO+B) | 2.74 | 2.70 | 2.73 | 2.71 | 2.86 | 2.71 | 2.86 | 2.71 | 2.71 | 2.79 | 2.79 |
| $SiO_2$ - RO | 33.81 | 34.13 | 34.26 | 34.20 | 34.45 | 34.37 | 35.45 | 34.44 | 34.20 | 34.79 | 34.79 |
| $Al_2O_3$/RO | 0.52 | 0.48 | 0.48 | 0.48 | 0.53 | 0.47 | 0.53 | 0.47 | 0.48 | 0.51 | 0.51 |
| Log3 FT, °C | 1226 | 1209 | 1230 | 1219 | 1235 | 1220 | 1237 | 1224 | 1219 | 1219 | 1223 |
| Liquidus T, °C | 1147 | 1159 | 1158 | 1159 | 1133 | 1160 | 1136 | 1158 | 1159 | 1164 | 1163 |
| Delta T, °C | 79 | 50 | 72 | 60 | 102 | 60 | 101 | 66 | 60 | 55 | 60 |

UNITED STATES PATENT AND TRADEMARK OFFICE
CERTIFICATE OF CORRECTION

PATENT NO.       : 6,962,886 B2
APPLICATION NO.  : 10/164468
DATED            : November 8, 2005
INVENTOR(S)      : Frederick T. Wallenberger It is certified that error appears in the above-identified patent and that said Letters Patent is hereby corrected as shown below:

At the end of Table 13 Continued, add Table 14.

Table 14 – Type 4 Glasses

| Components (wt%) | Examples | | | | | | |
|---|---|---|---|---|---|---|---|
| | 163 | 164 | 165 | 166 | 167 | 168 | 169 |
| $SiO_2$ | 58.30 | 58.20 | 58.10 | 58.15 | 58.15 | 58.00 | 58.25 |
| $Al_2O_3$ | 13.03 | 13.03 | 13.03 | 13.20 | 13.33 | 13.03 | 13.33 |
| CaO | 23.54 | 23.64 | 23.74 | 22.85 | 23.39 | 23.84 | 23.29 |
| MgO | 2.50 | 2.50 | 2.50 | 2.55 | 2.50 | 2.50 | 2.50 |
| $TiO_2$ | 0.50 | 0.50 | 0.50 | 1.10 | 0.50 | 0.50 | 0.50 |
| $Li_2O$ | 0.90 | 0.90 | 0.90 | 0.90 | 0.90 | 0.90 | 0.90 |
| ZnO | 1.00 | 1.00 | 1.00 | 1.00 | 1.00 | 1.00 | 1.00 |
| $Fe_2O_3$ | 0.23 | 0.23 | 0.23 | 0.25 | 0.23 | 0.23 | 0.23 |
| $B_2O_3$ | - | - | - | - | - | - | - |
| | | | | | | | |
| RO (CaO + MgO) | 26.04 | 26.14 | 26.24 | 25.40 | 25.89 | 26.34 | 25.79 |
| $SiO_2$/CaO | 2.48 | 2.46 | 2.45 | 2.54 | 2.49 | 2.43 | 2.50 |
| $SiO_2$/RO | 2.24 | 2.23 | 2.21 | 2.29 | 2.25 | 2.20 | 2.26 |
| $SiO_2$/$Al_2O_3$ | 4.47 | 4.47 | 4.46 | 4.41 | 4.36 | 4.45 | 4.37 |
| $Al_2O_3$/CaO | 0.55 | 0.55 | 0.55 | 0.58 | 0.57 | 0.55 | 0.57 |
| $SiO_2$ + $Al_2O_3$ | 71.33 | 71.23 | 71.13 | 71.35 | 71.48 | 71.03 | 71.58 |
| $R_2O$+RO+$B_2O_3$ | 26.94 | 27.04 | 27.14 | 26.30 | 26.79 | 27.24 | 26.69 |
| (Si+Al)/($R_2O$+RO+B) | 2.65 | 2.63 | 2.62 | 2.71 | 2.67 | 2.61 | 2.68 |
| $SiO_2$ - RO | 32.26 | 32.06 | 31.86 | 32.75 | 32.26 | 31.66 | 32.46 |
| $Al_2O_3$/RO | 0.50 | 0.50 | 0.50 | 0.52 | 0.51 | 0.49 | 0.52 |
| | | | | | | | |
| Log3 FT, °C | 1204 | 1205 | 1206 | 1207 | 1208 | 1208 | 1213 |
| Liquidus T, °C | 1147 | 1148 | 1144 | 1136 | 1152 | 1152 | 1146 |
| Delta T, °C | 57 | 57 | 62 | 71 | 56 | 56 | 67 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 14, add Table 15.

Table 15 – Type 4 Glasses

| Components (wt%) | Examples | | | | | |
|---|---|---|---|---|---|---|
| | 170 | 171 | 172 | 173 | 174 | 175 |
| $SiO_2$ | 58.00 | 58.10 | 57.35 | 57.95 | 59.61 | 59.47 |
| $Al_2O_3$ | 13.03 | 13.63 | 13.20 | 13.20 | 12.16 | 12.16 |
| CaO | 23.84 | 23.14 | 23.65 | 24.05 | 23.50 | 24.22 |
| MgO | 2.50 | 2.50 | 2.55 | 2.55 | 2.50 | 1.90 |
| $TiO_2$ | 0.50 | 0.50 | 1.10 | 1.10 | 1.10 | 1.10 |
| $Li_2O$ | 0.90 | 0.90 | 0.90 | 0.90 | 0.45 | 0.45 |
| ZnO | 1.00 | 1.00 | 1.00 | 1.00 | 0.45 | 0.45 |
| $Fe_2O_3$ | 0.23 | 0.23 | 0.25 | 0.25 | - | - |
| $B_2O_3$ | - | - | - | - | - | - |
| RO (CaO + MgO) | 26.34 | 25.64 | 26.20 | 26.60 | 26.00 | 26.12 |
| $SiO_2$/CaO | 2.43 | 2.51 | 2.42 | 2.41 | 2.54 | 2.46 |
| $SiO_2$/RO | 2.20 | 2.26 | 2.19 | 2.18 | 2.29 | 2.28 |
| $SiO_2$/$Al_2O_3$ | 4.45 | 4.26 | 4.34 | 4.39 | 4.90 | 4.89 |
| $Al_2O_3$/CaO | 0.55 | 0.59 | 0.56 | 0.55 | 0.52 | 0.50 |
| $SiO_2$ + $Al_2O_3$ | 71.03 | 71.73 | 70.55 | 71.15 | 71.77 | 71.63 |
| $R2O+RO+B_2O_3$ | 27.24 | 26.54 | 27.10 | 27.50 | 26.45 | 26.57 |
| (Si+Al)/(R2O+RO+B) | 2.61 | 2.70 | 2.60 | 2.60 | 2.71 | 2.70 |
| $SiO_2$ - RO | 31.66 | 32.46 | 31.15 | 31.30 | 33.61 | 33.35 |
| $Al_2O_3$/RO | 0.49 | 0.53 | 0.50 | 0.50 | 0.47 | 0.47 |
| Log3 FT, °C | 1208 | 1212 | 1195 | 1195 | 1229 | 1218 |
| Liquidus T, °C | 1149 | 1157 | 1141 | 1140 | 1154 | 1159 |
| Delta T, °C | 59 | 55 | 54 | 55 | 75 | 59 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 15, add Table 16.

Table 16 – Type 5 Glasses

| Components (wt%) | Example 176 | Example 177 |
|---|---|---|
| $SiO_2$ | 59.00 | 58.70 |
| $Al_2O_3$ | 12.00 | 11.90 |
| CaO | 22.50 | 22.4 |
| MgO | 3.40 | 3.40 |
| $TiO_2$ | 1.00 | 1.00 |
| $Na_2O$ | 0.90 | 0.90 |
| ZnO | 1.00 | 1.50 |
| $K_2O$ | - | - |
| $Fe_2O_3$ | 0.20 | 0.20 |
| $B_2O_3$ | - | - |
| RO | 25.90 | 25.80 |
| $SiO_2$/CaO | 2.62 | 2.62 |
| $SiO_2$/RO | 2.28 | 2.28 |
| $SiO_2$/$Al_2O_3$ | 4.92 | 4.93 |
| $Al_2O_3$/CaO | 0.53 | 0.53 |
| $SiO_2$+$Al_2O_3$ | 71.00 | 70.60 |
| $R2O+RO+B_2O_3$ | 26.80 | 26.70 |
| (Si+Al)/(R2O+RO+B) | 2.65 | 2.64 |
| $SiO_2$-RO | 33.10 | 32.90 |
| $Al_2O_3$/RO | 0.46 | 0.46 |
| Log3 FT °C | 1234 | 1231 |
| Liquidus T °C | 1175 | 1181 |
| Delta(T3-TL) °C | 59 | 50 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 16, add Table 17.

Table 17 – Type 6 Glasses

| Components (wt%) | Examples | | | | | | | | | |
|---|---|---|---|---|---|---|---|---|---|---|
| | 178 | 179 | 180 | 181 | 182 | 183 | 184 | 185 | 186 | 187 |
| $SiO_2$ | 58.00 | 58.10 | 58.30 | 57.90 | 58.11 | 57.60 | 58.50 | 57.80 | 58.00 | 57.80 |
| $Al_2O_3$ | 13.03 | 13.03 | 13.03 | 13.23 | 13.36 | 13.23 | 12.76 | 13.43 | 13.03 | 13.03 |
| CaO | 23.84 | 23.74 | 23.54 | 23.74 | 23.40 | 23.84 | 23.61 | 23.64 | 23.84 | 23.84 |
| MgO | 2.50 | 2.50 | 2.50 | 2.50 | 2.50 | 2.50 | 2.50 | 2.50 | 2.50 | 2.50 |
| $TiO_2$ | 0.50 | 0.50 | 0.50 | 0.50 | 0.50 | 0.50 | 0.50 | 0.50 | 0.50 | 0.50 |
| $Na_2O$ | - | - | - | - | - | 0.10 | - | - | - | - |
| $K_2O$ | - | - | - | - | - | - | - | - | - | - |
| $Li_2O$ | 0.90 | 0.90 | 0.90 | 0.90 | 0.90 | 0.80 | 0.90 | 0.90 | 0.90 | 0.90 |
| $Fe_2O_3$ | 0.23 | 0.23 | 0.23 | 0.23 | 0.23 | 0.23 | 0.23 | 0.23 | 0.23 | 0.23 |
| $B_2O_3$ | 1.00 | 1.00 | 1.00 | 1.00 | 1.00 | 1.20 | 1.00 | 1.00 | 1.00 | 1.20 |
| RO (CaO + MgO) | 26.34 | 26.24 | 26.04 | 26.24 | 25.90 | 26.34 | 26.11 | 26.14 | 26.34 | 26.34 |
| $SiO_2$/CaO | 2.43 | 2.45 | 2.48 | 2.44 | 2.48 | 2.42 | 2.48 | 2.45 | 2.43 | 2.42 |
| $SiO_2$/RO | 2.20 | 2.21 | 2.24 | 2.21 | 2.24 | 2.19 | 2.24 | 2.21 | 2.20 | 2.19 |
| $SiO_2$/$Al_2O_3$ | 4.45 | 4.46 | 4.47 | 4.38 | 4.35 | 4.35 | 4.58 | 4.30 | 4.45 | 4.44 |
| $Al_2O_3$/CaO | 0.55 | 0.55 | 0.55 | 0.56 | 0.57 | 0.55 | 0.54 | 0.57 | 0.55 | 0.55 |
| $SiO_2$ + $Al_2O_3$ | 71.03 | 71.13 | 71.33 | 71.13 | 71.47 | 70.83 | 71.26 | 71.23 | 71.03 | 70.83 |
| $R_2O$+RO+$B_2O_3$ | 28.24 | 28.14 | 27.94 | 28.14 | 27.80 | 28.44 | 28.01 | 28.04 | 28.24 | 28.44 |
| (Si+Al)/($R_2O$+RO+B) | 2.52 | 2.53 | 2.55 | 2.53 | 2.57 | 2.49 | 2.54 | 2.54 | 2.52 | 2.49 |
| $SiO_2$ - RO | 31.66 | 31.86 | 32.26 | 31.66 | 32.21 | 31.26 | 32.39 | 31.66 | 31.66 | 31.46 |
| $Al_2O_3$/RO | 0.49 | 0.50 | 0.50 | 0.50 | 0.52 | 0.50 | 0.49 | 0.51 | 0.49 | 0.49 |
| Log3 FT, °C | 1192 | 1194 | 1195 | 1195 | 1196 | 1196 | 1197 | 1197 | 1198 | 1198 |
| Liquidus T, °C | 1137 | 1135 | 1140 | 1137 | 1133 | 1133 | 1139 | 1139 | 1138 | 1135 |
| Delta T, °C | 55 | 59 | 55 | 58 | 63 | 63 | 58 | 58 | 60 | 63 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 17, add Table 18.

Table 18 – Type 6 Glasses

| Components (wt%) | Examples | | | | | | | | | |
|---|---|---|---|---|---|---|---|---|---|---|
| | 188 | 189 | 190 | 191 | 192 | 193 | 194 | 195 | 196* | 197* |
| $SiO_2$ | 58.00 | 57.90 | 58.15 | 58.25 | 58.00 | 58.10 | 58.30 | 58.20 | 58.74 | 58.64 |
| $Al_2O_3$ | 13.43 | 13.43 | 13.33 | 13.33 | 13.63 | 13.63 | 13.03 | 13.03 | 13.05 | 13.15 |
| CaO | 23.44 | 23.54 | 23.39 | 23.29 | 23.24 | 23.14 | 23.54 | 23.64 | 22.97 | 22.97 |
| MgO | 2.50 | 2.50 | 2.50 | 2.50 | 2.50 | 2.50 | 2.50 | 2.50 | 2.36 | 2.36 |
| $TiO_2$ | 0.50 | 0.50 | 0.50 | 0.50 | 0.50 | 0.50 | 0.50 | 0.50 | 0.49 | 0.49 |
| $Na_2O$ | - | - | - | - | - | - | - | - | - | - |
| $K_2O$ | - | - | - | - | - | - | - | - | 0.09 | 0.09 |
| $Li_2O$ | 0.90 | 0.90 | 0.90 | 0.90 | 0.90 | 0.90 | 0.90 | 0.90 | 0.91 | 0.91 |
| $Fe_2O_3$ | 0.23 | 0.23 | 0.23 | 0.23 | 0.23 | 0.23 | 0.23 | 0.23 | 0.29 | 0.29 |
| $B_2O_3$ | 1.00 | 1.00 | 1.00 | 1.00 | 1.00 | 1.00 | 1.00 | 1.00 | 1.00 | 1.00 |
| RO (CaO + MgO) | 25.94 | 26.04 | 25.89 | 25.79 | 25.74 | 25.64 | 26.04 | 26.14 | 25.33 | 25.33 |
| $SiO_2/CaO$ | 2.47 | 2.45 | 2.49 | 2.51 | 2.50 | 2.51 | 2.48 | 2.46 | 2.56 | 2.55 |
| $SiO_2/RO$ | 2.24 | 2.22 | 2.25 | 2.26 | 2.25 | 2.27 | 2.24 | 2.23 | 2.32 | 2.32 |
| $SiO_2/Al_2O_3$ | 4.32 | 4.31 | 4.36 | 4.37 | 4.26 | 4.26 | 4.47 | 4.47 | 4.50 | 4.46 |
| $Al_2O_3/CaO$ | 0.57 | 0.57 | 0.57 | 0.57 | 0.59 | 0.59 | 0.55 | 0.55 | 0.57 | 0.57 |
| $SiO_2 + Al_2O_3$ | 71.43 | 71.33 | 71.48 | 71.58 | 71.63 | 71.73 | 71.33 | 71.23 | 71.79 | 71.79 |
| $R_2O+RO+B_2O_3$ | 27.84 | 27.94 | 27.79 | 27.69 | 27.14 | 27.54 | 27.94 | 28.04 | 27.33 | 27.33 |
| $(Si+Al)/(R2O+RO+B)$ | 2.57 | 2.55 | 2.57 | 2.59 | 2.64 | 2.60 | 2.55 | 2.54 | 2.63 | 2.63 |
| $SiO_2 - RO$ | 32.06 | 31.86 | 32.26 | 32.46 | 32.26 | 32.46 | 32.26 | 32.06 | 33.41 | 33.31 |
| $Al_2O_3/RO$ | 0.51 | 0.52 | 0.51 | 0.52 | 0.53 | 0.53 | 0.50 | 0.50 | 0.52 | 0.52 |
| Log3 FT, °C | 1202 | 1203 | 1203 | 1202 | 1207 | 1212 | 1200 | 1201 | 1210 | 1209 |
| Liquidus T, °C | 1139 | 1137 | 1136 | 1145 | 1144 | 1146 | 1132 | 1137 | 1145 | 1151 |
| Delta T, °C | 63 | 66 | 67 | 57 | 63 | 66 | 68 | 64 | 65 | 58 |

* compositions include 0.05 wt% SrO and 0.08 wt% SO3

UNITED STATES PATENT AND TRADEMARK OFFICE
CERTIFICATE OF CORRECTION

PATENT NO.        : 6,962,886 B2
APPLICATION NO. : 10/164468
DATED             : November 8, 2005
INVENTOR(S)       : Frederick T. Wallenberger It is certified that error appears in the above-identified patent and that said Letters Patent is hereby corrected as shown below:

At the end of Table 18 , add Table 18 Continued .

Table 18 – Type 6 Glasses (cont'd)

| Components (wt%) | Examples | | | | | | | | | |
|---|---|---|---|---|---|---|---|---|---|---|
| | 198* | 199 | 200 | 201 | 202 | 203 | 204 | 205 | 206 | 207 |
| $SiO_2$ | 58.64 | 58.75 | 57.80 | 57.60 | 57.60 | 57.60 | 58.50 | 58.40 | 58.30 | 58.40 |
| $Al_2O_3$ | 12.95 | 12.93 | 13.23 | 13.23 | 13.23 | 13.03 | 12.76 | 12.76 | 13.03 | 13.03 |
| CaO | 22.87 | 22.93 | 23.84 | 23.84 | 23.84 | 24.04 | 23.61 | 23.71 | 23.54 | 23.44 |
| MgO | 2.36 | 2.36 | 2.50 | 2.50 | 2.50 | 2.50 | 2.50 | 2.50 | 2.50 | 2.50 |
| $TiO_2$ | 0.49 | 0.50 | 0.50 | 0.50 | 0.50 | 0.50 | 0.50 | 0.50 | 0.50 | 0.50 |
| $Na_2O$ | - | 0.04 | - | - | 0.20 | 0.20 | - | - | - | - |
| $K_2O$ | 0.09 | 0.10 | - | - | - | - | - | - | - | - |
| $Li_2O$ | 0.91 | 0.90 | 0.90 | 0.90 | 0.70 | 0.70 | 0.90 | 0.90 | 0.90 | 0.90 |
| $Fe_2O_3$ | 0.29 | 0.29 | 0.23 | 0.23 | 0.23 | 0.23 | 0.23 | 0.23 | 0.23 | 0.23 |
| $B_2O_3$ | 1.00 | 1.20 | 1.00 | 1.20 | 1.20 | 1.20 | 1.00 | 1.00 | 1.00 | 1.00 |
| RO (CaO + MgO) | 25.23 | 25.29 | 26.34 | 26.34 | 26.34 | 26.54 | 26.11 | 26.21 | 26.04 | 25.94 |
| $SiO_2$/CaO | 2.56 | 2.56 | 2.42 | 2.42 | 2.42 | 2.40 | 2.48 | 2.46 | 2.48 | 2.49 |
| $SiO_2$/RO | 2.32 | 2.32 | 2.19 | 2.19 | 2.19 | 2.17 | 2.24 | 2.23 | 2.24 | 2.25 |
| $SiO_2$/$Al_2O_3$ | 4.53 | 4.54 | 4.37 | 4.35 | 4.35 | 4.37 | 4.58 | 4.58 | 4.47 | 4.48 |
| $Al_2O_3$/CaO | 0.57 | 0.56 | 0.55 | 0.55 | 0.55 | 0.54 | 0.54 | 0.54 | 0.55 | 0.56 |
| $SiO_2$ + $Al_2O_3$ | 71.59 | 71.68 | 71.03 | 70.83 | 70.83 | 70.63 | 71.26 | 71.16 | 71.33 | 71.43 |
| $R_2O$+RO+$B_2O_3$ | 27.23 | 27.53 | 28.24 | 28.44 | 28.44 | 28.64 | 28.01 | 28.11 | 27.94 | 27.84 |
| (Si+Al)/(R2O+RO+B) | 2.63 | 2.60 | 2.51 | 2.49 | 2.49 | 2.47 | 2.54 | 2.53 | 2.55 | 2.57 |
| $SiO_2$ - RO | 33.41 | 33.46 | 31.46 | 31.26 | 31.26 | 31.06 | 32.39 | 32.19 | 32.26 | 32.36 |
| $Al_2O_3$/RO | 0.51 | 0.51 | 0.50 | 0.50 | 0.50 | 0.49 | 0.49 | 0.49 | 0.50 | 0.51 |
| Log3 FT. °C | 1204 | 1210 | 1201 | 1200 | 1208 | 1201 | 1202 | 1203 | 1201 | 1208 |
| Liquidus T. °C | 1142 | 1127 | 1126 | 1125 | 1135 | 1145 | 1141 | 1145 | 1138 | 1137 |
| Delta T. °C | 62 | 83 | 75 | 75 | 73 | 56 | 61 | 58 | 63 | 71 |

* compositions include 0.05 wt% SrO and 0.08 wt% SO3

UNITED STATES PATENT AND TRADEMARK OFFICE
CERTIFICATE OF CORRECTION

PATENT NO.        : 6,962,886 B2
APPLICATION NO.   : 10/164468
DATED             : November 8, 2005
INVENTOR(S)       : Frederick T. Wallenberger It is certified that error appears in the above-identified patent and that said Letters Patent is hereby corrected as shown below:

At the end of Table 18 Continued, add Table 18 Continued.

Table 18 – Type 6 Glasses (cont'd)

| Components (wt%) | Examples | | | | | | | | | |
|---|---|---|---|---|---|---|---|---|---|---|
|  | 208 | 209 | 210 | 211 | 212 | 213 | 214 | 215 | 216 | 217 |
| $SiO_2$ | 58.15 | 58.25 | 58.70 | 58.00 | 57.60 | 58.61 | 58.61 | 58.00 | 58.40 | 58.40 |
| $Al_2O_3$ | 13.33 | 13.33 | 12.75 | 13.03 | 13.03 | 12.16 | 12.16 | 13.23 | 13.36 | 13.03 |
| CaO | 23.39 | 23.29 | 23.50 | 23.84 | 24.04 | 23.50 | 23.50 | 23.64 | 23.11 | 23.44 |
| MgO | 2.50 | 2.50 | 2.50 | 2.50 | 2.50 | 2.50 | 2.50 | 2.50 | 2.50 | 2.50 |
| $TiO_2$ | 0.50 | 0.50 | 0.50 | 0.50 | 0.50 | 1.10 | 1.10 | 0.50 | 0.50 | 0.50 |
| $Na_2O$ | - | - | 0.60 | - | - | - | - | - | - | - |
| $K_2O$ | - | - | - | - | - | - | 0.45 | - | - | - |
| $Li_2O$ | 0.90 | 0.90 | 0.60 | 0.90 | 0.90 | 0.90 | 0.45 | 0.90 | 0.90 | 0.90 |
| $Fe_2O_3$ | 0.25 | 0.25 | 0.25 | 0.23 | 0.23 | 0.23 | 0.23 | 0.23 | 0.23 | 0.23 |
| $B_2O_3$ | 1.00 | 1.00 | 0.60 | 1.00 | 1.20 | 1.00 | 1.00 | 1.00 | 1.00 | 1.00 |
| RO (CaO + MgO) | 25.89 | 25.79 | 26.00 | 26.34 | 26.54 | 26.00 | 26.00 | 26.14 | 25.61 | 25.94 |
| $SiO_2$/CaO | 2.49 | 2.50 | 2.50 | 2.43 | 2.40 | 2.49 | 2.49 | 2.45 | 2.52 | 2.49 |
| $SiO_2$/RO | 2.25 | 2.26 | 2.26 | 2.20 | 2.17 | 2.25 | 2.25 | 2.22 | 2.28 | 2.25 |
| $SiO_2$/$Al_2O_3$ | 4.36 | 4.37 | 4.60 | 4.45 | 4.42 | 4.82 | 4.82 | 4.38 | 4.37 | 4.48 |
| $Al_2O_3$/CaO | 0.57 | 0.57 | 0.54 | 0.55 | 0.54 | 0.52 | 0.52 | 0.56 | 0.58 | 0.56 |
| $SiO_2$ + $Al_2O_3$ | 71.48 | 71.58 | 71.45 | 71.03 | 70.63 | 70.77 | 70.77 | 71.23 | 71.76 | 71.43 |
| $R2O+RO+B_2O_3$ | 27.79 | 27.69 | 27.80 | 28.24 | 28.64 | 27.90 | 27.90 | 28.04 | 27.51 | 27.84 |
| (Si+Al)/(R2O+RO+B) | 2.57 | 2.59 | 2.57 | 2.52 | 2.47 | 2.54 | 2.54 | 2.54 | 2.61 | 2.57 |
| $SiO_2$ · RO | 32.26 | 32.46 | 32.70 | 31.66 | 31.06 | 32.61 | 32.61 | 31.86 | 32.79 | 32.46 |
| $Al_2O_3$/RO | 0.51 | 0.52 | 0.49 | 0.49 | 0.49 | 0.47 | 0.47 | 0.51 | 0.52 | 0.50 |
| Log3 FT, °C | 1197 | 1200 | 1216 | 1202 | 1194 | 1201 | 1227 | 1201 | 1204 | 1201 |
| Liquidus T, °C | 1130 | 1134 | 1160 | 1137 | 1142 | 1142 | 1159 | 1135 | 1133 | 1136 |
| Delta T, °C | 67 | 66 | 56 | 65 | 52 | 59 | 68 | 66 | 71 | 65 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 18 Continued, add Table 18 Continued.

Table 18 – Type 6 Glasses (cont'd)

| Components (wt%) | Examples | | | | | | | | | |
|---|---|---|---|---|---|---|---|---|---|---|
| | 218 | 219 | 220 | 221 | 222 | 223 | 224 | 225 | 226 | 227 |
| $SiO_2$ | 58.50 | 58.60 | 58.00 | 58.10 | 58.10 | 58.70 | 58.70 | 58.70 | 58.61 | 58.40 |
| $Al_2O_3$ | 13.03 | 13.03 | 13.63 | 13.23 | 13.43 | 12.75 | 12.35 | 12.35 | 12.16 | 12.76 |
| CaO | 23.34 | 23.24 | 23.24 | 23.54 | 23.34 | 23.50 | 23.50 | 23.50 | 23.50 | 23.71 |
| MgO | 2.50 | 2.50 | 2.50 | 2.50 | 2.50 | 2.50 | 2.50 | 2.50 | 2.50 | 2.50 |
| $TiO_2$ | 0.50 | 0.50 | 0.50 | 0.50 | 0.50 | 0.50 | 0.50 | 0.50 | 1.10 | 0.50 |
| $Na_2O$ | - | - | - | - | - | 0.30 | 0.60 | 0.30 | - | - |
| $K_2O$ | - | - | - | - | - | - | - | - | - | - |
| $Li_2O$ | 0.90 | 0.90 | 0.90 | 0.90 | 0.90 | 0.90 | 0.60 | 0.90 | 0.90 | 0.90 |
| $Fe_2O_3$ | 0.23 | 0.23 | 0.23 | 0.23 | 0.23 | 0.25 | 0.25 | 0.25 | 0.23 | 0.23 |
| $B_2O_3$ | 1.00 | 1.00 | 1.00 | 1.00 | 1.00 | 0.60 | 1.00 | 1.00 | 1.00 | 1.00 |
| RO (CaO + MgO) | 25.84 | 25.74 | 25.74 | 26.04 | 25.84 | 26.00 | 26.00 | 26.00 | 26.00 | 26.21 |
| $SiO_2/CaO$ | 2.51 | 2.51 | 2.50 | 2.47 | 2.49 | 2.50 | 2.50 | 2.50 | 2.49 | 2.46 |
| $SiO_2/RO$ | 2.26 | 2.28 | 2.25 | 2.23 | 2.25 | 2.26 | 2.26 | 2.26 | 2.25 | 2.23 |
| $SiO_2/Al_2O_3$ | 4.49 | 4.50 | 4.26 | 4.39 | 4.33 | 4.60 | 4.75 | 4.75 | 4.82 | 4.58 |
| $Al_2O_3/CaO$ | 0.56 | 0.56 | 0.59 | 0.56 | 0.58 | 0.54 | 0.53 | 0.53 | 0.52 | 0.54 |
| $SiO_2 + Al_2O_3$ | 71.53 | 71.63 | 71.63 | 71.33 | 71.53 | 71.45 | 71.05 | 71.05 | 70.77 | 71.16 |
| $R2O+RO+B_2O_3$ | 27.74 | 27.64 | 27.64 | 27.94 | 27.74 | 27.80 | 28.20 | 28.20 | 27.90 | 28.11 |
| (Si+Al)/(R2O+RO+B) | 2.58 | 2.59 | 2.59 | 2.55 | 2.58 | 2.57 | 2.52 | 2.52 | 2.54 | 2.53 |
| $SiO_2$ - RO | 32.66 | 32.86 | 32.26 | 32.06 | 32.26 | 32.70 | 32.70 | 32.70 | 32.61 | 32.19 |
| $Al_2O_3/RO$ | 0.50 | 0.51 | 0.53 | 0.51 | 0.52 | 0.49 | 0.48 | 0.48 | 0.47 | 0.49 |
| Log3 FT, °C | 1204 | 1204 | 1206 | 1199 | 1204 | 1204 | 1207 | 1202 | 1194 | 1194 |
| Liquidus T, °C | 1133 | 1135 | 1136 | 1133 | 1134 | 1153 | 1157 | 1149 | 1141 | 1144 |
| Delta T, °C | 71 | 69 | 70 | 63 | 70 | 51 | 50 | 53 | 53 | 50 |

UNITED STATES PATENT AND TRADEMARK OFFICE
CERTIFICATE OF CORRECTION

PATENT NO. : 6,962,886 B2  
APPLICATION NO. : 10/164468  
DATED : November 8, 2005  
INVENTOR(S) : Frederick T. Wallenberger Page 28 of 36

It is certified that error appears in the above-identified patent and that said Letters Patent is hereby corrected as shown below:

At the end of Table 18 Continued, add Table 18 Continued.

Table 18 – Type 6 Glasses (cont'd)

| Components (wt%) | Examples | | | | | | | | | |
|---|---|---|---|---|---|---|---|---|---|---|
| | 228 | 229 | 230 | 231 | 232 | 233 | 234 | 235 | 236 | 237 |
| $SiO_2$ | 58.80 | 57.60 | 58.11 | 58.91 | 58.11 | 58.30 | 58.20 | 58.10 | 58.70 | 58.70 |
| $Al_2O_3$ | 12.46 | 13.03 | 13.36 | 12.16 | 13.36 | 13.03 | 13.03 | 13.03 | 13.35 | 13.35 |
| CaO | 23.61 | 24.04 | 23.40 | 23.80 | 23.40 | 23.54 | 23.64 | 23.74 | 23.50 | 23.50 |
| MgO | 2.50 | 2.50 | 2.50 | 2.50 | 2.50 | 2.50 | 2.50 | 2.50 | 2.50 | 2.50 |
| $TiO_2$ | 0.50 | 0.50 | 0.50 | 0.50 | 0.50 | 0.50 | 0.50 | 0.50 | 0.50 | 0.50 |
| $Na_2O$ | - | 0.10 | - | - | - | - | - | - | - | - |
| $K_2O$ | - | - | - | - | - | - | - | - | - | - |
| $Li_2O$ | 0.90 | 0.80 | 0.90 | 0.90 | 0.90 | 0.90 | 0.90 | 0.90 | 0.90 | 0.60 |
| $Fe_2O_3$ | 0.23 | 0.23 | 0.23 | 0.23 | 0.23 | 0.23 | 0.23 | 0.23 | 0.25 | 0.25 |
| $B_2O_3$ | 1.00 | 1.20 | 1.00 | 1.00 | 1.00 | 1.00 | 1.00 | 1.00 | 0.30 | 0.60 |
| RO (CaO + MgO) | 26.11 | 26.54 | 25.90 | 26.30 | 25.90 | 26.04 | 26.14 | 26.24 | 26.00 | 26.00 |
| $SiO_2$/CaO | 2.49 | 2.40 | 2.48 | 2.48 | 2.48 | 2.48 | 2.46 | 2.45 | 2.50 | 2.50 |
| $SiO_2$/RO | 2.25 | 2.17 | 2.24 | 2.24 | 2.24 | 2.24 | 2.23 | 2.21 | 2.26 | 2.26 |
| $SiO_2$/$Al_2O_3$ | 4.70 | 4.42 | 4.35 | 4.84 | 4.35 | 4.47 | 4.47 | 4.46 | 4.40 | 4.40 |
| $Al_2O_3$/CaO | 0.53 | 0.54 | 0.57 | 0.51 | 0.57 | 0.55 | 0.55 | 0.55 | 0.57 | 0.57 |
| $SiO_2$ + $Al_2O_3$ | 71.26 | 70.63 | 71.47 | 71.07 | 71.47 | 71.23 | 71.23 | 71.13 | 72.05 | 72.05 |
| $R_2O$+RO+$B_2O_3$ | 28.01 | 28.64 | 27.80 | 28.20 | 27.80 | 27.94 | 28.04 | 28.14 | 27.20 | 27.20 |
| (Si+Al)/($R_2O$+RO+B) | 2.54 | 2.47 | 2.57 | 2.52 | 2.57 | 2.55 | 2.54 | 2.53 | 2.65 | 2.65 |
| $SiO_2$ - RO | 32.69 | 31.06 | 32.21 | 32.61 | 32.21 | 32.26 | 32.06 | 31.86 | 32.70 | 32.70 |
| $Al_2O_3$/RO | 0.48 | 0.49 | 0.52 | 0.46 | 0.52 | 0.50 | 0.50 | 0.50 | 0.51 | 0.51 |
| Log3 FT. °C | 1195 | 1196 | 1229 | 1216 | 1213 | 1202 | 1202 | 1205 | 1207 | 1224 |
| Liquidus T. °C | 1145 | 1145 | 1155 | 1148 | 1142 | 1136 | 1136 | 1137 | 1144 | 1145 |
| Delta T. °C | 50 | 51 | 133 | 123 | 126 | 120 | 119 | 122 | 114 | 142 |

UNITED STATES PATENT AND TRADEMARK OFFICE
CERTIFICATE OF CORRECTION

PATENT NO.       : 6,962,886 B2
APPLICATION NO.  : 10/164468
DATED            : November 8, 2005
INVENTOR(S)      : Frederick T. Wallenberger It is certified that error appears in the above-identified patent and that said Letters Patent is hereby corrected as shown below:

At the end of Table 18 Continued, add Table 18 Continued .

Table 18 – Type 6 Glasses (cont'd)

| Components (wt%) | \multicolumn{10}{c}{Examples} |
|---|---|---|---|---|---|---|---|---|---|---|
|  | 238 | 239 | 240 | 241 | 242 | 243 | 244 | 245 | 246 | 247 |
| $SiO_2$ | 58.11 | 58.20 | 59.53 | 59.61 | 59.11 | 59.11 | 59.16 | 59.21 | 59.11 | 59.36 |
| $Al_2O_3$ | 13.36 | 13.23 | 12.25 | 12.16 | 12.16 | 12.16 | 12.16 | 12.16 | 12.16 | 12.41 |
| CaO | 23.40 | 23.44 | 23.17 | 23.50 | 23.00 | 23.00 | 23.20 | 23.40 | 23.50 | 23.60 |
| MgO | 2.50 | 2.50 | 2.52 | 2.50 | 2.50 | 2.50 | 2.25 | 2.00 | 2.00 | 2.00 |
| $TiO_2$ | 0.50 | 0.50 | 0.50 | 1.10 | 1.10 | 1.10 | 1.10 | 1.10 | 1.10 | 0.50 |
| $Na_2O$ | - | - | - | - | - | - | - | - | - | - |
| $K_2O$ | - | - | - | - | - | - | - | - | - | - |
| $Li_2O$ | 0.90 | 0.90 | 0.80 | 0.45 | 0.90 | 0.90 | 0.90 | 0.90 | 0.90 | 0.90 |
| $Fe_2O_3$ | 0.23 | 0.23 | 0.23 | 0.23 | 0.23 | 0.23 | 0.23 | 0.23 | 0.23 | 0.23 |
| $B_2O_3$ | 1.00 | 1.00 | 1.00 | 0.45 | 1.00 | 1.00 | 1.00 | 1.00 | 1.00 | 1.00 |
| RO (CaO + MgO) | 25.90 | 25.94 | 25.69 | 26.00 | 25.50 | 25.50 | 25.45 | 25.40 | 25.50 | 25.60 |
| $SiO_2$/CaO | 2.48 | 2.48 | 2.57 | 2.54 | 2.57 | 2.57 | 2.55 | 2.53 | 2.51 | 2.51 |
| $SiO_2$/RO | 2.24 | 2.24 | 2.32 | 2.29 | 2.32 | 2.32 | 2.32 | 2.33 | 2.32 | 2.32 |
| $SiO_2$/$Al_2O_3$ | 4.35 | 4.40 | 4.86 | 4.90 | 4.86 | 4.86 | 4.87 | 4.87 | 4.87 | 4.78 |
| $Al_2O_3$/CaO | 0.57 | 0.56 | 0.53 | 0.52 | 0.53 | 0.53 | 0.52 | 0.52 | 0.52 | 0.53 |
| $SiO_2$ + $Al_2O_3$ | 71.47 | 71.43 | 71.78 | 71.77 | 71.27 | 71.27 | 71.32 | 71.37 | 71.27 | 71.77 |
| $R_2O$+RO+$B_2O_3$ | 27.80 | 27.84 | 27.49 | 26.90 | 27.40 | 27.40 | 27.35 | 27.30 | 27.40 | 27.50 |
| (Si+Al)/($R_2O$+RO+B) | 2.57 | 2.57 | 2.61 | 2.67 | 2.60 | 2.60 | 2.61 | 2.61 | 2.60 | 2.61 |
| $SiO_2$ - RO | 32.21 | 32.26 | 33.84 | 33.61 | 33.61 | 33.61 | 33.71 | 33.81 | 33.61 | 33.76 |
| $Al_2O_3$/RO | 0.52 | 0.51 | 0.48 | 0.47 | 0.48 | 0.48 | 0.48 | 0.48 | 0.48 | 0.53 |
| Log3 FT, °C | 1212 | 1204 | 1214 | 1230 | 1205 | 1216 | 1218 | 1213 | 1209 | 1216 |
| Liquidus T, °C | 1135 | 1135 | 1143 | 1155 | 1142 | 1143 | 1147 | 1153 | 1153 | 1153 |
| Delta T, °C | 139 | 124 | 71 | 75 | 63 | 73 | 71 | 60 | 56 | 63 |

UNITED STATES PATENT AND TRADEMARK OFFICE
CERTIFICATE OF CORRECTION

PATENT NO.       : 6,962,886 B2
APPLICATION NO.  : 10/164468
DATED            : November 8, 2005
INVENTOR(S)      : Frederick T. Wallenberger It is certified that error appears in the above-identified patent and that said Letters Patent is hereby corrected as shown below:

At the end of Table 18 Continued, add Table 18 Continued.

Table 18 – Type 6 Glasses (cont'd)

| Component (wt%) | Examples ||||||||||
|---|---|---|---|---|---|---|---|---|---|---|
| | 248 | 249 | 250 | 251 | 252 | 253 | 254 | 255 | 256 | 257 |
| $SiO_2$ | 59.31 | 59.36 | 59.41 | 59.11 | 59.16 | 59.21 | 59.16 | 59.11 | 59.01 | 59.21 |
| $Al_2O_3$ | 12.56 | 12.51 | 12.46 | 12.16 | 12.16 | 12.16 | 12.26 | 12.26 | 12.36 | 12.16 |
| CaO | 23.50 | 23.50 | 23.50 | 23.00 | 23.20 | 23.40 | 23.45 | 23.50 | 23.50 | 23.50 |
| MgO | 2.00 | 2.00 | 2.00 | 2.50 | 2.25 | 2.00 | 2.50 | 2.50 | 2.50 | 2.50 |
| $TiO_2$ | 0.50 | 0.50 | 0.50 | 1.10 | 1.10 | 1.10 | 0.50 | 0.50 | 0.50 | 0.50 |
| $Na_2O$ | - | - | - | - | - | - | - | - | - | - |
| $K_2O$ | - | - | - | - | - | - | - | - | - | - |
| $Li_2O$ | 0.90 | 0.90 | 0.90 | 0.90 | 0.90 | 0.90 | 0.90 | 0.90 | 0.90 | 0.90 |
| $Fe_2O_3$ | 0.23 | 0.23 | 0.23 | 0.23 | 0.23 | 0.23 | 0.23 | 0.23 | 0.23 | 0.23 |
| $B_2O_3$ | 1.00 | 1.00 | 1.00 | 1.00 | 1.00 | 1.00 | 1.00 | 1.00 | 1.00 | 1.00 |
| RO (CaO + MgO) | 25.50 | 25.50 | 25.50 | 25.50 | 25.45 | 25.40 | 25.95 | 26.00 | 26.00 | 26.00 |
| $SiO_2/CaO$ | 2.52 | 2.53 | 2.53 | 2.57 | 2.55 | 2.53 | 2.52 | 2.52 | 2.51 | 2.52 |
| $SiO_2/RO$ | 2.33 | 2.33 | 2.33 | 2.32 | 2.32 | 2.33 | 2.28 | 2.27 | 2.27 | 2.28 |
| $SiO_2/Al_2O_3$ | 4.72 | 4.75 | 4.77 | 4.86 | 4.87 | 4.87 | 4.83 | 4.82 | 4.77 | 4.87 |
| $Al_2O_3/CaO$ | 0.53 | 0.53 | 0.53 | 0.53 | 0.52 | 0.52 | 0.52 | 0.52 | 0.53 | 0.52 |
| $SiO_2 + Al_2O_3$ | 71.87 | 71.87 | 71.87 | 71.27 | 71.32 | 71.37 | 71.42 | 71.37 | 71.37 | 71.37 |
| $R2O+RO+B_2O_3$ | 27.40 | 27.40 | 27.40 | 27.40 | 27.35 | 27.30 | 27.85 | 27.90 | 27.90 | 27.90 |
| (Si+Al)/(R2O+RO+B) | 2.62 | 2.62 | 2.62 | 2.60 | 2.61 | 2.61 | 2.56 | 2.56 | 2.56 | 2.56 |
| $SiO_2$ - RO | 33.81 | 33.86 | 33.91 | 33.61 | 33.71 | 33.81 | 33.21 | 33.11 | 33.01 | 33.21 |
| $Al_2O_3/RO$ | 0.49 | 0.49 | 0.49 | 0.48 | 0.48 | 0.48 | 0.47 | 0.47 | 0.48 | 0.47 |
| Log3 FT, °C | 1220 | 1220 | 1220 | 1216 | 1214 | 1220 | 1209 | 1210 | 1210 | 1201 |
| Liquidus T, °C | 1153 | 1158 | 1155 | 1144 | 1147 | 1158 | 1150 | 1152 | 1152 | 1143 |
| Delta T, °C | 67 | 62 | 65 | 72 | 67 | 62 | 59 | 58 | 58 | 58 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 18 Continued, add Table 18 Continued.

Table 18 – Type 6 Glasses (cont'd)

| Components (wt%) | Examples | | | | | | | | | |
|---|---|---|---|---|---|---|---|---|---|---|
| | 258 | 259 | 260 | 261 | 262 | 263 | 264 | 265 | 266 | 267 |
| $SiO_2$ | 58.75 | 58.75 | 58.10 | 58.70 | 59.11 | 59.31 | 59.21 | 54.60 | 56.75 | 57.85 |
| $Al_2O_3$ | 12.93 | 12.93 | 13.63 | 13.35 | 12.16 | 12.26 | 12.26 | 13.35 | 13.20 | 12.45 |
| CaO | 22.93 | 22.93 | 23.14 | 23.50 | 23.50 | 22.30 | 23.40 | 24.55 | 23.95 | 24.05 |
| MgO | 2.36 | 2.36 | 2.50 | 2.50 | 2.00 | 2.50 | 2.50 | 2.55 | 2.55 | 2.55 |
| $TiO_2$ | 0.50 | 0.50 | 0.50 | 0.50 | 1.10 | 0.50 | 0.50 | 0.35 | 1.10 | 0.55 |
| $Na_2O$ | 0.14 | 0.24 | - | - | - | - | - | 0.15 | 0.60 | 0.60 |
| $K_2O$ | 0.10 | 0.10 | - | - | - | - | - | 0.55 | - | - |
| $Li_2O$ | 0.80 | 0.70 | 0.90 | 0.30 | 0.90 | 0.90 | 0.90 | 0.30 | 0.30 | 0.30 |
| $Fe_2O_3$ | 0.29 | 0.29 | 0.23 | 0.25 | 0.23 | 0.23 | 0.23 | 0.28 | 0.25 | 0.35 |
| $B_2O_3$ | 1.20 | 1.20 | 1.00 | 0.90 | 1.00 | 1.00 | 1.00 | 3.00 | 1.40 | 1.30 |
| F | - | - | - | - | - | - | - | 0.20 | - | - |
| SrO | - | - | - | - | - | - | - | 0.12 | - | - |
| RO (CaO + MgO) | 25.29 | 25.29 | 25.64 | 26.00 | 25.50 | 24.80 | 25.90 | 27.10 | 26.50 | 26.60 |
| $SiO_2$/CaO | 2.56 | 2.56 | 2.51 | 2.50 | 2.52 | 2.66 | 2.53 | 2.22 | 2.37 | 2.39 |
| $SiO_2$/RO | 2.32 | 2.32 | 2.27 | 2.26 | 2.32 | 2.39 | 2.29 | 2.01 | 2.14 | 2.35 |
| $SiO_2$/$Al_2O_3$ | 4.54 | 4.54 | 4.26 | 4.40 | 4.86 | 4.84 | 4.83 | 4.09 | 4.30 | 4.65 |
| $Al_2O_3$/CaO | 0.56 | 0.56 | 0.59 | 0.57 | 0.52 | 0.55 | 0.52 | 0.54 | 0.55 | 0.52 |
| $SiO_2 + Al_2O_3$ | 71.68 | 71.68 | 71.73 | 72.05 | 71.27 | 71.57 | 71.47 | 67.95 | 69.95 | 71.30 |
| $R_2O+RO+B_2O_3$ | 27.53 | 27.53 | 27.54 | 27.20 | 27.40 | 26.70 | 27.80 | 31.10 | 28.80 | 28.80 |
| (Si+Al)/(R2O+RO+B) | 2.60 | 2.60 | 2.60 | 2.65 | 2.60 | 2.68 | 2.57 | 2.18 | 2.43 | 2.48 |
| $SiO_2$ - RO | 33.46 | 33.46 | 32.46 | 32.70 | 33.61 | 34.51 | 33.31 | 27.50 | 30.25 | 31.25 |
| $Al_2O_3$/RO | 0.51 | 0.51 | 0.53 | 0.51 | 0.48 | 0.49 | 0.47 | 0.49 | 0.50 | 0.47 |
| Log3 FT. °C | 1211 | 1218 | 1204 | 1239 | 1215 | 1209 | 1210 | 1187 | 1206 | 1208 |
| Liquidus T. °C | 1127 | 1129 | 1115 | 1143 | 1155 | 1148 | 1156 | 1133 | 1152 | 1154 |
| Delta T. °C | 84 | 89 | 89 | 96 | 60 | 61 | 54 | 54 | 54 | 54 |

UNITED STATES PATENT AND TRADEMARK OFFICE
CERTIFICATE OF CORRECTION

PATENT NO.        : 6,962,886 B2
APPLICATION NO.   : 10/164468
DATED             : November 8, 2005
INVENTOR(S)       : Frederick T. Wallenberger It is certified that error appears in the above-identified patent and that said Letters Patent is hereby corrected as shown below:

At the end of Table 18 Continued, add Table 19 .

Table 19– Misc Glasses

| Components (wt%) | Examples | | | | |
|---|---|---|---|---|---|
| | 268 | 269 | 270 | 271 | 272 |
| $SiO_2$ | 57.82 | 58.70 | 58.70 | 57.72 | 58.61 |
| $Al_2O_3$ | 11.80 | 13.35 | 13.35 | 11.80 | 12.16 |
| CaO | 22.80 | 23.50 | 23.50 | 22.80 | 23.50 |
| MgO | 2.43 | 2.50 | 2.50 | 2.52 | 2.50 |
| $TiO_2$ | 1.07 | 0.50 | 0.50 | 1.07 | 1.10 |
| $Na_2O$ | 0.87 | - | 0.90 | 0.87 | - |
| $Li_2O$ | - | 0.30 | 0.30 | - | 0.30 |
| ZnO | - | - | - | - | 0.30 |
| MnO | 3.00 | - | - | - | 0.30 |
| $MnO_2$ | - | - | - | 3.00 | - |
| $Fe_2O_3$ | 0.22 | 0.25 | 0.25 | 0.22 | 0.23 |
| $B_2O_3$ | - | 0.90 | - | - | 1.00 |
| RO | 25.23 | 26.00 | 26.00 | 25.32 | 26.00 |
| $SiO_2$/CaO | 2.54 | 2.50 | 2.50 | 2.53 | 2.49 |
| $SiO_2$/RO | 2.29 | 2.26 | 2.26 | 2.28 | 2.25 |
| $SiO_2$/$Al_2O_3$ | 4.90 | 4.40 | 4.40 | 4.89 | 4.82 |
| $Al_2O_3$/CaO | 0.52 | 0.57 | 0.57 | 0.52 | 0.52 |
| $SiO_2$+$Al_2O_3$ | 69.62 | 72.05 | 72.05 | 69.52 | 70.77 |
| $RO2$+$RO$+$B_2O_3$ | 26.10 | 27.20 | 26.30 | 26.19 | 27.30 |
| (Si+Al)/(R2O+RO+B) | 2.67 | 2.65 | 2.74 | 2.65 | 2.59 |
| $SiO_2$-RO | 32.59 | 32.70 | 32.70 | 32.40 | 32.61 |
| $Al_2O_3$/RO | 0.47 | 0.51 | 0.51 | 0.47 | 0.47 |
| Log3 FT, °C | 1219 | 1239 | 1241 | 1222 | 1223 |
| Liquidus T, °C | 1163 | 1143 | 1165 | 1161 | 1139 |
| Delta T, °C | 52 | 96 | 76 | 61 | 94 |

UNITED STATES PATENT AND TRADEMARK OFFICE
CERTIFICATE OF CORRECTION

PATENT NO.        : 6,962,886 B2
APPLICATION NO.   : 10/164468
DATED             : November 8, 2005
INVENTOR(S)       : Frederick T. Wallenberger It is certified that error appears in the above-identified patent and that said Letters Patent is hereby corrected as shown below:

At the end of Table 19 Continued, add Table 20.

Table 20 – Production Glasses

| Components (wt%) | Examples | | | | | | |
|---|---|---|---|---|---|---|---|
| | 273 | 274 | 275 | 276 | 277 | 278 | 279 |
| $SiO_2$ | 57.07 | 57.21 | 56.94 | 56.68 | 56.71 | 56.53 | 55.97 |
| $Al_2O_3$ | 12.69 | 12.77 | 12.72 | 12.68 | 12.95 | 12.84 | 12.68 |
| CaO | 23.91 | 24.15 | 24.00 | 24.11 | 24.56 | 24.42 | 24.00 |
| MgO | 2.53 | 2.57 | 2.56 | 2.58 | 2.44 | 2.42 | 2.45 |
| $TiO_2$ | 1.09 | 1.12 | 1.12 | 1.09 | 1.07 | 1.07 | 1.05 |
| $Na_2O$ | 0.89 | 0.90 | 0.87 | 0.90 | 0.92 | 0.92 | 0.88 |
| $K_2O$ | 0.060 | 0.050 | 0.050 | 0.060 | 0.070 | 0.060 | 0.060 |
| $Fe_2O_3$ | 0.255 | 0.271 | 0.255 | 0.263 | 0.278 | 0.267 | 0.265 |
| $B_2O_3$ | 1.37 | 1.36 | 1.42 | 1.40 | 1.54 | 1.70 | 1.36 |
| $SO_3$ | 0.029 | 0.032 | 0.032 | 0.031 | 0.028 | 0.024 | 0.025 |
| SrO | 0.040 | 0.040 | 0.050 | 0.050 | 0.050 | 0.050 | 0.050 |
| $Cr_2O_3$ | 0.002 | 0.002 | 0.002 | 0.002 | 0.009 | 0.008 | 0.007 |
| RO | 26.44 | 26.72 | 26.56 | 26.69 | 27.00 | 26.84 | 26.45 |
| $SiO_2/CaO$ | 2.39 | 2.37 | 2.37 | 2.35 | 2.31 | 2.31 | 2.33 |
| $SiO_2/RO$ | 2.16 | 2.14 | 2.14 | 2.12 | 2.10 | 2.11 | 2.12 |
| $SiO_2/Al_2O_3$ | 4.50 | 4.48 | 4.48 | 4.47 | 4.38 | 4.40 | 4.41 |
| $Al_2O_3/CaO$ | 0.53 | 0.53 | 0.53 | 0.53 | 0.53 | 0.53 | 0.53 |
| $SiO_2+Al_2O_3$ | 69.76 | 69.98 | 69.66 | 69.36 | 69.66 | 69.37 | 68.65 |
| $RO_2+RO+B_2O_3$ | 28.96 | 29.25 | 29.11 | 29.25 | 29.74 | 29.73 | 28.96 |
| $(Si+Al)/(R2O+RO+B)$ | 2.41 | 2.39 | 2.39 | 2.37 | 2.34 | 2.33 | 2.37 |
| $SiO_2-RO$ | 30.63 | 30.49 | 30.38 | 29.99 | 29.71 | 29.69 | 29.52 |
| $Al_2O_3/RO$ | 0.48 | 0.48 | 0.48 | 0.48 | 0.48 | 0.48 | 0.48 |
| Log3 FT, °C | 1214 | | 1217 | | 1203 | 1212 | 1212 |
| Liquidus T, °C | 1147 | | 1134 | | 1145 | 1147 | 1134 |
| Delta T, °C | 67 | | 83 | | 58 | 65 | 76 |

UNITED STATES PATENT AND TRADEMARK OFFICE
CERTIFICATE OF CORRECTION

PATENT NO. : 6,962,886 B2
APPLICATION NO. : 10/164468
DATED : November 8, 2005
INVENTOR(S) : Frederick T. Wallenberger It is certified that error appears in the above-identified patent and that said Letters Patent is hereby corrected as shown below:

At the end of Table 20 Continued, add Table 20 Continued .

Table 20– Production Glasses (cont'd)

| Components (wt%) | Examples | | | | | |
|---|---|---|---|---|---|---|
| | 280 | 281 | 282 | 283 | 284 | 285 |
| $SiO_2$ | 56.70 | 56.66 | 56.63 | 56.54 | 56.43 | 56.61 |
| $Al_2O_3$ | 12.91 | 12.86 | 12.85 | 12.79 | 12.75 | 12.83 |
| CaO | 24.61 | 24.53 | 24.69 | 24.53 | 24.44 | 25.24 |
| MgO | 2.54 | 2.56 | 2.60 | 2.54 | 2.54 | 2.55 |
| $TiO_2$ | 1.10 | 1.09 | 0.94 | 0.94 | 1.09 | 1.20 |
| $Na_2O$ | 0.91 | 0.90 | 0.93 | 0.90 | 0.90 | 0.92 |
| $K_2O$ | 0.060 | 0.060 | 0.070 | 0.070 | 0.050 | 0.050 |
| $Fe_2O_3$ | 0.260 | 0.265 | 0.267 | 0.268 | 0.270 | 0.279 |
| $B_2O_3$ | 1.32 | 1.15 | 1.34 | 1.27 | 1.24 | 1.29 |
| $SO_3$ | 0.018 | 0.020 | 0.018 | 0.016 | 0.014 | 0.016 |
| SrO | 0.040 | 0.040 | 0.040 | 0.040 | 0.040 | 0.040 |
| $Cr_2O_3$ | 0.004 | 0.004 | 0.003 | 0.002 | 0.008 | 0.004 |
| RO | 27.15 | 27.09 | 27.29 | 27.07 | 26.98 | 27.79 |
| $SiO_2$/CaO | 2.30 | 2.31 | 2.29 | 2.30 | 2.31 | 2.24 |
| $SiO_2$/RO | 2.09 | 2.09 | 2.08 | 2.09 | 2.09 | 2.04 |
| $SiO_2$/$Al_2O_3$ | 4.39 | 4.41 | 4.41 | 4.42 | 4.43 | 4.41 |
| $Al_2O_3$/CaO | 0.52 | 0.52 | 0.52 | 0.52 | 0.52 | 0.51 |
| $SiO_2$+$Al_2O_3$ | 69.61 | 69.52 | 69.48 | 69.33 | 69.18 | 69.44 |
| $RO_2$+RO+$B_2O_3$ | 29.64 | 29.41 | 29.83 | 29.51 | 29.39 | 30.28 |
| (Si+Al)/(R2O+RO+B) | 2.35 | 2.36 | 2.33 | 2.35 | 2.35 | 2.29 |
| $SiO_2$-RO | 29.55 | 29.57 | 29.34 | 29.47 | 29.45 | 28.82 |
| $Al_2O_3$/RO | 0.48 | 0.47 | 0.47 | 0.47 | 0.47 | 0.46 |
| Log3 FT, °C | | 1213 | 1214 | | | |
| Liquidus T, °C | | 1149 | 1158 | | | |
| Delta T, °C | | 64 | 55 | | | |

UNITED STATES PATENT AND TRADEMARK OFFICE
CERTIFICATE OF CORRECTION

PATENT NO.         : 6,962,886 B2
APPLICATION NO.    : 10/164468
DATED              : November 8, 2005
INVENTOR(S)        : Frederick T. Wallenberger It is certified that error appears in the above-identified patent and that said Letters Patent is hereby corrected as shown below:

At the end of Table 20 Continued, add Table 21.

Table 21 – Summary Sheet

|  | Type 1 Glasses | | Type 2 Glasses | | Type 3 Glasses | | Type 4 Glasses | | Type 5 Glasses | | Type 6 Glasses | |
|---|---|---|---|---|---|---|---|---|---|---|---|---|
|  | Low | High | Low | High | Low | High | Low | High | Low | High | Low | High |
| RO (CaO + MgO) | 26.30 | 27.05 | 24.80 | 27.56 | 24.01 | 26.70 | 25.40 | 26.60 | 25.80 | 25.90 | 25.29 | 26.60 |
| $SiO_2/CaO$ | 2.35 | 2.47 | 2.20 | 2.55 | 2.39 | 2.71 | 2.41 | 2.54 | 2.62 | 2.62 | 2.22 | 2.66 |
| $SiO_2/RO$ | 2.13 | 2.23 | 1.96 | 2.29 | 2.16 | 2.52 | 2.18 | 2.29 | 2.28 | 2.28 | 2.01 | 2.39 |
| $SiO_2/Al_2O_3$ | 4.25 | 4.84 | 3.79 | 4.76 | 4.30 | 4.99 | 4.26 | 4.90 | 4.92 | 4.93 | 4.09 | 4.90 |
| $Al_2O_3/CaO$ | 0.51 | 0.58 | 0.51 | 0.59 | 0.50 | 0.59 | 0.50 | 0.59 | 0.53 | 0.53 | 0.51 | 0.59 |
| $SiO_2 + Al_2O_3$ | 70.85 | 71.86 | 66.10 | 70.95 | 71.05 | 73.67 | 71.03 | 71.73 | 70.60 | 71.00 | 67.95 | 72.05 |
| $R2O+RO+B_2O_3$ | 27.20 | 27.95 | 28.15 | 32.79 | 25.15 | 27.60 | 26.30 | 27.50 | 26.70 | 26.80 | 26.70 | 31.10 |
| (Si+Al)/(R2O+RO+B) | 2.55 | 2.64 | 2.02 | 2.67 | 2.30 | 2.96 | 2.60 | 2.71 | 2.64 | 2.65 | 2.18 | 2.68 |
| $SiO_2 - RO$ | 30.55 | 32.55 | 26.50 | 32.55 | 30.95 | 36.56 | 31.15 | 33.61 | 32.90 | 33.10 | 27.50 | 33.91 |
| $Al_2O_3/RO$ | 0.46 | 0.52 | 0.46 | 0.56 | 0.47 | 0.53 | 0.47 | 0.53 | 0.46 | 0.46 | 0.46 | 0.53 |

At the end of Table 21 Continued, add Table 22.

Table 22 – Summary Sheet

|  | Types 1 & 2 Glasses | | Types 3-6 Glasses | | Types1&,3-5,Glasses (boron-free) | | Types 2 & 6 Glasses (contains boron) | | Production Glasses (contains boron) | |
|---|---|---|---|---|---|---|---|---|---|---|
|  | Low | High | Low | High | Low | High | Low | High | Low | High |
| RO (CaO + MgO) | 24.80 | 27.56 | 24.01 | 26.70 | 24.01 | 26.90 | 24.80 | 27.56 | 26.44 | 27.79 |
| $SiO_2/CaO$ | 2.20 | 2.55 | 2.39 | 2.71 | 2.36 | 2.73 | 2.20 | 2.65 | 2.24 | 2.37 |
| $SiO_2/RO$ | 1.96 | 2.29 | 2.16 | 2.52 | 2.14 | 2.52 | 1.96 | 2.39 | 2.08 | 2.16 |
| $SiO_2/Al_2O_3$ | 3.79 | 4.84 | 4.26 | 4.99 | 4.26 | 4.99 | 3.79 | 4.90 | 4.38 | 4.50 |
| $Al_2O_3/CaO$ | 0.51 | 0.59 | 0.50 | 0.59 | 0.50 | 0.59 | 0.51 | 0.59 | 0.51 | 0.53 |
| $SiO_2 + Al_2O_3$ | 66.10 | 71.45 | 70.60 | 73.67 | 70.85 | 73.67 | 66.10 | 72.05 | 68.65 | 69.98 |
| $R2O+RO+B_2O_3$ | 27.20 | 32.79 | 25.15 | 28.64 | 25.15 | 27.80 | 26.90 | 32.79 | 28.96 | 30.28 |
| (Si+Al)/(R2O+RO+B) | 2.02 | 2.67 | 2.30 | 2.96 | 2.30 | 2.96 | 2.02 | 2.68 | 2.29 | 2.41 |
| $SiO_2 - RO$ | 26.50 | 32.55 | 30.95 | 36.56 | 30.55 | 36.56 | 26.50 | 33.91 | 28.82 | 30.63 |
| $Al_2O_3/RO$ | 0.46 | 0.56 | 0.46 | 0.53 | 0.46 | 0.53 | 0.46 | 0.56 | 0.46 | 0.48 |

UNITED STATES PATENT AND TRADEMARK OFFICE
CERTIFICATE OF CORRECTION

| | |
|---|---|
| PATENT NO. | : 6,962,886 B2 |
| APPLICATION NO. | : 10/164468 |
| DATED | : November 8, 2005 |
| INVENTOR(S) | : Frederick T. Wallenberger |

It is certified that error appears in the above-identified patent and that said Letters Patent is hereby corrected as shown below:

Column 37 line 9, "$TiO_2$ 0.5 to 2 percent by weight;" should be -- $TiO_2$ up to 2 percent by weight;--.

Signed and Sealed this

Thirty-first Day of October, 2006

JON W. DUDAS
*Director of the United States Patent and Trademark Office*